(12) United States Patent
Iguchi et al.

(10) Patent No.: US 11,284,142 B2
(45) Date of Patent: Mar. 22, 2022

(54) RECEPTION METHOD, TRANSMISSION METHOD, RECEPTION DEVICE, AND TRANSMISSION DEVICE

(71) Applicant: Panasonic Intellectual Property Corporation of America, Torrance, CA (US)

(72) Inventors: Noritaka Iguchi, Osaka (JP); Tadamasa Toma, Osaka (JP); Takahiro Nishi, Nara (JP); Hisaya Katou, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 17/134,877

(22) Filed: Dec. 28, 2020

(65) Prior Publication Data
US 2021/0120291 A1 Apr. 22, 2021

Related U.S. Application Data

(63) Continuation of application No. 16/299,440, filed on Mar. 12, 2019, now Pat. No. 10,911,805, which is a
(Continued)

(30) Foreign Application Priority Data

Aug. 8, 2014 (JP) .................. 2014-162861

(51) Int. Cl.
*H04N 21/242* (2011.01)
*H04N 21/44* (2011.01)
(Continued)

(52) U.S. Cl.
CPC .......... *H04N 21/242* (2013.01); *H04H 60/13* (2013.01); *H04N 21/4302* (2013.01);
(Continued)

(58) Field of Classification Search
CPC .................................................. H04N 21/4622
See application file for complete search history.

(56) References Cited

U.S. PATENT DOCUMENTS

| 5,623,483 | A | * | 4/1997 | Agrawal | ............... H04J 3/0632 |
| | | | | | 370/253 |
| 7,222,155 | B1 | | 5/2007 | Gebhardt et al. | |

(Continued)

FOREIGN PATENT DOCUMENTS

| EP | 2 645 727 | 10/2013 |
| EP | 2 665 261 | 11/2013 |

(Continued)

OTHER PUBLICATIONS

International Search Report of PCT Application No. PCT/JP2014/004326 dated Nov. 25, 2014.
(Continued)

*Primary Examiner* — Fernando Alcon
(74) *Attorney, Agent, or Firm* — Wenderoth, Lind & Ponack, L.L.P.

(57) ABSTRACT

According to one aspect of the present disclosure, a reception method in broadcast and broadband cooperation service, the reception method includes: receiving broadcast content transmitted through broadcast; receiving acquisition information through the broadcast, the acquisition information being information used to play back broadband content transmitted through broadband while the broadband content is synchronized with the received broadcast content, the acquisition information being information relating to acquisition of the broadband content; and acquiring the broadband content based on the received acquisition information. Therefore, the broadband content can properly be acquired in response to the reception of the broadcast content.

4 Claims, 23 Drawing Sheets

Related U.S. Application Data continuation of application No. 15/044,203, filed on Feb. 16, 2016, now Pat. No. 10,277,931, which is a continuation of application No. PCT/JP2014/004326, filed on Aug. 22, 2014.

(60) Provisional application No. 61/901,497, filed on Nov. 8, 2013, provisional application No. 61/871,968, filed on Aug. 30, 2013.

(51) Int. Cl.
| | | |
|---|---|---|
| H04H 60/13 | (2008.01) | |
| H04N 21/43 | (2011.01) | |
| H04N 21/462 | (2011.01) | |
| H04N 21/61 | (2011.01) | |
| H04N 21/8547 | (2011.01) | |
| H04H 20/18 | (2008.01) | |

(52) U.S. Cl.
CPC ... *H04N 21/4307* (2013.01); *H04N 21/44004* (2013.01); *H04N 21/4622* (2013.01); *H04N 21/6112* (2013.01); *H04N 21/6125* (2013.01); *H04N 21/8547* (2013.01); *H04H 20/18* (2013.01)

(56) References Cited

U.S. PATENT DOCUMENTS

| | | |
|---|---|---|
| 8,424,037 B2 | 4/2013 | Landow et al. |
| 2005/0138674 A1 | 6/2005 | Howard |
| 2005/0155057 A1 | 7/2005 | Wei |
| 2006/0139490 A1* | 6/2006 | Fekkes .............. H04N 21/4307 348/515 |
| 2006/0193597 A1 | 8/2006 | Horii et al. |
| 2006/0220930 A1* | 10/2006 | Lee .................... H04N 5/4401 341/51 |
| 2007/0050833 A1 | 3/2007 | Park |
| 2011/0093895 A1 | 4/2011 | Lee et al. |
| 2012/0019732 A1 | 1/2012 | Lee et al. |
| 2012/0082266 A1 | 4/2012 | Kitazato et al. |
| 2012/0084829 A1 | 4/2012 | Kitazato |
| 2012/0230389 A1 | 9/2012 | Laurent et al. |
| 2013/0016282 A1 | 1/2013 | Kim et al. |
| 2013/0283328 A1 | 10/2013 | Kitazato |
| 2013/0293677 A1 | 11/2013 | Lee et al. |
| 2013/0294747 A1 | 11/2013 | Takahashi |
| 2014/0075472 A1 | 3/2014 | Mitsuya et al. |
| 2014/0201800 A1 | 7/2014 | Kitahara et al. |
| 2014/0250479 A1 | 9/2014 | Lee et al. |
| 2014/0344883 A1 | 11/2014 | Kitazato et al. |
| 2014/0344884 A1 | 11/2014 | Kitahara et al. |
| 2015/0052224 A1 | 2/2015 | Kitahara et al. |
| 2016/0037199 A1 | 2/2016 | Oh et al. |

FOREIGN PATENT DOCUMENTS

| | | |
|---|---|---|
| EP | 2 670 138 | 12/2013 |
| JP | 2007/068172 | 3/2007 |
| JP | 2008-092161 | 4/2008 |
| JP | 2013-009332 | 1/2013 |
| JP | 2013-009341 | 1/2013 |
| JP | 2013-009359 | 1/2013 |
| JP | 2013-162205 | 8/2013 |
| WO | 2012/096372 | 7/2012 |
| WO | 2012/099359 | 7/2012 |
| WO | 2012/102134 | 8/2012 |
| WO | 2013/065274 | 5/2013 |
| WO | 2013/099101 | 7/2013 |

OTHER PUBLICATIONS

Official Communication dated Nov. 23, 2018 in European Patent Application No. 14 839 566.8.
Extended European Search Report dated Jul. 21, 2016 in corresponding European Application No. 14839566.8.
"Digital Video Broadcasting (DVB); Carriage and signaling of TV-Anytime information in DVB transport streams", Technical Specification, European Telecommunications Standards Institute (ETSI), 650, Route Des Lucioles ; F-06921 Sophia-Antipolis ; France, vol. BROADCAS, No. V1.5.1, Jan. 1, 2012 (Jan. 1, 2012), XP014069219.

* cited by examiner

RECEPTION METHOD, TRANSMISSION METHOD, RECEPTION DEVICE, AND TRANSMISSION DEVICE

BACKGROUND

1. Technical Field

The present disclosure relates to a reception method and the like for synchronously playing back pieces of content such as video, audio, and caption, which are obtained through broadcast or broadband

2. Description of the Related Art

Nowadays, there are provided various kinds of services in which the broadcast and the broadband cooperate with each other.

For example, the following reception devices are proposed as a device that provides enjoyment of such kinds of services (for example, see PTLs 1, 2, and 3).

The reception device receives broadcast content from a digital broadcast signal, receives broadband content linking with the broadcast content through a broadband network, and synchronously presents the broadcast content and the broadband content.

CITATION LIST

Patent Literatures

PTL 1: Unexamined Japanese Patent Publication No. 2013-9332
PTL 2: Unexamined Japanese Patent Publication No. 2013-9359
PTL 3: Unexamined Japanese Patent Publication No. 2013-9341

SUMMARY

In one general aspect, the techniques disclosed here feature a reception method in broadcast and broadband cooperation service, the reception method includes: receiving broadcast content transmitted through broadcast; receiving acquisition information through the broadcast, the acquisition information being information used to play back broadband content transmitted through broadband while the broadband content is synchronized with the received broadcast content, the acquisition information being information relating to acquisition of the broadband content; and acquiring the broadband content based on the received acquisition information.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

These comprehensive or specific aspects may be implemented by a system, a device, an integrated circuit, a computer program, or a recording medium such as a computer-readable CD-ROM. These comprehensive or specific aspects may be implemented by any combination of the system, the device, the integrated circuit, the computer program, and the recording medium.

DETAILED DESCRIPTION

Figure 1:
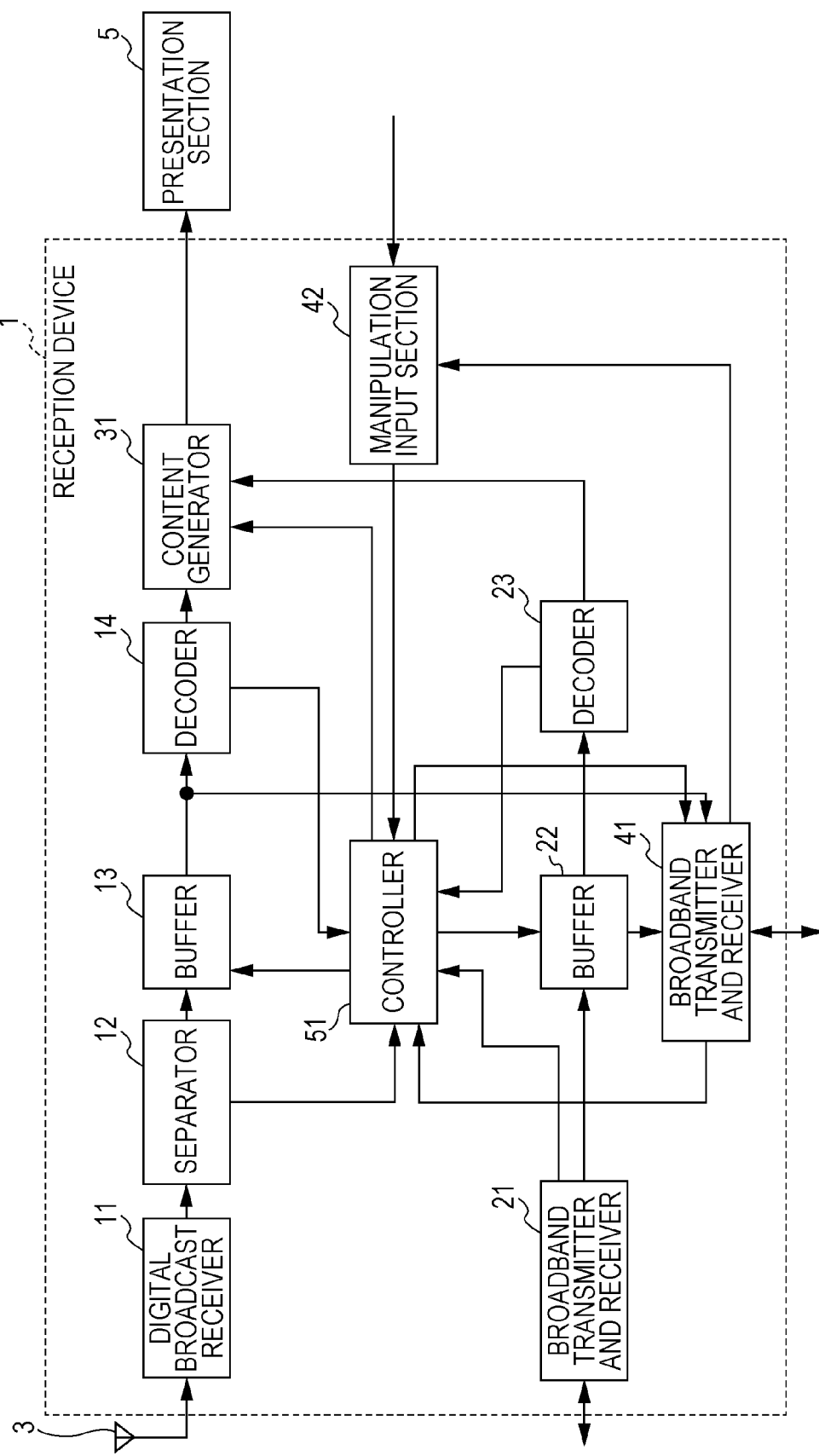
FIG. 1 is a block diagram illustrating a configuration of reception device 1 according to a first exemplary embodiment of the present disclosure.

The broadcast content is usually transmitted from a broadcast station at a predetermined clock time. Therefore, in the case that the broadcast content and the broadband content are synchronously presented (played back), the reception device acquires and plays back the broadband content according to the reception of the broadcast content.

However, in the reception device, there is a limit to such the broadband content acquisition as a capacity of a broadband content buffer. For this reason, there is room for study of a method for acquiring the broadband content of the reception device.

(First Knowledge Underlying the Present Disclosure)

The reception device disclosed in PTL 1 receives the broadcast content through the digital broadcast signal, and receives the broadband content linking with the broadcast content through the broadband network. The reception device temporarily stores the received broadcast content in a first synchronizing buffer, and temporarily stores the received broadband content in a second synchronizing buffer. The reception device controls an output time of the content output from one of the first and second synchronizing buffers according to a time specified by command executer, and delays the presentation of one of the broadcast content and the broadband content. Therefore, the broadcast content and broadband content having different reception clock times can synchronously be presented.

The reception device disclosed in PTL 2 synchronizes the broadcast content presentation and the broadband content presentation by delaying the broadcast content presentation. In the reception device, the broadband content is acquired in response to an external manipulation or an external control signal to start delay presentation in which the broadcast content is presented while being delayed compared to a presentation clock time of the normal presentation after the broadband content acquisition is completed. This enables the broadcast content to be normally presented even during acquisition of the broadband content.

In the conventional reception devices disclosed in PTLs 1 and 2, in switching a state in which the broadcast content is played back while the broadband content is not played back to a state in which both the broadcast content and the broadband content are played back, it is necessary to delay the broadcast content presentation according to a delay time of the reception clock time of the broadband content to the reception clock time of the broadcast content. Therefore, the broadcast content presented to a viewer is interrupted. An influence on the viewer increases with increasing delay time of the reception clock time of the broadband content to the reception clock time of the broadcast content.

The similar problem is generated in the case that the reception clock time of the broadcast content is delayed with respect to the reception clock time of the broadband content. That is, in switching the state in which the broadband content is played back while the broadcast content is not played back to the state in which both the broadband content and the broadcast content are played back, it is necessary to delay the broadband content presentation according to the delay time of the reception clock time of the broadcast content to the reception clock time of the broadband content. Therefore, the broadband content presented to the viewer is interrupted. The influence on the viewer increases with increasing delay time of the reception clock time of the broadcast content to the reception clock time of the broadband content.

However, currently a technical solution to the problem is not studied yet.

Therefore, the inventors have studied the technical solution to the problem.

As a result of the study, the inventors have obtained knowledge that the influence on the viewer is reduced by notifying the viewer of the synchronization between the broadcast and the broadband before and after the broadcast content presentation is delayed or before and after the broadband content presentation is delayed.

Hereinafter, exemplary embodiments based on the solution obtained based on the knowledge will be described.

First Exemplary Embodiment

FIG. 1 is a block diagram illustrating a configuration of reception device 1 that is a broadcast and broadband cooperation reception device according to a first exemplary embodiment of the present disclosure.

Reception device 1 includes digital broadcast receiver 11, separator 12, buffer 13, decoder 14, broadband transmitter and receiver 21, buffer 22, decoder 23, content generator 31, broadband transmitter and receiver 41, manipulation input section 42, and controller 51.

For example, reception device 1 is a device such as a television receiver, a portable television set, a recorder, a set-top box, a smartphone, and a tablet.

A digital broadcast signal received by external broadcast antenna 3 is input to digital broadcast receiver 11. Digital broadcast receiver 11 tunes a desired channel from the digital broadcast signal, performs demodulation processing and error correction processing on the digital broadcast signal of the tuned desired channel to generate a transport stream, and outputs the transport stream to separator 12. Alternatively, reception device 1 may include broadcast antenna 3.

As used herein, for example, the digital broadcast means terrestrial digital broadcast, BS (Broadcast Satellite) digital broadcast, CS (Broadbands Satellite) digital broadcast, cable television, and broadcast in which an IP (Internet Protocol) network such as an optical fiber is used.

Separator 12 separates the transport stream generated by digital broadcast receiver 11 into video data, audio data, data broadcast, and the like. Separator 12 acquires various pieces of control information included in the transport stream.

Examples of the control information included in the transport stream include PSI (Program Specific Information) of system information, SI (Service Information), a PCR (Program Clock Reference) of synchronization information, and an application data table (Application Information Table (AIT)) of information on an application. For example, an application ID identifying the application, a control code that can control a life cycle such as activation and termination of the application, and location information on the application are described in the AIT.

The video data, the audio data, and the like, which are output from separator 12, are constructed as a PES (Packetized Elementary Stream) packet. A PTS (Presentation Time Stamp) and a DTS (Decoding Time Stamp) are stored as synchronizing presentation clock time information in a PES header included in each PES packet. One of the PTS and the DTS or both the PTS and the DTS are occasionally included in the PES header.

The separated video data, audio data, and the like are output from separator 12 to buffer 13, and the PCR, the AIT, and the like are output from separator 12 to controller 51.

The video data, the audio data, and the like, which are output from separator 12, are stored in buffer 13. At the timing indicated by controller 51, buffer 13 outputs content data of each component such as the video and the audio to one of or both decoder 14 and broadband transmitter and receiver 41 in units of PES packets. Buffer 13 is described in detail later with reference to FIG. 2.

Decoder 14 converts the PES packet of each component, such as the video and the audio, which is output from buffer 13, into an elementary stream (ES) to extract the PTS and the DTS from a PES header of the PES packet. Decoder 14 outputs the extracted PTS and DTS to controller 51. Decoder 14 decodes the elementary stream in each component, and outputs the decoded elementary stream to content generator 31. In the case that order of a pre-decoding picture frame of video content differs from order of a post-decoding picture frame, decoder 14 replaces the order using a buffer included in decoder 14, and outputs the picture frame to content generator 31.

Broadband transmitter and receiver 21 acquires the application and AV content from a content server provided by an business operator relating to a broadcast organization or other business operators through a broadband network. Sometimes broadband transmitter and receiver 21 acquires the control information on the AIT and the like through the broadband network. Examples of the AV content provided by a broadband provider include file data, video data, and audio data. Broadband transmitter and receiver 21 outputs the acquired application and control information to controller 51. Broadband transmitter and receiver 21 outputs the acquired AV content to buffer 22.

For example, broadband transmitter and receiver 21 and broadband transmitter and receiver 41 conduct broadband by a broadband method pursuant to a broadband standard such as wireless LAN (Local Area Network), Bluetooth (registered trademark), Ethernet (registered trademark), USB (Universal Serial Bus), PLC (Power Line Broadband), and HDMI (registered trademark) (High-Definition Multimedia Interface). Broadband transmitter and receiver 21 and broadband transmitter and receiver 41 may have either an identical configuration or different configurations.

The content data of the AV content output from broadband transmitter and receiver 21 is stored in buffer 22. At the time indicated by controller 51, buffer 22 outputs content data of each component such as the video and the audio to one of or both decoder 23 and broadband transmitter and receiver 41 in units of PES packets. Buffer 22 is described in detail later with reference to FIG. 2.

Decoder 23 converts the PES packet of each component, such as the video and the audio, which is output from buffer 22, into the elementary stream (ES) to extract the PTS and the DTS from the PES header of the PES packet. Decoder 23 outputs the extracted PTS and DTS to controller 51. Decoder 23 decodes the elementary stream in each component, and outputs the decoded elementary stream to content generator 31. In the case that the order of the pre-decoding picture frame of the video content differs from the order of the post-decoding picture frame, decoder 23 replaces the order using a buffer included in decoder 23, and outputs the picture frame to content generator 31.

Content generator 31 generates a service presentation content according to the instruction of controller 51 using the content data of each component (such as the video, the audio, and the caption) output from decoder 14 and the content data of each component (such as the video, the audio, and the caption) output from decoder 23. The presentation content generated by content generator 31 is output to external presentation section 5, and presented by presentation section 5. Alternatively, reception device 1 may include presentation section 5.

Broadband transmitter and receiver 41 conducts broadband with a content presenting device different from presentation section 5 and an input interface manipulated by the viewer. Examples of the content presenting device include a television receiver, a portable television set, a smartphone, and a tablet. Broadband transmitter and receiver 41 transmits the PES packet output from buffers 13 and 22 to the content presenting device. Broadband transmitter and receiver 41 transmits the data received from controller 51 to the content presenting device. Examples of the input interface include a remote controller, a tablet terminal, a smartphone, and a keyboard, a mouse, a camera, and a microphone of a personal computer. Broadband transmitter and receiver 41 outputs input details received from the input interface to manipulation input section 42 or controller 51. The content presenting device and the input interface may be either an identical device or different devices.

Manipulation input section 42 acquires a control signal from the external input interface or the built-in input interface in response to a viewer's manipulation with the input interface, and transmits the control information corresponding to the acquired control signal to controller 51. Examples of the input interface include a remote controller, a tablet terminal, a smartphone, and a keyboard, a mouse, a camera, and a microphone of a personal computer. For example, the viewer's manipulation with the input interface means pressdown of a button physically disposed or virtually disposed on a screen, a gesture, a manipulation by sound, and a combination thereof. The control signal may be input from the input interface to manipulation input section 42 through broadband transmitter and receiver 41, or directly input from the input interface to controller 51 through broadband transmitter and receiver 41. In the case that the control signal is directly input from the input interface to controller 51 through broadband transmitter and receiver 41, reception device 1 does not need to include manipulation input section 42.

Controller 51 generates a reference clock signal using the PCR output from separator 12. For example, the generated reference clock signal is used to control output timing of buffers 13 and 22.

Using the PTS output from decoder 14, controller 51 generates the control information in order to match the output timing of each piece of content (such as the video content and audio content) transmitted through the broadcast, and outputs the control information to PES buffer 71 of buffer 13. Using the PTS output from decoder 23, controller 51 generates the control information in order to match the output timing of each piece of content (such as the video content and the audio content) transmitted through the broadband, and outputs the control information to PES buffer 71 of buffer 22.

Controller 51 calculates the delay time between the broadcast content and the broadband content using the PTS output from decoder 14 and the PTS output from decoder 23. Controller 51 generates the control information in order to match the output timing of the broadcast content to the output timing of the broadband content based on the calculated delay time, and outputs the control information to synchronizing buffers 72 of buffers 13 and 22. Controller 51 provides content generator 31 with instruction about announcement (synchronous presentation announcement) to the viewer relating to the synchronization between the broadcast content and the broadband content.

For example, the synchronous presentation announcement means announcement of generation of discontinuous video presentation to the viewer in switching normal presentation (described later) of the broadcast content to delay presentation (described later), or announcement of generation of video overlapping presentation to the viewer. The synchronous presentation announcement including is described later with reference to a specific example.

A configuration example of buffers 13 and 22 will be described below with reference to FIG. 2. Because buffers 13 and 22 have the identical configuration, buffers 13 and 22 are collectively described.

Figure 2:
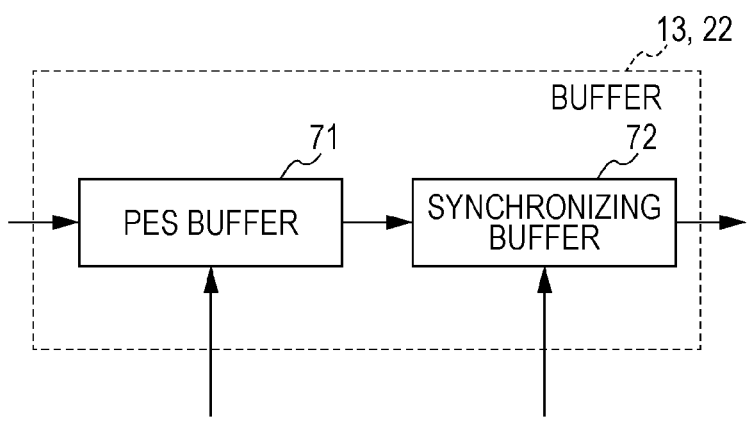
FIG. 2 is a block diagram illustrating a configuration example of buffers 13 and 22 in FIG. 1.

FIG. 2 is a block diagram illustrating a configuration example of buffers 13 and 22 in FIG. 1.

Each of buffers 13 and 22 includes PES buffer 71 and synchronizing buffer 72.

PES buffer 71 is used to match the output timing of each piece of content such as the video content and the audio content. PES buffer 71 converts each piece of content such as the video content and the audio content into the PES packet, and outputs the content data in units of PESs at the output timing indicated by the control information from controller 51.

Synchronizing buffer 72 is used to match the output timing between the broadcast content and the broadband content. Synchronizing buffer 72 outputs the content data in units of PESs at the timing indicated by the control information from controller 51.

PES buffer 71 and synchronizing buffer 72 can output the content data in units of PESs with any delay time and at any output timing, and the delay time and the output timing are completely indicated by controller 51.

A synchronous presentation method in which the broadcast content and the broadband content are presented while the output timing of the broadcast content is matched to the output timing of the broadband content will be described below.

The broadcast and broadband cooperation service includes a method for controlling the broadcast and broadband cooperation by an application such as HTML5 and a method for controlling the broadcast and broadband cooperation with no use of the application. In the following description, by way of example, the broadcast and broadband cooperation service is provided by the application. The application may be an HTML5 application or a resident application of a receiving apparatus. The resident application or a part of a function of the receiving apparatus may be provided as the API, and controlled by another application such as HTML5.

The broadcast and broadband cooperation service includes a dependent type service in which the application links with the AV content and an independent type service in which the application does not link with the AV content. There are various pieces of broadband content.

A use case in which the broadband content linking with the broadcast content is presented in the dependent type service linking with the broadcast content is considered in the following description. It is assumed that the broadband content is multicast distribution of real-time live video in which the packet cannot previously be acquired.

Figure 3:
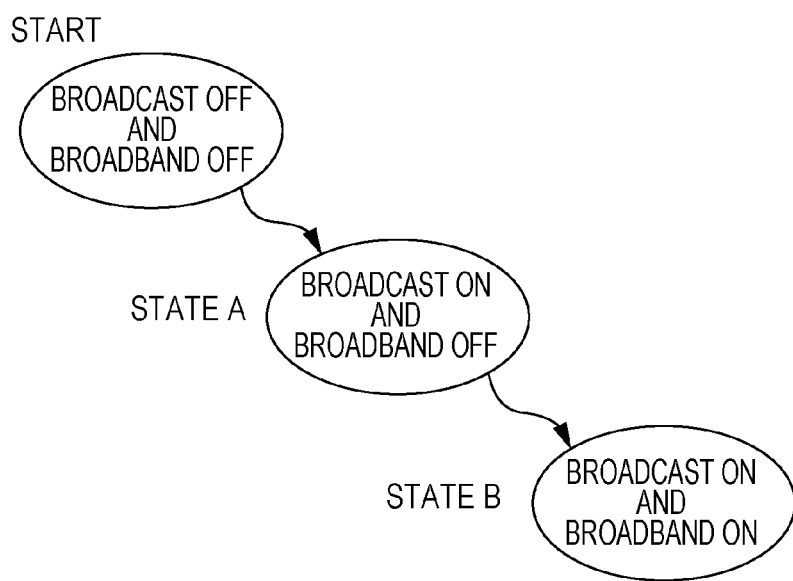
FIG. 3 is a view illustrating an example of a state transition of content presentation in reception device 1 of FIG. 1.

FIG. 3 illustrates an example of a state transition of the content presentation in reception device 1, and FIG. 3 is used to explain a specific example of the method for synchronously presenting the broadcast content and the broadband content.

In the state transition diagram of FIG. 3, reception device 1 is started from a power-off state (a state of broadcast off and broadband off). By turning to the broadcast content presentation-on state, reception device 1 makes a transition from the state of broadcast off and broadband off to a state in which only the broadcast content is presented (a state of broadcast on and broadband off). By turning to the broadband content presentation-on state, reception device 1 makes the transition from the state of broadcast on and broadband off to a state in which both the broadcast content and the broadband content are presented (a state of broadcast on and broadband on).

Hereinafter, "the state of broadcast on and broadband off" is defined as a "state A", and "the state of broadcast on and broadband on" is defined as a "state B". A period until the transition is completed since the transition from the "state A" to the "state B" is decided is defined as a "transition period".

The broadcast and broadband cooperation service is provided on the assumption that the application is activated. Therefore, in the case that the application is not activated in providing the broadcast and broadband cooperation service, it is necessary to activate the application. In order to provide only the broadcast service, the application is not necessarily activated.

For example, in the transition from the state A to the state B, it is necessary to activate the application in the case that the application is not activated in the state A. At this point, the application is activated based on the AIT included in the broadcast signal.

Examples of application activation timing include the case that the viewer explicitly specifies the application activation timing based on the AIT stored in the broadcast content or broadband content and the case that the application is automatically activated by linking with the content based on AIT application activation information. Examples of application termination timing include the case that the viewer explicitly specifies the application termination timing based on the AIT stored in the broadcast content or broadband content and the case that the application is automatically terminated by linking with the content based on AIT application termination information.

Examples of a method for putting the broadband content into the on state during the presentation of the broadcast content include a method for explicitly specifying the on state of the broadband content by the viewer based on the AIT stored in the broadcast content and a method for automatically activating the broadband content based on the AIT stored in the broadcast content.

In general, because the reception of the broadband content is largely delayed compared with the reception of the broadcast content, the broadband content is received while delayed with respect to the broadcast content on the reception side in the case that the live video is transmitted through the broadcast and broadband.

In order to start the presentation of the broadband content during the presentation of the broadcast content, and in order to present synchronously present the broadcast content and the broadband content, it is necessary that the broadcast content be presented while delayed.

An example of the method for synchronously presenting the broadcast content and the broadband content in the state transition of the content presentation in FIG. 3 will be described with reference to FIGS. 4 and 5.

Figure 4:
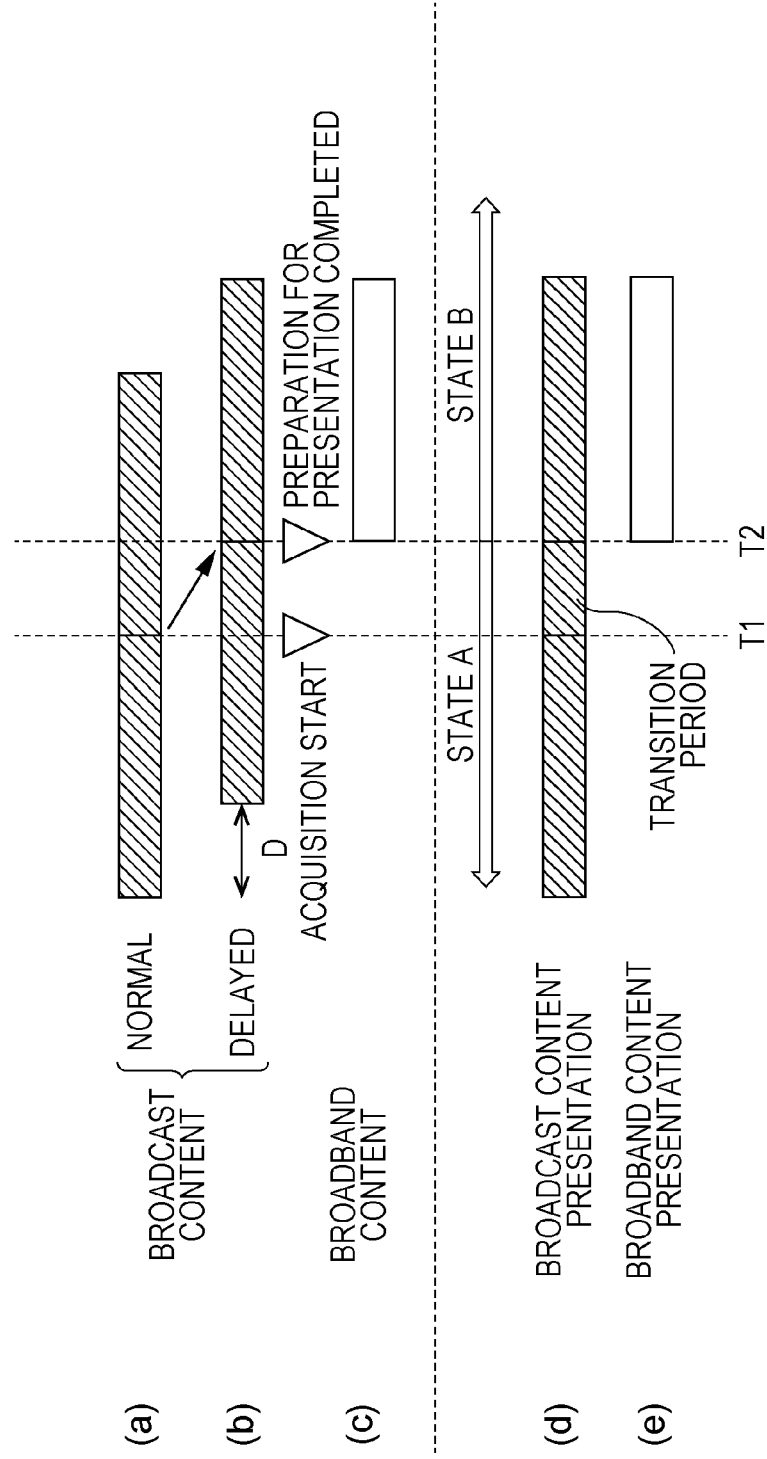
FIG. 4 is a view illustrating a signal image for explaining an example of the method for synchronously presenting the broadcast content and the broadband content in the content presentation state transition of FIG. 3.

FIG. 4 is a view illustrating a signal image for explaining an example of the method for synchronously presenting the broadcast content and the broadband content in the content presentation state transition of FIG. 3.

FIG. 4(a) illustrates a time signal of the broadcast content with no delay. The case that the broadcast presentation is performed using the time signal in FIG. 4(a) is defined as "normal presentation".

FIG. 4(b) illustrates a time signal of the delayed broadcast content. The case that the broadcast presentation is performed using the time signal in FIG. 4(b) is defined as "delay presentation". "D" in FIG. 4(b) indicates the delay time of the reception clock time of the broadband content to the reception clock time of the broadcast content.

FIG. 4(c) illustrates a time signal of the broadband content.

FIG. 4(d) illustrates a time signal of the actually-presented broadcast content.

FIG. 4(e) illustrates a time signal of the actually-presented broadband content.

Reception device 1 performs normal presentation of the broadcast content in a period to clock time T1 at which the broadband content acquisition is started and a period from clock time T1 to clock time T2 at which the preparation for the broadband content presentation is completed, namely, until the transition from the state A to the state B is completed.

Reception device 1 presents the broadband content while performing delay presentation of the broadcast content in the period after clock time T2 at which the preparation for the broadband content presentation is completed, namely, after the transition from the state A to the state B is completed.

Thus, the presentation of the broadcast content is switched from the normal presentation to the delay presentation at the timing to complete the transition from the state A to the state B. Therefore, the presentation of the broadcast content becomes discontinuous video presentation and the like at the timing to complete the transition from the state A to the state B. For a while after the delay presentation is started, the presentation of the broadcast content becomes the overlapping presentation such as the video identical to the video presented once in the normal presentation. Possibly the discontinuous video presentation or the video overlapping presentation gives an uncomfortable feeling to the viewer, and occasionally gives discomfort to the viewer.

Therefore, reception device 1 provides announcement (synchronous presentation announcement) relating to the synchronization between the broadcast content and the broadband content to the viewer during a broadcast content overlapping presentation period (for example, a message that "the overlapping presentation of the broadcast content is performed in order to synchronize the broadcast content with the broadband content" is presented in presentation section 5).

The performance of the synchronous presentation announcement allows the viewer to understand a reason of the discontinuous video presentation or the video overlapping presentation, and the uncomfortable feeling or discomfort given to the viewer can be relaxed.

Figure 5:
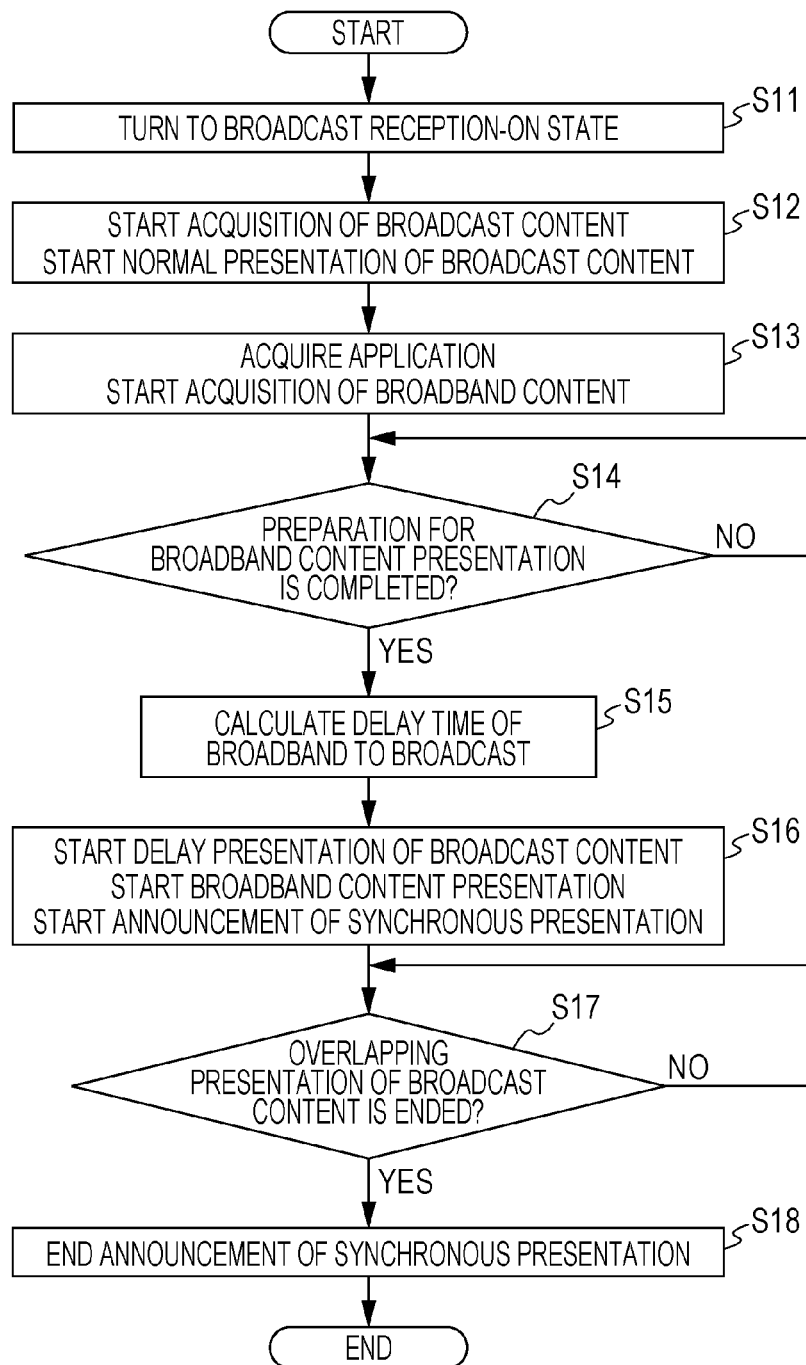
FIG. 5 is a flowchart illustrating an example of processing operation of the method for synchronously presenting the broadcast content and the broadband content in reception device 1 of FIG. 1.

FIG. 5 is a flowchart illustrating an example of processing operation of the method for synchronously presenting the broadcast content and the broadband content by reception device 1 in the content presentation state transition of FIG. 3. At a time point the flowchart in FIG. 5 is started, reception device 1 is in a power-off state (the state of broadcast off and broadband off).

By turning to the broadcast content presentation-on state, reception device 1 makes the transition from the power-off state (the state of broadcast off and broadband off) to the state of broadcast on and broadband off (state A) (Step S11). Reception device 1 starts the broadcast content acquisition, and starts the normal presentation of the broadcast content (Step S12).

Reception device 1 starts the broadband content acquisition in response to the application acquisition (Step S13).

Reception device 1 determines whether the preparation for the broadband content presentation is completed (Step S14). The processing in Step S14 is performed until the preparation for the broadband content presentation is completed (No in S14). The processing in Step S15 is started when the preparation for the broadband content presentation is completed (Yes in S14). For example, the determination that the preparation for the broadband content acquisition is completed is made when the content data of the broadband content of a predetermined amount is stored in buffer 22.

In reception device 1, controller 51 compares the PTS of the decoded broadcast content to the PTS of the broadband content to calculate the delay time of the broadband content to the broadcast content (Step S15).

Controller 51 generates the control information in order to match the output timing of the broadcast content to the output timing of the broadband content based on the delay time calculated in Step S15, and outputs the control information to synchronizing buffers 72 of buffers 13 and 22. Synchronizing buffer 72 of buffer 13 delays buffer output based on the delay time calculated in Step S15 according to the control information, and synchronizing buffer 72 of buffer 22 performs buffer output according to the control information. Thus, reception device 1 switches the broadcast content presentation from the normal presentation to the delay presentation to start the delay presentation, and starts the broadband content presentation at the same time. Controller 51 instructs content generator 31 to present a synchronous presentation announcement message (for example, "the overlapping presentation of the broadcast content is performed in order to synchronize the broadcast content and the broadband content with each other"), and content generator 31 starts the presentation of the synchronous presentation announcement message in presentation section 5 based on the instruction (Step S16).

Controller 51 determines whether the overlapping presentation of the broadcast content is ended based on the delay time calculated in Step S15 (Step S17). The processing in Step S17 is performed until the overlapping presentation of the broadcast content is completed (No in S17). When the overlapping presentation of the broadcast content is ended (Yes in S17), controller 51 instructs content generator 31 to end the presentation of the synchronous presentation announcement message, and content generator 31 ends the presentation of the message for announcing synchronization in presentation section 5 based on the instruction (Step S18).

(Supplements of First Exemplary Embodiment)

Supplements of the first exemplary embodiment will be described below.

(1) In the first exemplary embodiment, the method for synchronously presenting the broadcast content and the broadband content is described by way of example. However, the synchronous presentation method is not limited to the method of the first exemplary embodiment.

Figure 6:
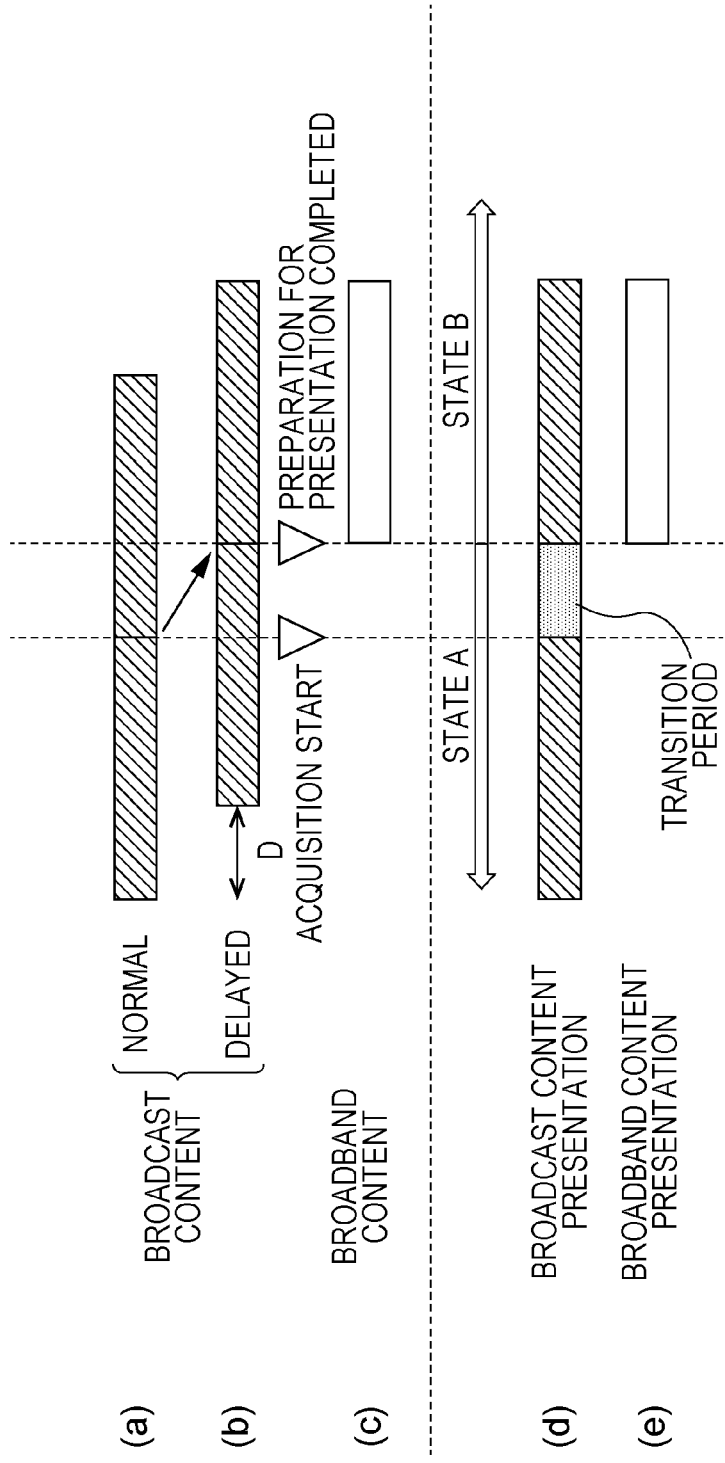
FIG. 6 is a view illustrating a signal image for explaining another example of the synchronous presentation method.

FIG. 6 is a view illustrating a signal image for explaining another example of the synchronous presentation method, and for example, the synchronous presentation method in FIG. 6 may be adopted. The time signals in (a) to (e) of FIG. 6 are similar to those in (a) to (e) of FIG. 4.

In the synchronous presentation method of FIG. 4, the normal presentation of the broadcast content is performed in the state transition period, namely, in the period until the preparation for the broadband content presentation is completed since the broadband content acquisition is started.

On the other hand, in the synchronous presentation method of FIG. 6, the broadcast content presentation is interrupted to black out the screen of presentation section 5 in the state transition period, namely, in the period until the preparation for the broadband content presentation is completed since the broadband content acquisition is started. At the same time, reception device 1 presents a message in presentation section 5 to the viewer for the purpose of the synchronous presentation announcement. For example, the message indicates that reception device 1 is in a standby state for the synchronization between the broadcast content and the broadband content.

Figure 7:
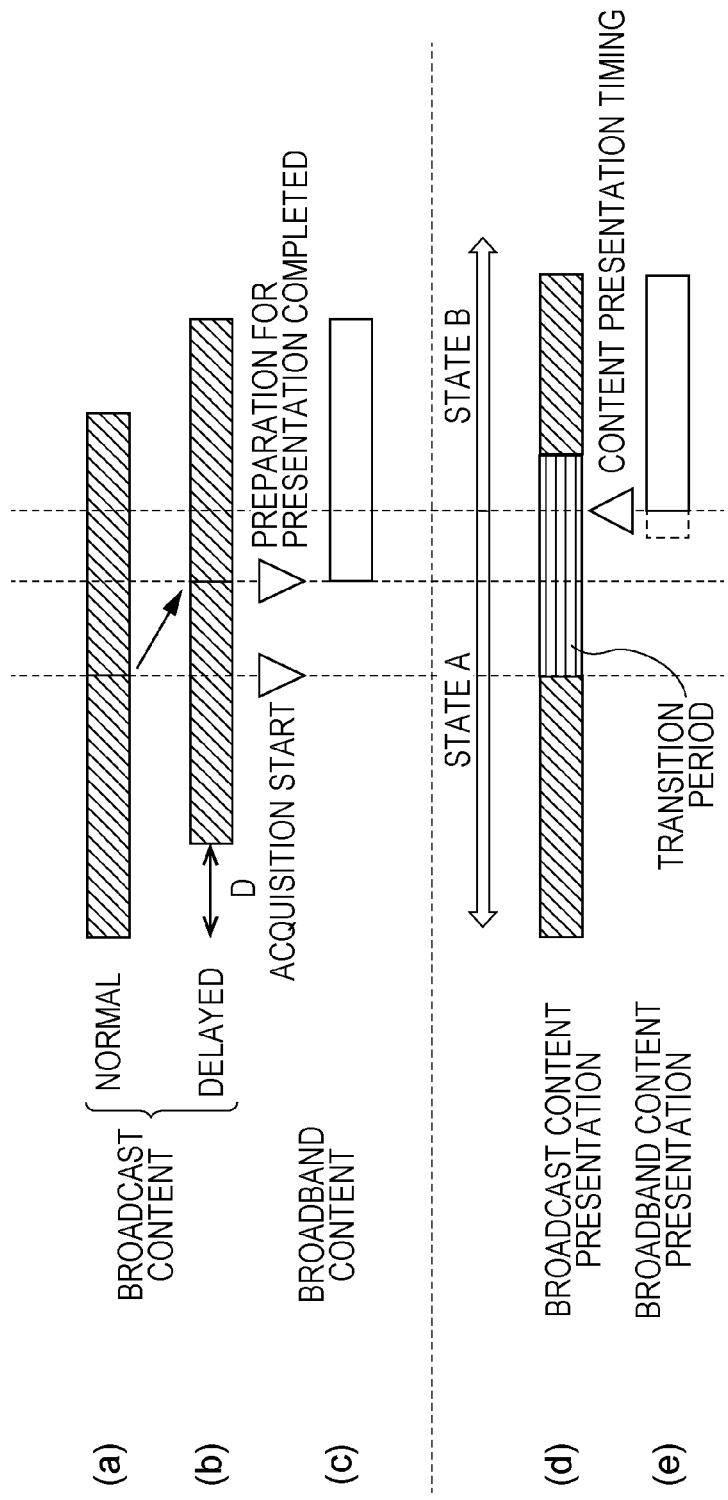
FIG. 7 is a view illustrating a signal image for explaining still another example of the synchronous presentation method.

Various synchronous presentation methods can be performed by changing a buffer clock timing control method or presentation timing. FIG. 7 is a view illustrating a signal image for explaining still another example of the synchronous presentation method, and for example, the synchronous presentation method in FIG. 7 may be adopted. The time signals in (a) to (e) of FIG. 7 are similar to those in (a) to (e) of FIG. 4.

In the synchronous presentation method of FIG. 7, reception device 1 starts slow playback of the broadcast content in response to the broadband content acquisition, and makes the transition to the state in which the delay presentation of the broadcast content and the broadband content presentation are performed while the completion of the preparation for the broadband content presentation is compared to the playback time of the broadcast content. At the same time, reception device 1 presents a message in presentation section 5 to the viewer for the purpose of the synchronous presentation announcement. For example, the message indicates that reception device 1 currently performs the slow playback of the broadcast content for the synchronization between the broadcast content and the broadband content. The slow playback can be performed by widening a time interval of the buffer output. The delay is gradually adjusted by the slow playback of the broadcast content, and the broadcast content and the broadband content are synchronously presented when the delay adjustment is completed to match the broadcast content presentation clock time to the broadband content presentation clock time. In this case, the clock time at which the preparation for the broadband presentation is completed is not matched to the synchronous presentation timing.

Controller 51 controls the playback timing and the clock. Controller 51 outputs the proper presentation or the presentation timing to content generator 31 according to the synchronous presentation method.

In the synchronous presentation method of FIG. 7, when the broadcast content and the broadband content are synchronously presented, the broadcast content and the broadband content can more smoothly be presented.

Figure 8:
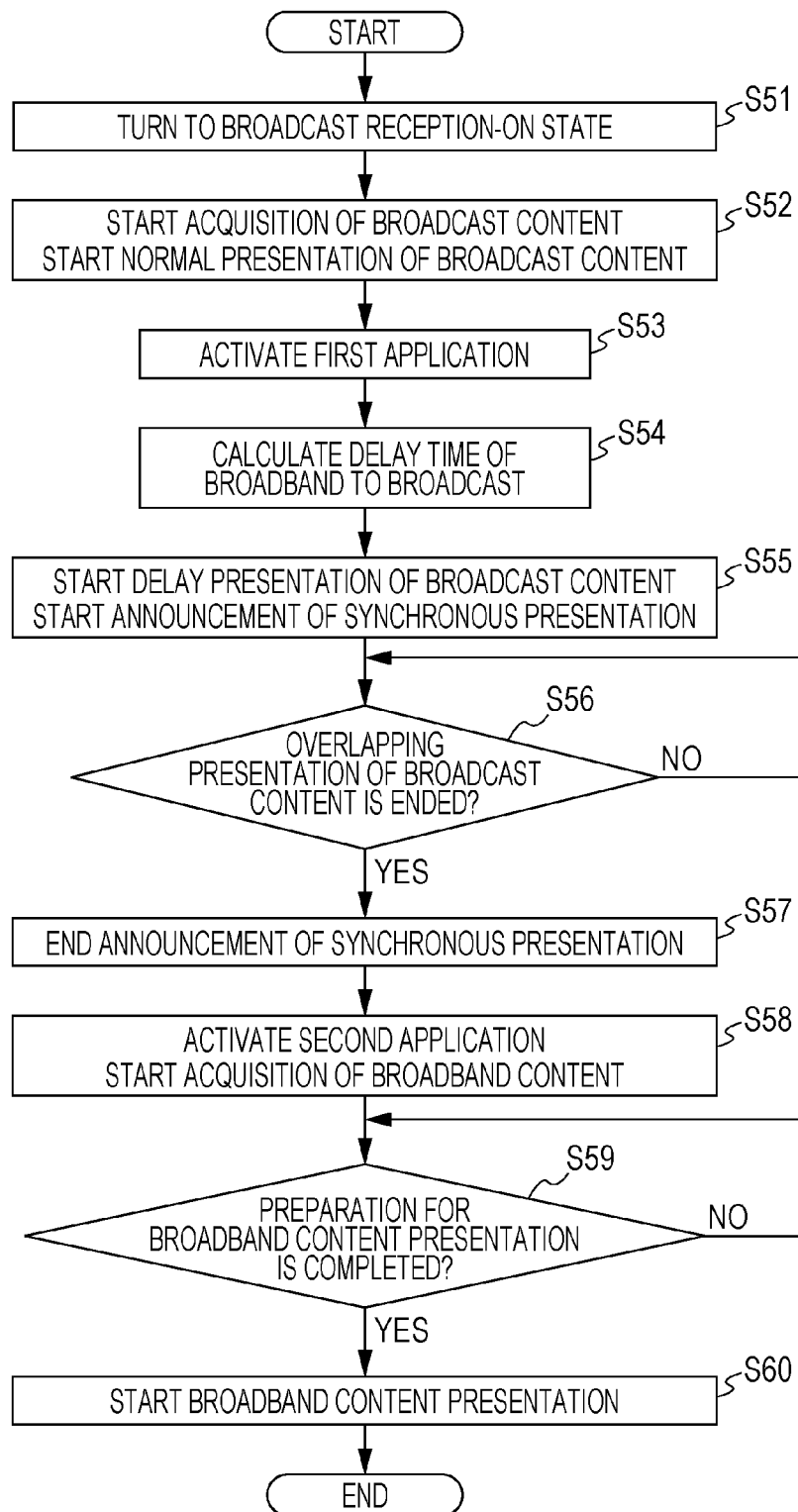
FIG. 8 is a flowchart illustrating another example of the processing operation of the synchronous presentation method.

(2) In the synchronous presentation method of the first exemplary embodiment, the broadcast content presentation is switched from the normal presentation to the delay presentation in response to the completion of the preparation for the broadband content. Alternatively, for example, the broadcast content may previously be presented while delayed. This example will be described with reference to a flowchart in FIG. 8. At the time point the flowchart in FIG. 8 is started, reception device 1 is in a power-off state (the state of broadcast off and broadband off).

By turning to the broadcast content presentation-on state, reception device 1 makes the transition from the power-off state (the state of broadcast off and broadband off) to the state of broadcast on and broadband off (Step S51). Reception device 1 starts the broadcast content acquisition, and starts the normal presentation of the broadcast content (Step S52).

In the normal presentation of the broadcast content, reception device 1 activates an application for performing the delay presentation of the broadcast content (hereinafter, referred to as a "delay presentation application") as a first application (Step S53). Examples of the broadcast delay presentation timing include timing specified by the viewer, timing specified by the broadcast organization or other business operators using the broadband or broadcast AIT, and timing specified by an application acquired based on the AIT.

In reception device 1, after the delay presentation application is activated, controller 51 acquires the broadband content, and compares the PTS of the decoded broadcast content to the PTS of the broadband content to calculate the delay time of the broadband content to the broadcast content (Step S54).

Controller 51 controls output delay of synchronizing buffer 72 of buffer 13 based on the delay time calculated in Step S54, whereby reception device 1 switches the broadcast content presentation from the normal presentation to the delay presentation to start the delay presentation. Controller 51 instructs content generator 31 to present a synchronous presentation announcement message (for example, "the overlapping presentation of the broadcast content is performed in order to synchronize the broadcast content and the broadband content with each other"), and content generator 31 starts the presentation of the synchronous presentation announcement message in presentation section 5 based on the instruction (Step S55).

Controller 51 determines whether the overlapping presentation of the broadcast content is ended based on the delay time calculated in Step S54 (Step S56). The processing in Step S56 is performed until the overlapping presentation of the broadcast content is completed (No in S56). When the overlapping presentation of the broadcast content is ended (Yes in S56), controller 51 instructs content generator 31 to end the presentation of the synchronous presentation announcement message, and content generator 31 ends the presentation of the synchronous presentation announcement message in presentation section 5 based on the instruction (Step S57).

In the state of broadcast on and broadband off and in the delay presentation of the broadcast content, reception device 1 starts a second application and therefore starts the broadband content acquisition (Step S58).

Reception device 1 determines whether the preparation for the broadband content presentation is completed (Step S59). The processing in Step S59 is performed until the preparation for the broadband content presentation is completed (No in S59). When the preparation for the broadband content presentation is completed (Yes in S59), reception device 1 starts the broadband content presentation (Step S60).

For a program having a possibility of the delay presentation, the synchronous presentation of the broadcast content and the broadband content can smoothly be performed by previously performing the delay presentation of the broadcast content at timing of, for example, the starting of the broadcast reception, the tuning, or CM (Commercial Message) timing, at which the viewer has the small uncomfortable feeling.

For example, the synchronous presentation announcement message does not need to be presented depending on timing at which the delay presentation of the broadcast content is disclosed (for example, in the starting of the broadcast reception or the tuning)

(3) In the synchronous presentation method of the first exemplary embodiment, the details and period of the announcement (synchronous presentation announcement) relating to the synchronous presentation of the broadcast content and the broadband content to the viewer are described by way of example.

The synchronous presentation announcement including the details described in the first exemplary embodiment will be described below.

Examples of the details of the synchronous presentation announcement include the presentation of the message relating to the synchronous presentation of the broadcast content and the broadband and the presentation of the discontinuous video animation.

Specifically, for example, the presentation is performed as follows.

A message, an icon, or the like indicating the set synchronous presentation method to the viewer is displayed.

A message, an icon, or the like indicating that discontinuous video display will be generated or already generated to the viewer is displayed.

A message, an icon, or the like indicating that the overlapping presentation of the video is performed to the viewer is displayed.

An animation function is inserted between videos in order to eliminate the discontinuous display.

Other examples than the message or icon display include telop display and audio output. The presentation may be performed using an external device.

Examples of the synchronous presentation announcement timing or period include the period during which the overlapping presentation of the broadcast content is performed, the period until the overlapping presentation of the broadcast content is ended since the broadband content acquisition is started, the application activation timing, the timing at which the preparation for the broadband content is completed, and the timing or period according to an even of reception device 1. The timing of an interface manipulation performed by the viewer is also included in the example of the synchronous presentation announcement timing or period. The synchronous presentation announcement may be performed only while the viewer permits the synchronous presentation announcement.

For example, controller 51 decides the details, timing, or period of the synchronous presentation announcement according to the synchronous presentation method specified by the application, a predetermined rule, or the setting of the reception device, and instructs content generator 31 on the details, timing, or period of the synchronous presentation announcement. Content generator 31 performs the synchronous presentation announcement according to the details decided in the timing or period decided in response to the instruction of controller 51. The setting of the reception device may, but not necessarily, be determined by the viewer.

The broadcast organization, a business operator relating to the broadcast organization, or other business operators may issue the instruction of the details, timing, or period of the synchronous presentation announcement according to the content by embedding a control signal indicating the details, timing, or period of the synchronous presentation announcement in the broadcast or broadband.

(4) In the first exemplary embodiment, the broadband content acquisition timing is identical to the application acquisition timing. Alternatively, the broadband content acquisition timing may be different from the application acquisition timing. For example, the broadband content acquisition timing follows the instruction of the application.

(5) In the first exemplary embodiment, by way of example, the state transition of reception device 1 is described as illustrated in FIG. 3. However, the state transition is not limited to that in FIG. 3 but may be as follows.

It is necessary for reception device 1 to delay the broadcast content even in the state transition from the state in which the normal presentation of the broadcast content is provided while an independent broadband application that does not link with the content is currently activated (a state of broadcast on, broadband independent application on, and linkage application off) to a state in which an application linking with the broadcast is activated (a state of broadcast on, broadband independent application on, and linkage application on). This case can also be applied with the synchronous presentation methods substantially identical to those of the first exemplary embodiment and the supplements of the first exemplary embodiment or the synchronous presentation announcement substantially identical to those of the synchronous presentation method.

(6) In the first exemplary embodiment or the supplement (2) of the first exemplary embodiment, the delay time between the broadcast content and the broadband content is calculated using the PTS output after the decoding. Alternatively, the delay time may be calculated using the DTS, or the delay time may be calculated using both the PTS and the DTS. The delay time may also be calculated using the pre-decoding PTS or DTS. The delay time may also be calculated using PCR, a clock (STC) generated based on the PCR, the PTS, or the DTS. In the case that the reference clock is an NTP, the delay time may be calculated using the NTP. In the case that different reference clocks are used in the broadcast content and the broadband content, the delay time may be calculated using timeline auxiliary information indicating a correspondence relationship between the respective reference clocks.

The buffer control timing is calculated in consideration of a site where the PTS or DTS is calculated or a buffer position. The following configuration can be used as an example in which the site where the PTS or DTS is calculated or the buffer position varies.

In the first exemplary embodiment, decoder 14 extracts the PTS or DTS. Alternatively, the conversion of the PES packet into the ES and the extraction of the PTS or DTS may be processed by not decoder 14 but PES buffer 71 of buffer 13. In this case, desirably the positions of PES buffer 71 and synchronizing buffer 72 are replaced with each other in buffer 13. PES buffer 71 outputs the extracted PTS or DTS to controller 51. At the timing indicated by controller 51, PES buffer 71 outputs the content data of each component such as the video and the audio to one of or both decoder 14 and broadband transmitter and receiver 41. Similarly, the conversion of the PES packet into the ES and the extraction of the PTS or DTS may be processed by not decoder 23 but PES buffer 71 of buffer 22. In this case, desirably the positions of PES buffer 71 and synchronizing buffer 72 are replaced with each other in buffer 22. PES buffer 71 outputs the extracted PTS or DTS to controller 51. At the timing indicated by controller 51, PES buffer 71 outputs the content data of each component such as the video and the audio to one of or both decoder 23 and broadband transmitter and receiver 41. The above configuration is equal to a configuration of a second exemplary embodiment, and PES buffer 71 in FIG. 2 corresponds to separation buffer 114 in FIGS. 14 and 18.

(7) In the first exemplary embodiment, at the timing indicated by controller 51, the content data of each component such as the video and the audio is output to broadband transmitter and receiver 41 in units of PES packets, and broadband transmitter and receiver 41 transmits the content data and the data received from controller 51 to the content presenting device. More specifically, in broadband transmitter and receiver 41, an access unit of each component such as the video and the audio, the PES packet, and the control information or clock information input from controller 51 are re-multiplexed using a specific multiplexing scheme, and transmitted to the cooperation terminal. Examples of the multiplexing scheme include MP4, MPEG2-TS, MPEG-DASH, and MMT.

(8) In the first exemplary embodiment, the broadband content is delayed by a constant time with respect to the broadcast content. It is also conceivable that the broadcast content is delayed with respect to the broadband content. In this case, the broadcast content is presented in one pattern of the normal presentation, and the broadband content is presented in two patterns of the normal presentation and delay presentation. Except for this point, this case can also be applied with the synchronous presentation methods substantially identical to those of the first exemplary embodiment and the supplements of the first exemplary embodiment or the synchronous presentation announcement substantially identical to those of the synchronous presentation method.

In the first exemplary embodiment, the broadband content is delayed by a constant time with respect to the broadcast content. For example, in the case that the delay time of the broadband content to the broadcast content is not kept constant by an influence of transmission jitter in a broadband transmission channel, the broadcast content and the broadband content are synchronously presented by properly controlling the buffer.

(9) Although the transition from the state of broadcast on and broadband off to the state of broadcast on and broadband on is described in the first exemplary embodiment, there is also a transition from the state of broadcast on and broadband on to the state of broadcast on and broadband off.

The discontinuous presentation of the broadcast content or a partial lack of the broadcast content presentation is generated in the case that the broadcast content presentation is switched from the delay presentation to the normal presentation in the transition from the state of broadcast on and broadband on to the state of broadcast on and broadband off.

For this reason, reception device 1 may perform the synchronous presentation announcement having such details that the discontinuous presentation of the broadcast content or the partial lack of the broadcast content presentation is generated to the viewer.

Controller 51 decides the details, timing, or period of the synchronous presentation announcement, and instructs content generator 31 on the details, timing, or period of the synchronous presentation announcement. Content generator 31 provides the announcement having the indicated details at the indicated timing or period.

(10) In the first exemplary embodiment, the broadcast content and the broadband content are synchronously presented using reception device 1 in FIG. 1.

Figure 9:
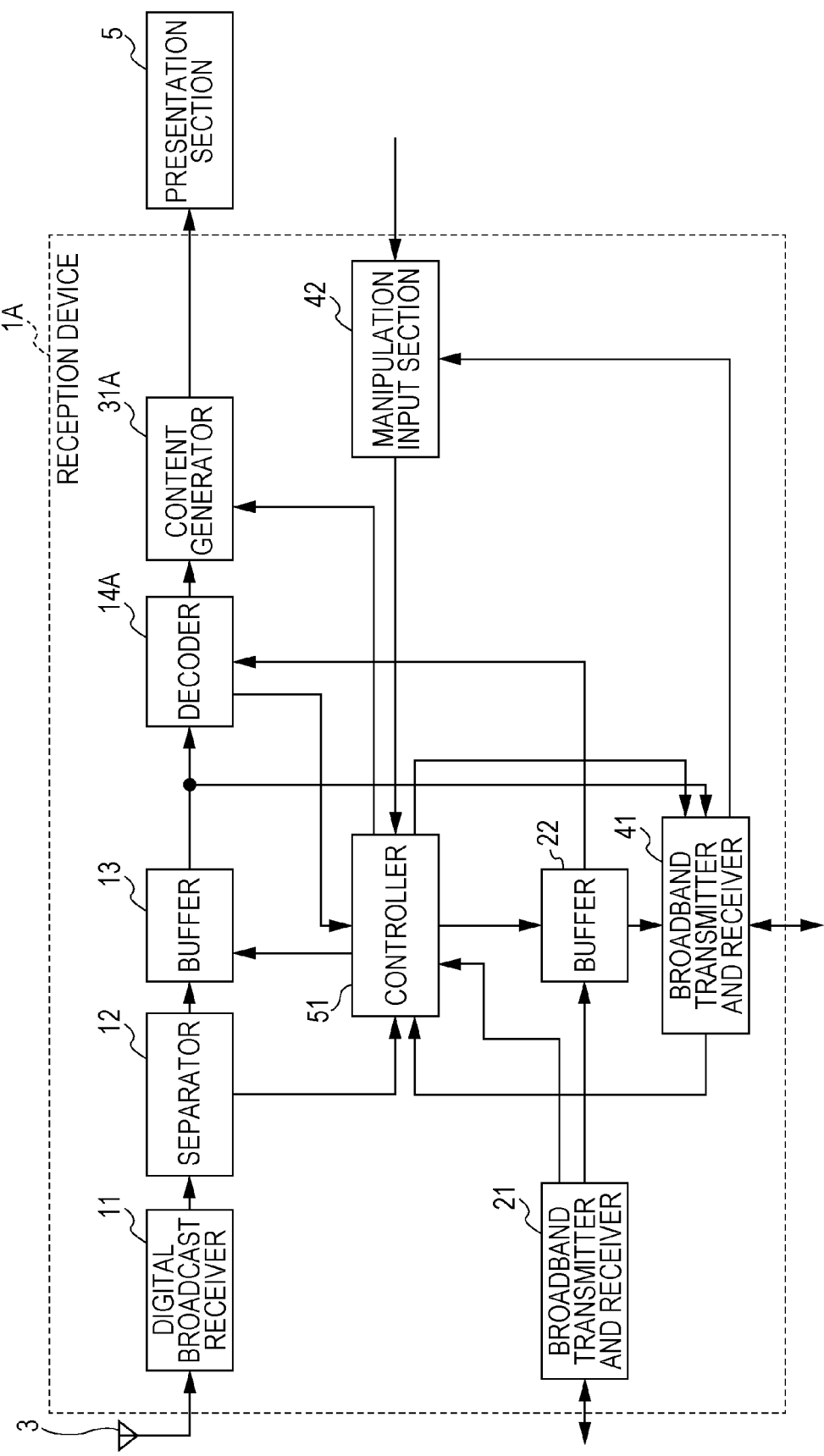
FIG. 9 is a block diagram illustrating a configuration of reception device 1A according to a modification of the first exemplary embodiment.

Alternatively, for example, in the case that one piece of content is transmitted through two different transmission channels, the reception device can have a configuration in FIG. 9 in which the pieces of content received from the two transmission channels are synchronously decoded by one decoder. In FIG. 9, a constituent unit that performs the processing substantially identical to that of the constituent unit in FIG. 1 is designated by the identical reference mark.

In reception device 1A of FIG. 9, the outputs of buffers 13 and 22 are input to decoder 14A, and decoder 14A decodes the input data from each of buffers 13 and 22, and outputs the decoded data to content generator 31A. The output of decoder 14A is input to content generator 31A, and content generator 31A generates service presentation content according to the instruction of controller 51 using the input data.

Figure 10:
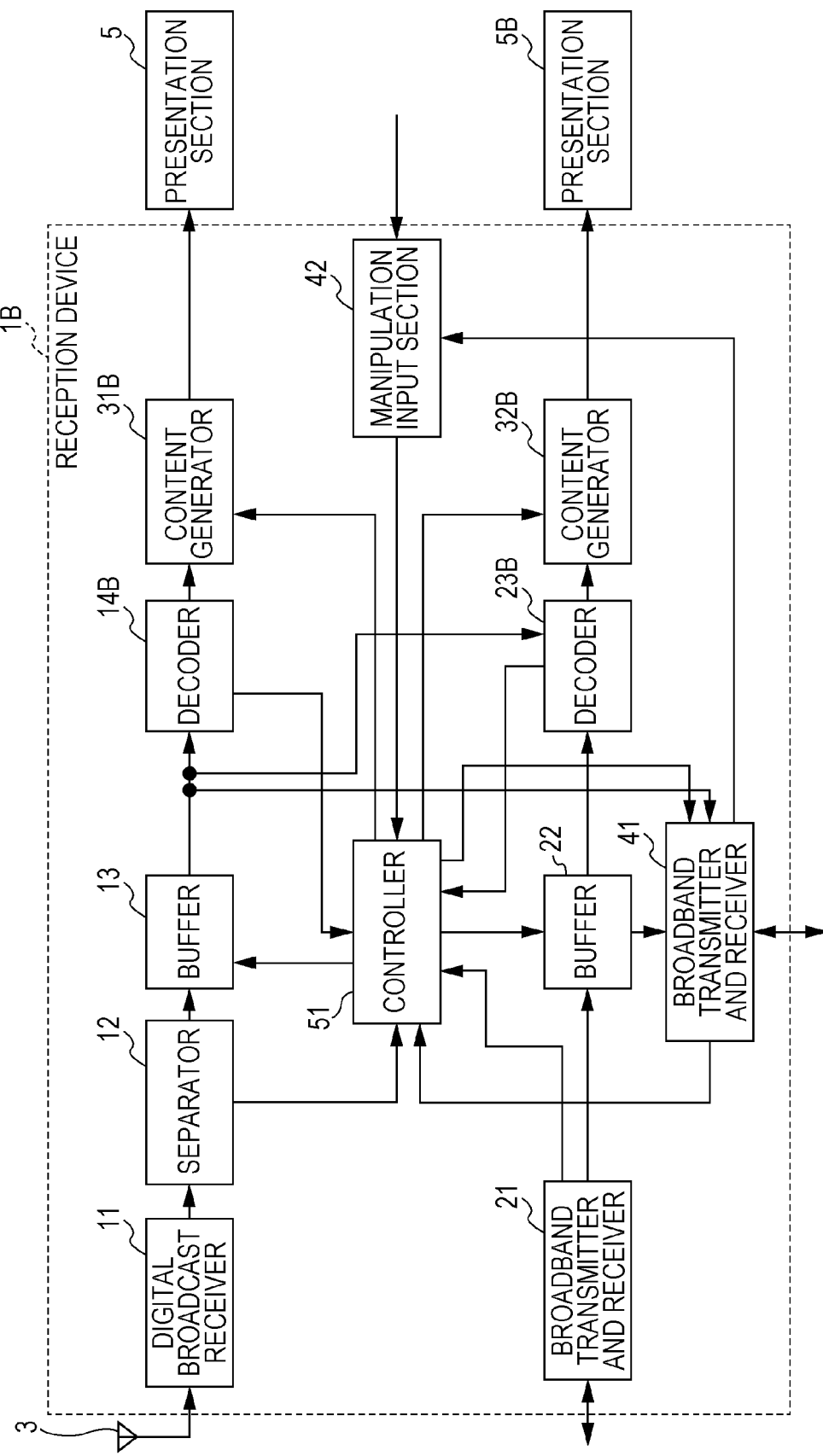
FIG. 10 is a block diagram illustrating a configuration of reception device 1B according to another modification of the first exemplary embodiment.

In the case that main video is transmitted through the broadcast while extended information is transmitted through the broadband, for example, the reception device can have a configuration in FIG. 10 in which the main video is decoded by one of decoders while the main video and the extended video are decoded by the other decoder. In FIG. 10, a constituent unit that performs the processing substantially identical to that of the constituent unit in FIG. 1 is designated by the identical reference mark.

In reception device 1B of FIG. 10, the output of buffer 13 is input to decoder 14B, and decoder 14B decodes the input data, and outputs the decoded data to content generator 31B. The output of decoder 14B is input to content generator 31B, and content generator 31B generates presentation content such as non-extended video according to the instruction of controller 51 using the input data, and outputs the presentation content to presentation section 5.

The outputs of buffers 13 and 22 are input to decoder 23B, and decoder 23B decodes the input data, and outputs the decoded data to content generator 32B. The outputs of decoders 14B and 23B are input to content generator 32B, and content generator 32B generates presentation content such as extended video according to the instruction of controller 51 using the input data from each of decoders 14B and 23B, and outputs the presentation content to presentation section 5B.

Both the cases of FIGS. 9 and 10 can be applied with the synchronous presentation methods substantially identical to those of the first exemplary embodiment and the supplements of the first exemplary embodiment or the synchronous presentation announcement substantially identical to those of the synchronous presentation method.

(11) Even if the time difference of the reception is generated between the broadcast and the broadband, sometimes the broadcast and the broadband are not necessarily synchronized with each other depending on the content, and there is an option that the synchronization control is not performed between the broadcast and the broadband. In this case, controller 51 may decide whether the synchronization control should be performed between the broadcast and the broadband.

The necessity of the synchronization may be decided by the reception device, or the broadcast organization, the business operator relating to the broadcast organization, or other business operators may transmit a delay tolerance defined in each piece of content using the broadcast or the broadband to the reception device. There is a method for transmitting the delay tolerance using the AIT, a method for transmitting the delay tolerance in the application specified by the AIT, or control information (SI) on the broadcast signal.

(12) In the first exemplary embodiment, the configuration of the buffer of reception device 1 is described with reference to FIGS. 1 and 2 by way of example. However, the buffer of reception device 1 is not limited to the configuration in FIGS. 1 and 2 as far as the buffer has the function equal to that of the first exemplary embodiment.

For example, desirably the buffer is disposed at a position where a memory size can be decreased as much as possible. In the first exemplary embodiment, the buffer is included in each of the functions such as the PES buffer, the synchronizing buffer, and the re-order buffer. Alternatively, one buffer may have a plurality of functions. The buffer may dynamically allocate a memory to each function, or a plurality of functions may be implemented by a common memory.

The same holds true for reception devices 1A and 1B in FIGS. 9 and 10.

(13) Although the synchronization control between the broadcast and the broadband is described in the first exemplary embodiment, the cooperating system is not limited to the cooperation of the broadcast and the broadband, but the cooperating system may be applied to the cooperation of the broadcast and the broadcast, the cooperation of the broadband and the broadband, or signal cooperation based on at least three transmission channels.

(14) In the first exemplary embodiment, the multiplexing scheme is described using the packet configuration defined by the MPEG2-TS system. However, there is no particular limitation to the multiplexing scheme. Examples of the multiplexing scheme include the MP4 and the RTP and MMT that are widely used in the streaming.

(15) For example, a service in which the reception device and a content presenting device that is a broadband terminal such as the smartphone and the tablet cooperate with each other is also proposed in the broadcast and broadband cooperation service.

In this case, it is necessary to synchronously control the content presented by reception device 1 and the content presented by the content presenting device.

Examples of this kind of service include a service in which the broadcast content is presented by the reception device while the broadband content is presented by the content presenting device.

However, the service in which the reception device and the content presenting device cooperate with each other is not limited to the above service. For example, there are (A) a service in which the broadband content is presented by the reception device while the broadcast content is presented by the content presenting device, (B) a service in which parts of the broadcast content and broadband content are presented by the reception device while a part of the broadband content is presented by the content presenting device, (C) a service in which a part of the broadcast content is presented by the reception device while a part of the broadcast content and the broadband content are presented by the content presenting device, (D) a service in which a part of the broadband content is presented by the reception device while a part of the broadband content and the broadcast content are presented by the content presenting device, (E) a service in which a part of the broadcast content and the broadband content are presented by the reception device while the broadcast content is presented by the content presenting device, and (F) a service in which parts of the broadcast content and broadband content are presented by the reception device while parts of the broadcast content and broadband content are presented by the content presenting device.

In order to provide the synchronization control between the broadcast and the broadband in the reception device and the content presenting device, it is necessary to notify the other party of the control information such as the AIT relating to the synchronization, the delay time between the PTSs, DTSs, or broadcast and the broadband, and the synchronous presentation method or synchronous presentation announcement as appropriate.

In the case that the broadcast received by the reception device and the broadband received by the tablet terminal of the cooperation terminal are synchronized with each other, it is necessary to notify the reception device of the PTS of the cooperation terminal.

In the case that the broadcast or broadband content received by the reception device is transmitted to the cooperation terminal, a burden on hardware or software of the cooperation terminal can be reduced by transmitting the data on which the synchronization control is performed by the reception device. At this point, the reception device may calculate the delay time generated in the broadband between the reception device and the content presenting device, and control the timing to output the PES packets from PES buffers 71 of buffers 13 and 22 in consideration of both the delay time of the broadband content reception clock time to the broadcast content reception clock time and the delay time generated in the broadband between the reception device and the content presenting device.

In both the cases, controller 51 decides the details, timing, or period of the synchronous presentation method or synchronous presentation announcement, and controller 51 notifies the cooperation terminal of the decided details through broadband transmitter and receiver 41 while issuing the instruction to the content generator.

(16) There are many use cases and synchronous presentation methods for synchronously presenting the broadband and the broadcast according to the content or the kind of the application.

Controller 51 has a function of being able to provide a plurality of synchronous presentation methods and a function of being able to control the presentation method relating to the synchronous presentation according to the synchronous presentation method, and presents the plurality of synchronous presentation methods selectable according to the application or content to the viewer.

The viewer selects the synchronous presentation method from the plurality of selectable synchronous presentation methods by the manipulation with the input interface. The selected synchronous presentation method is input and set to controller 51. Controller 51, manipulation input section 42, content generator 31, and presentation section 5 perform a series of operations relating to the setting while linking with one another.

Figure 11:
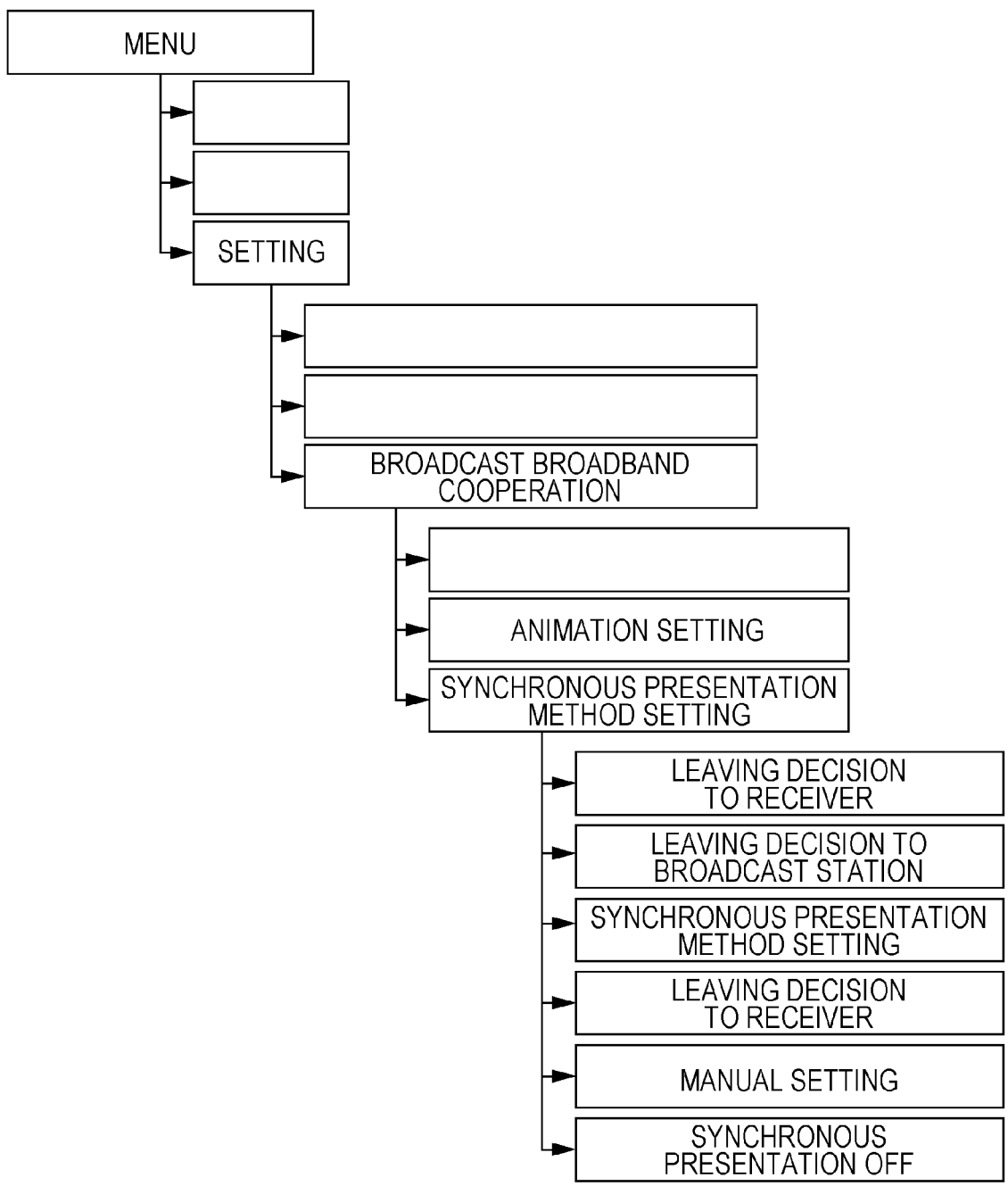
FIG. 11 is a view illustrating an example of a setting menu screen.

FIG. 11 illustrates an example of a setting menu.

In the example of FIG. 11, an animation setting and a synchronous presentation method setting can be performed as a menu of the broadcast and broadband cooperation.

In the animation setting, for example, an animation can be set used in coupling the two discontinuous videos to each other in the synchronous presentation screen transition.

Figure 12:
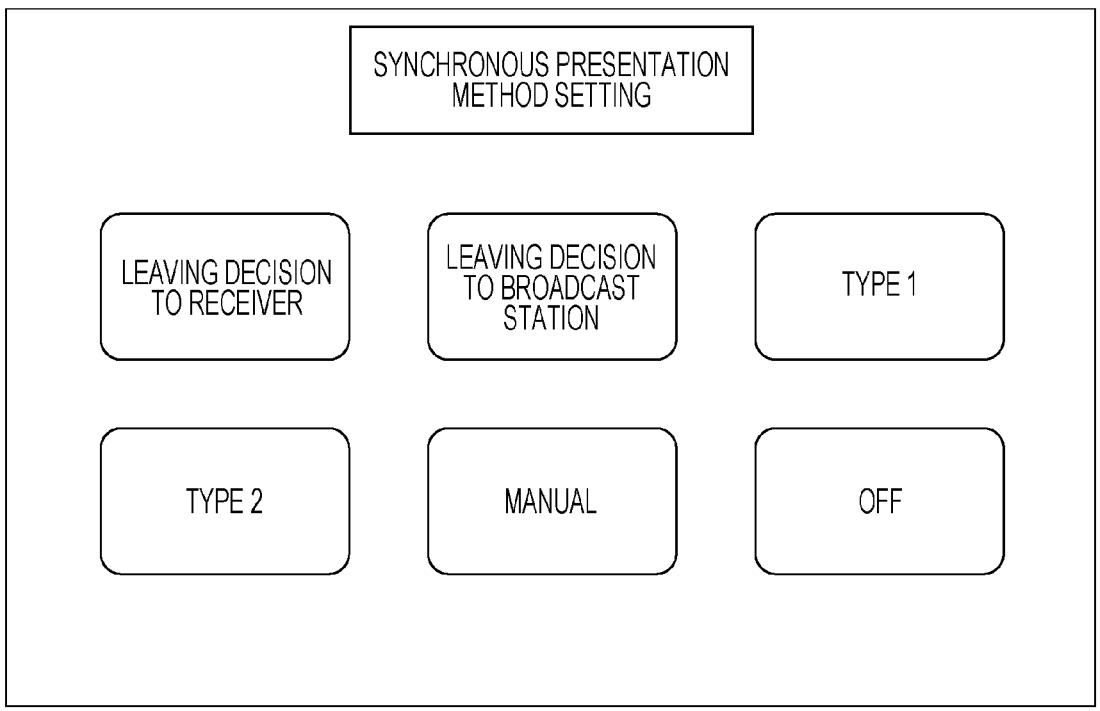
FIG. 12 is a view illustrating an example of a synchronous presentation method setting screen.

The setting relating to the synchronous presentation method can be performed in the synchronous presentation method setting. FIG. 12 illustrates an example of the setting screen of the synchronous presentation method. In the synchronous presentation method setting, for example, the viewer can select the synchronous presentation methods (Type 1 and Type 2) that can be presented to the viewer in addition to a mode leaving a decision to the receiving apparatus, a mode leaving the decision to the broadcast station, a manual mode, and OFF (the synchronous presentation is not performed).

In the case that the viewer selects the mode leaving the decision to the broadcast station, controller 51 performs the synchronous presentation method described in the AIT only when the synchronous presentation method is set to the AIT.

In the case that the viewer selects the mode leaving the decision to the receiving apparatus, controller 51 performs the synchronous presentation method, which is selected from the synchronous presentation method that can be presented to the viewer and the synchronous presentation method described in the AIT. The synchronous presentation method may dynamically be selected.

A selection method in the application that can be specified by the AIT and a selection method with the control information (such as SI) on the broadcast signal are also adopted instead of specifying the synchronous presentation method by the AIT.

Figure 13:
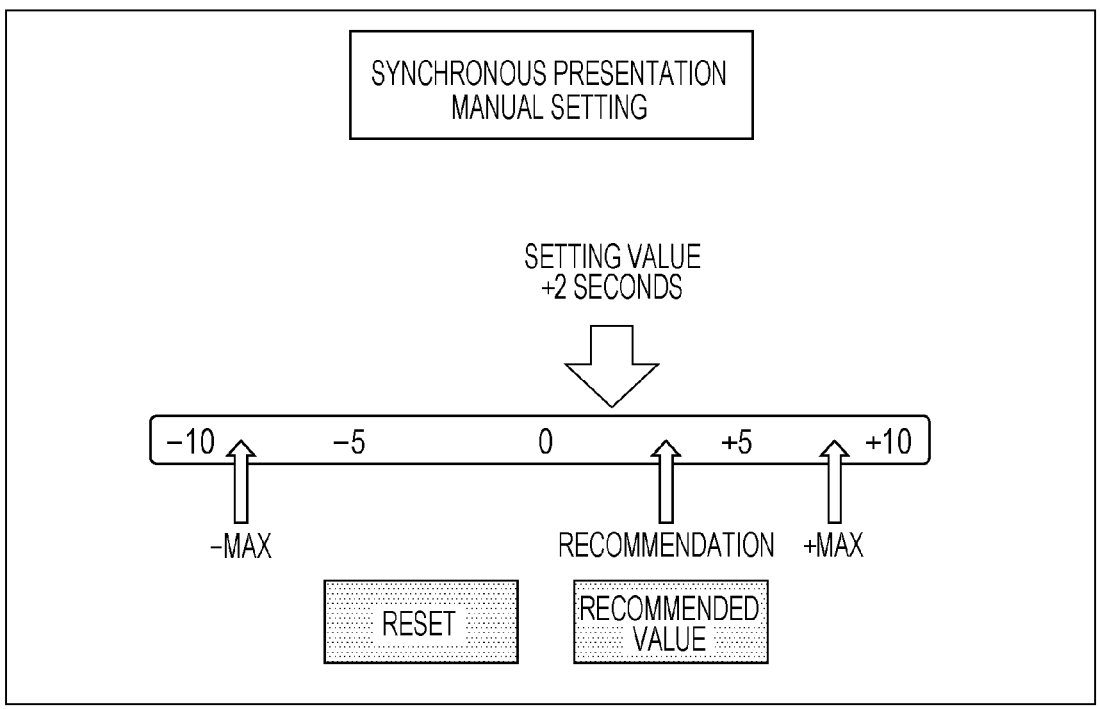
FIG. 13 is a view illustrating an example of a synchronous presentation manual setting screen.

In the case that the viewer selects the manual mode, a manual setting screen that is illustrated in FIG. 13 as an example is started up. In the example of the manual setting screen in FIG. 13, the viewer can set the delay time between −MAX second to +MAX second in the range of −10 seconds to +10 seconds. Controller 51 decides a MAX value of the delay time according to a size of the content data and the capacity of the buffer. The synchronous delay time calculated from the PTS is displayed as a recommended value. The viewer can change the setting of the delay time by moving a position of a black arrow in FIG. 13. The viewer can press a recommended value button to return the delay time to the recommended value decided by controller 51. The viewer can set the delay time to zero by pressing a reset button (can switch the delay presentation to the normal presentation).

When the viewer performs the manipulation to change the setting of the delay time, the control signal indicating the delay time is output to controller 51. Based on the control signal, controller 51 controls the buffer to adjust the delay.

(17) The function of controller 51 of the first exemplary embodiment may be mounted as the software or the application. A part of the function can be packaged as an API (Application Programming Interface).

(Second Knowledge Underlying the Present Disclosure)

The reception device disclosed in PTL 3 receives the broadcast content through the digital broadcast signal, and receives the broadband content linking with the broadcast content through the broadband network. The reception device delays the broadcast content presentation based on the difference between the PTS of the broadcast content and the PTS of the broadband content.

In the broadband network such as the Internet, because jitter is generated in the transmission channel, it is necessary for the reception side to compensate the jitter. Therefore, it is necessary for the broadband reception device to include a de-jitter buffer that compensates the jitter. On the other hand, it is not necessary for the broadcast reception device to include the de-jitter buffer. The reception device of the broadcast and broadband cooperation reception device that causes the broadcast and the broadband to cooperate with each other includes a broadband de-jitter buffer and a broadcast delay buffer that implements buffer delay corresponding to buffer delay of the de-jitter buffer, and it is necessary to match the playback time of the broadband to the playback time of the broadcast.

As described above, the reception device disclosed in PTL 3 synchronizes the broadcast content and the broadband content with each other based on the difference between the PTS of the broadcast content and the PTS of the broadband content.

When the large-capacity buffer is used in the synchronization, the jitter can be compensated without performing underflow or overflow.

However, the increase of the buffer capacity leads to a problem in that end-to-end delay increases. In the conventional broadcast reception system, there is a demand for minimizing the end-to-end delay. Even if the reception device sufficiently has an excess memory, it is not realistic that the whole memory is used in the jitter compensation, but desirably a necessary minimum memory is used in the jitter compensation. In the case that a system decoder model is defined in order to guarantee the synchronous playback of the reception device and the buffer management during the decoding, it is necessary to guarantee the operation of the reception device using a predetermined-size buffer.

In the case that the de-jitter buffer is controlled using the predetermined-size buffer in the reception device of the broadcast and broadband cooperation reception device, there is a high possibility of generating the underflow and the overflow, and it is necessary to further perform, for example, the buffering of the broadband content as a measure against the underflow. For the use of the reception device disclosed in PTL 3, the delay time of the broadcast delay buffer is influenced by the control of the de-jitter buffer, the underflow or the overflow is generated in the broadcast delay buffer, and the viewing of the content is influenced, whereby the operation of the broadcast receiving apparatus is hardly guaranteed.

The inventors have studied a technical solution to the problem, and exemplary embodiments based on the solution obtained by the inventors will be described below.

Second Exemplary Embodiment

Figure 14:
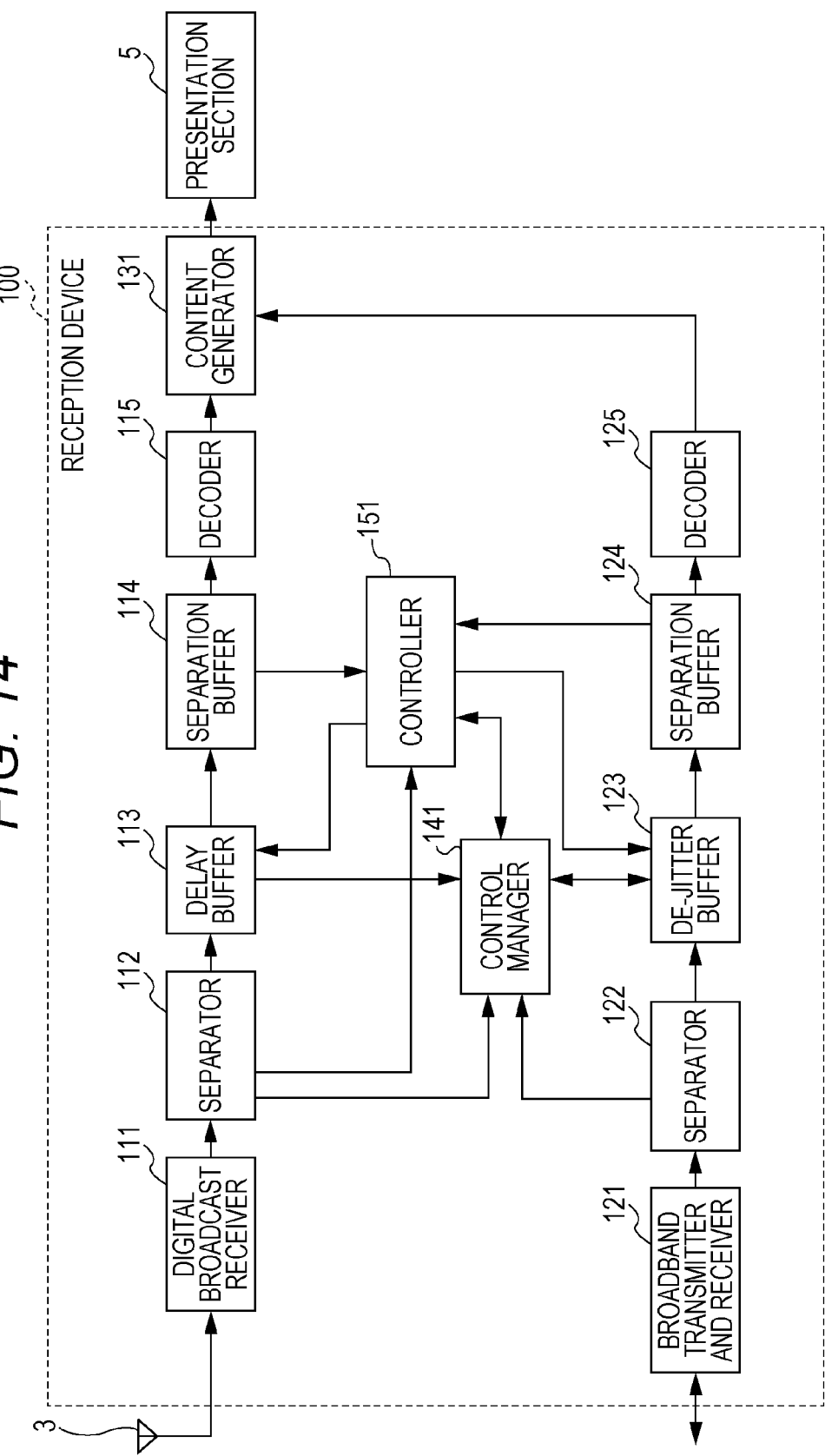
FIG. 14 is a block diagram illustrating a configuration of reception device 100 according to a second exemplary embodiment of the present disclosure.

FIG. 14 is a block diagram illustrating a configuration of reception device 100 that is a broadcast and broadband cooperation reception device according to a second exemplary embodiment of the present disclosure.

Reception device 100 includes digital broadcast receiver 111, separator 112, delay buffer 113, separation buffer 114, decoder 115, broadband transmitter and receiver 121, separator 122, de-jitter buffer 123, separation buffer 124, decoder 125, content generator 131, control manager 141, and controller 151.

Digital broadcast signal received by external broadcast antenna 3 is input to digital broadcast receiver 111. Digital broadcast receiver 111 tunes a desired channel from the digital broadcast signal, performs demodulation processing and error correction processing on the digital broadcast signal of the tuned desired channel to generates a transport stream, and outputs the transport stream to separator 112.

Separator 112 outputs the transport stream generated by digital broadcast receiver 111 to delay buffer 113 while separating the transport stream into the video data, the audio data, the caption data, and the like. Separator 112 acquires various pieces of control information included in the transport stream, outputs the PCR to controller 151, and outputs the control information including the information on the kind of the content or the control to control manager 141.

Delay buffer 113 performs buffer delay corresponding to the buffer delay of de-jitter buffer 123. Delay buffer 113 adjusts the delay of the content data of each component, such as the video data and the audio data, which is output from separator 112 according to input and output timing indicated by controller 151, and outputs the adjusted content data to separation buffer 114.

The video data, the audio data, and the like, which are output from delay buffer 113, are stored in separation buffer 114. Based on time stamp information such as the DTS acquired from a PES header of the PES packet, separation buffer 114 outputs an elementary stream (ES) of each component such as the video data and the audio data to decoder 115 while matching the ES output timings to each other in units of access units. Separation buffer 114 outputs the time stamp information such as the DTS acquired from the PES header to controller 151. Separation buffers 114 and 124 have the function similar to that of an elementary stream buffer in the MPEG2 system.

Decoder 115 decodes the access unit of each component, such as the video data and the audio data, which is output from separation buffer 114, and outputs the decoded access unit to content generator 131.

Broadband transmitter and receiver 121 acquires the AV content from the content server provided by the business operator relating to the broadcast organization or other business operators through the broadband network, and outputs the acquired AV content to separator 122. Examples of the AV content provided by a broadband provider include file data, video data, and audio data.

Separator 122 separates the AV content input from broadband transmitter and receiver 121 into the video data, the audio data, and the like, and outputs the separated data to de-jitter buffer 123. Separator 122 outputs the control information including the information on the kind of the content and the control to control manager 141. The control information is included in the AV content.

De-jitter buffer 123 absorbs the jitter of the transmission channel. De-jitter buffer 123 adjusts the delay of the content data of each component, such as the video data and the audio data, which is output from separator 122 at the input and output timing indicated by controller 151, and outputs the adjusted content data to separation buffer 124.

The video data, the audio data, and the like, which are output from de-jitter buffer 123, are stored in separation buffer 124. Based on time stamp information such as the DTS acquired from a PES header of the PES packet, separation buffer 124 outputs the elementary stream of each component such as the video data and the audio data to decoder 115 while matching the pieces of ES output timing to each other in access units. Separation buffer 124 outputs the time stamp information such as the DTS acquired from the PES header to controller 151.

Decoder 125 decodes the access unit of each component, such as the video data and the audio data, which is output from separation buffer 124, and outputs the decoded access unit to content generator 131.

Content generator 131 generates presentation content using the content data of each component (such as the video, the audio, and the caption) output from decoder 115 and the content data of each component (such as the video, the audio, and the caption) output from decoder 125. The presentation content generated by content generator 131 is output to external presentation section 5, and presented by presentation section 5.

Control manager 141 decides the method for controlling delay buffer 113 and de-jitter buffer 123 based on the information, which is relating to the kind of the content and the control and included in the control information, and the states of delay buffer 113 and de-jitter buffer 123, and instructs controller 151 on the decided control method. Control manager 141 is described in detail later with reference to FIG. 15.

Controller 151 generates the reference clock signal using the PCR output from separator 112. For example, the generated reference clock signal is used to control output timing of each buffer.

Controller 151 controls the delays of delay buffer 113 and de-jitter buffer 123 based on the time stamp information such as DTS output from separation buffer 114, the time stamp information such as the DTS output from separation buffer 124, and the control method decided by control manager 141.

A configuration example of control manager 141 will be described below with reference to FIG. 15.

Figure 15:
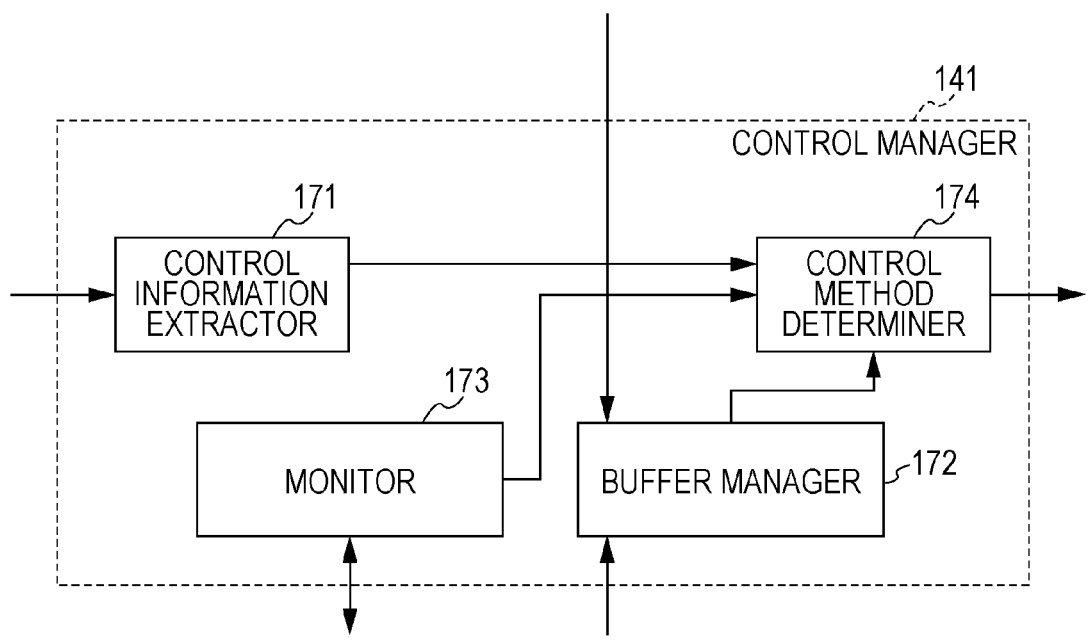
FIG. 15 is a block diagram illustrating a configuration example of control manager 141 in FIG. 14.

FIG. 15 is a block diagram illustrating a configuration example of control manager 141 in FIG. 14.

Control manager 141 includes control information extractor 171, buffer manager 172, monitor 173, and control method determiner 174.

Control information extractor 171 extracts the information on the kind of the content and the control from the input control information, and outputs the extracted information on the kind of the content and the control to control method determiner 174. Examples of the information on the kind of the content and the control include information on accuracy necessary for the content synchronization and information on the permissible end-to-end delay time of the broadcast content. For example, the control information such as the information on the kind of the content and the control is transmitted while multiplexed on the transmission side. For example, in the case that the MPEG2-TS scheme is used as the multiplexing scheme, the control information is a descriptor, PSI or SI constructed with a table, and a section.

Buffer manager 172 manages a buffer size, a buffer occupied amount, and a delay time (a time interval until the output from the buffer since the input to the buffer) with respect to delay buffer 113 and de-jitter buffer 123, and calculates a size of the excess buffer that can be used based on the buffer size, the buffer occupied amount, and the delay time.

For example, buffer manager 172 can always monitor input and output clocks, and calculate the delay times and buffer occupied amounts of de-jitter buffer 123 and delay buffer 113.

Buffer manager 172 can calculate the buffer occupied amounts of de-jitter buffer 123 and delay buffer 113 by multiplying the delay times of de-jitter buffer 123 and delay buffer 113 by an average bit rate.

When a commonly-managed buffer memory exists in addition to delay buffer 113 and de-jitter buffer 123, buffer manager 172 may dynamically decide the buffer size including the memory that can be used in the buffer memory.

Monitor 173 always monitors a possibility of generating the underflow in de-jitter buffer 123 and a possibility of generating the overflow in de-jitter buffer 123, and notifies control method determiner 174 of a monitoring result.

An example of monitoring processing performed by monitor 173 of the second exemplary embodiment will be described below.

Monitor 173 monitors the buffer occupied amount of de-jitter buffer 123.

In the case that the buffer occupied amount of de-jitter buffer 123 is less than a first threshold, monitor 173 determines the possibility of generating the underflow exists, and sets an underflow flag to an on state. On the other hand, in the case that the buffer occupied amount of de-jitter buffer 123 is greater than or equal to the first threshold, monitor 173 determines the possibility of generating the underflow does not exist, and sets the underflow flag to an off state.

In the case that the buffer occupied amount of de-jitter buffer 123 is greater than a second threshold, monitor 173 determines the possibility of generating the overflow exists, and sets an overflow flag to the on state. On the other hand, in the case that the buffer occupied amount of de-jitter buffer 123 is less than or equal to the second threshold, monitor 173 determines the possibility of generating the overflow does not exist, and sets the overflow flag to the off state.

Monitor 173 always performs the above operation.

In the case that the possibility of generating the underflow or the overflow exists, control method determiner 174 decides the method for controlling delay buffer 113 and de-jitter buffer 123 based on the excess buffer size, the end-to-end delay, and the information on the kind of the content and the control, and notifies controller 151 of the decided control method. The operation of control method determiner 174 is described later with reference to FIG. 17.

Figure 16:
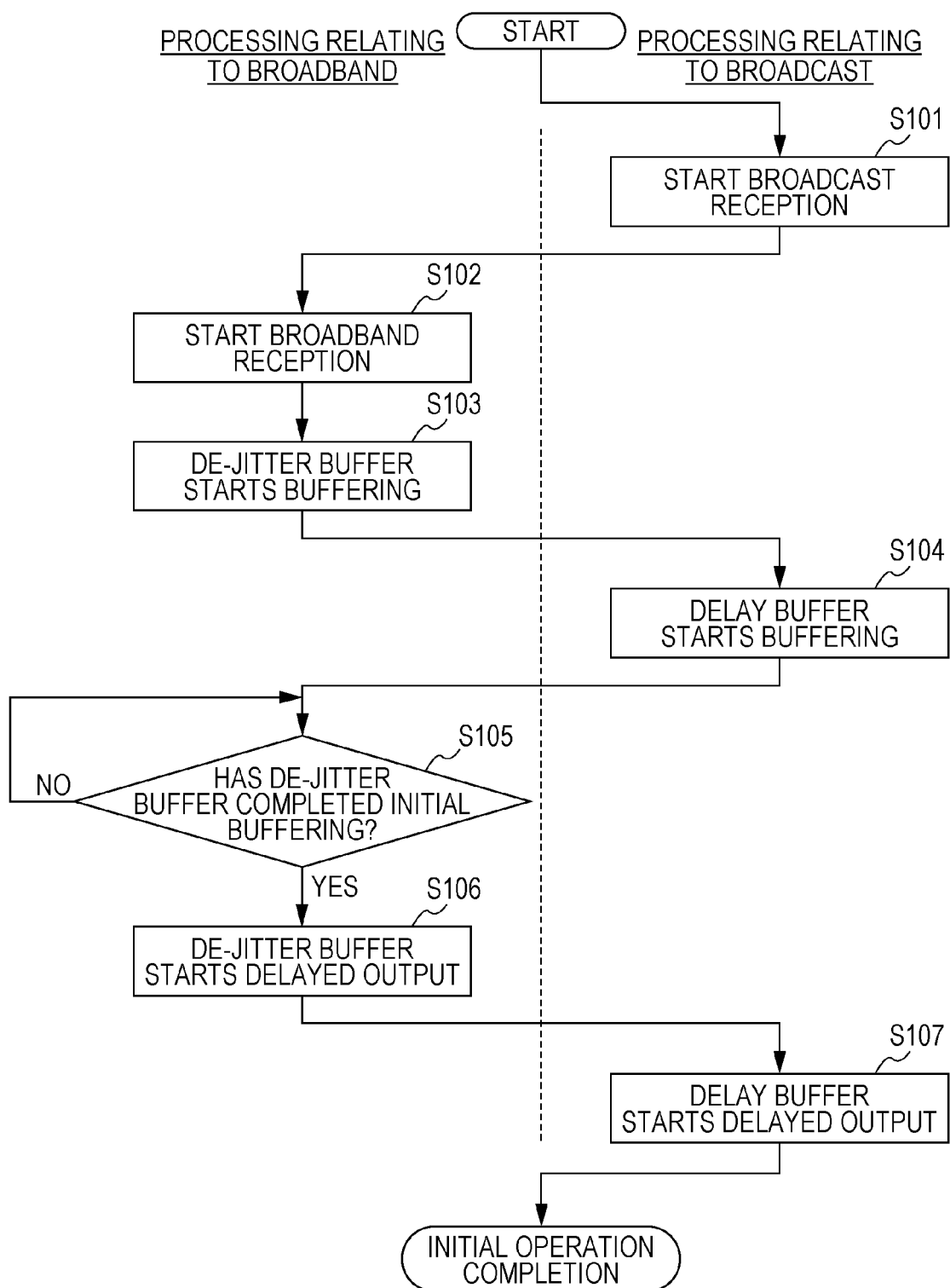
FIG. 16 is a flowchart illustrating an example of initial operation of a delay buffer and a de-jitter buffer after reception device 100 in FIG. 14 starts broadcast and broadband reception.

FIG. 16 is a flowchart illustrating an example of initial operation of delay buffer 113 and de-jitter buffer 123 after reception device 100 in FIG. 14 starts the broadcast and broadband reception. However, in the flowchart of FIG. 16, it is assumed that neither the underflow nor the overflow is generated in delay buffer 113 and de-jitter buffer 123. The processing relating to the broadband is illustrated on the left side in FIG. 16, and the processing relating to the broadcast is illustrated on the right side in FIG. 16.

Reception device 100 starts the broadcast reception (Step S101), and starts the broadband reception (Step S102).

After the start of the broadband reception, de-jitter buffer 123 starts the broadband data buffering under the control of controller 151 (Step S103). Controller 151 controls the start of the buffering of delay buffer 113 according to the start of the buffering of de-jitter buffer 123, and delay buffer 113 starts the broadcast data buffering under the control of controller 151 (Step S104).

Controller 151 determines whether a buffering amount of de-jitter buffer 123 reaches an initial buffering amount, namely, whether de-jitter buffer 123 has completed initial buffering (Step S105). Until de-jitter buffer 123 completes the initial buffering (No in S105), de-jitter buffer 123 and delay buffer 113 perform the initial buffering, and the processing in Step S105 is performed.

When the initial buffering of de-jitter buffer 123 is completed (Yes in S105), controller 151 controls the start of data delayed outputs of de-jitter buffer 123 and delay buffer 113. De-jitter buffer 123 starts the delayed output of the broadband data under the control of controller 151 (Step S106), and delay buffer 103 starts the delayed output of the broadcast data under the control of controller 151 (Step S107).

Thus, delay buffer 113 is operated according to the operation of de-jitter buffer 123, and the initial operation is completed.

For example, the initial buffering amount of de-jitter buffer 123 is a value in which an expected time of the jitter to be compensated and the average bit rate are multiplied by each other.

The output of the normal broadcast data before the start of the delayed output may be started after the initial buffering of de-jitter buffer 123 is completed, or started without waiting for the completion of the initial buffering of de-jitter buffer 123.

At the beginning of the output of de-jitter buffer 123, the broadband data in which the time is matched to the broadcast data is output based on the time difference calculated from the time stamp information on the broadcast data and the time stamp information on the broadband data.

In FIG. 16, delay buffer 113 has the sufficiently large size in order to delay the broadcast. However, in the case that delay buffer 113 possibly causes the overflow before the start of the delayed output of the broadcast data, it is necessary to perform the proper processing at that time.

Figure 17:
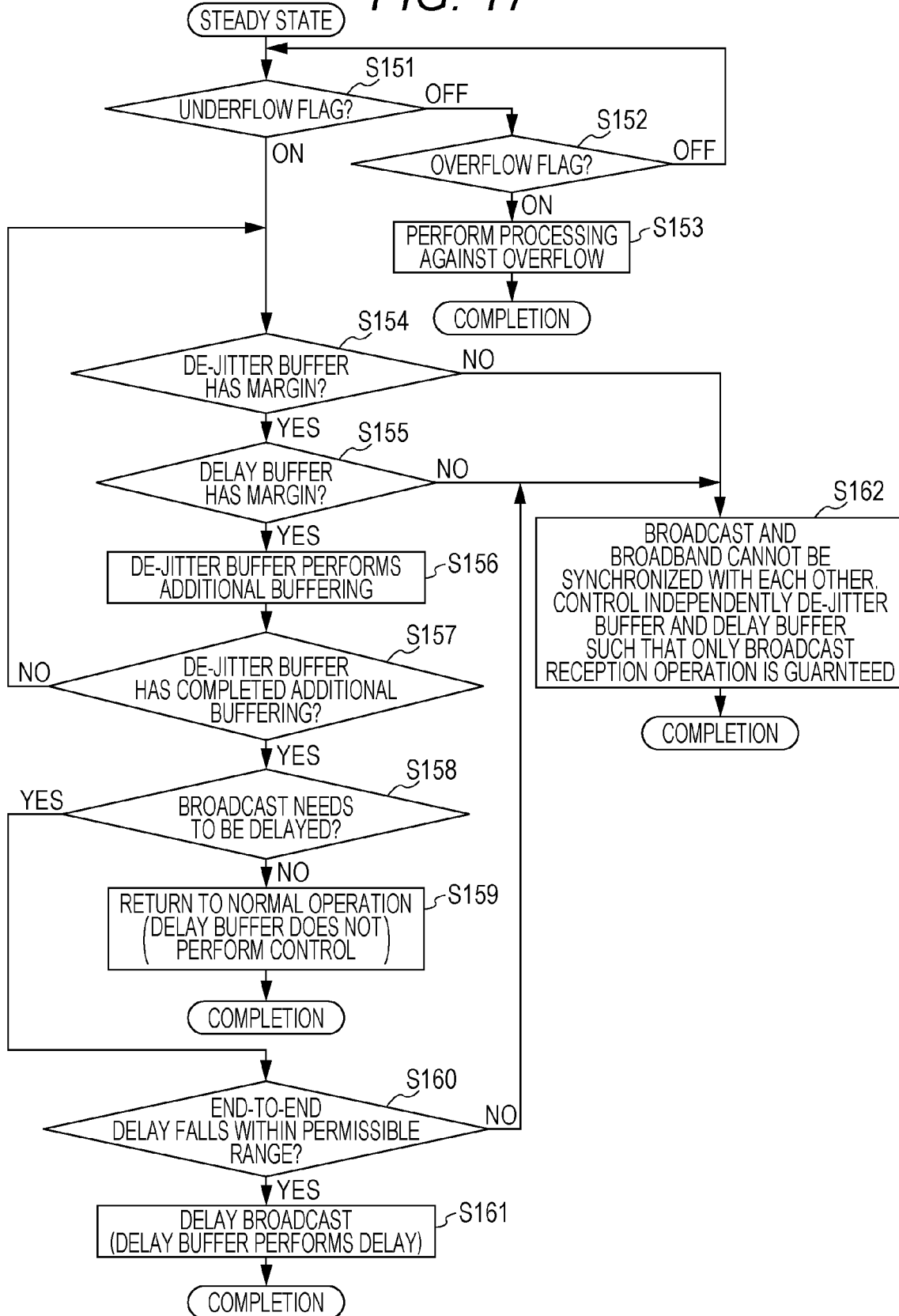
FIG. 17 is a flowchart illustrating an example of control method deciding operation of control method determiner 174 in FIG. 14.

FIG. 17 is a flowchart illustrating an example of control method deciding operation of control method determiner 174 in FIG. 14. At the start point of the flowchart in FIG. 17, it is assumed that reception device 100 is in a steady state in which de-jitter buffer 123 and delay buffer 113 are synchronized with each other.

Control method determiner 174 determines whether the underflow flag is set to the on state or the off state based on the monitoring result of de-jitter buffer 123 with monitor 173 (Step S151). When the underflow flag is set to the off state, namely, when the possibility of generating the underflow in de-jitter buffer 123 does not exist (OFF in S151), control method determiner 174 determines whether the overflow flag is set to the on state or the off state based on the monitoring result of de-jitter buffer 123 with monitor 173 (Step S152).

When the overflow flag is set to the off state, namely, when the possibility of generating the overflow in de-jitter buffer 123 does not exist (OFF in S152), control method determiner 174 returns to the processing in Step S151.

When the overflow flag is set to the on state, namely, when the possibility of generating the overflow in de-jitter buffer 123 exists (ON in S152), control method determiner 174 decides processing against the overflow (for example, processing of skipping the output of de-jitter buffer 123) as the control method, and instructs controller 151 on the decided processing against the overflow. In response to the instruction, controller 151 performs the processing against the overflow on de-jitter buffer 123 (Step S153).

When the underflow flag is set to the on state, namely, when the possibility of generating the underflow in de-jitter buffer 123 exists (ON in S151), control method determiner 174 determines whether de-jitter buffer 123 has a margin (Step S154). As to the determination in Step S154, for example, the determination that de-jitter buffer 123 has the margin is made in the case that the excess buffer size of de-jitter buffer 123, which is calculated by buffer manager 172, is greater than or equal to a predetermined value.

When the de-jitter buffer 123 does not have the margin (No in S154), control method determiner 174 goes to the processing in Step S162.

On the other hand, when de-jitter buffer 123 has the margin (Yes in S154), control method determiner 174 determines whether delay buffer 113 has a margin (Step S155). As to the determination in Step S155, for example, the determination that delay buffer 113 has the margin is made in the case that the excess buffer size of delay buffer 113, which is calculated by buffer manager 172, is greater than or equal to a predetermined value.

When delay buffer 113 does not have the margin (No in S155), control method determiner 174 goes to the processing in Step S162.

When delay buffer 113 has the margin (Yes in S155), control method determiner 174 instructs controller 151 on additional buffering of de-jitter buffer 123. In response to the instruction, controller 151 stops the output of de-jitter buffer 123, and control the additional buffering of de-jitter buffer 123. De-jitter buffer 123 stops the output by the control of controller 151, and performs the additional buffering (Step S156).

Control method determiner 174 determines whether de-jitter buffer 123 has completed the additional buffering (Step S157). For example, the determination that the additional buffering is completed is made at a time point, at which de-jitter buffer 123 has the sufficient occupied amount and there is a low possibility of generating the underflow in de-jitter buffer 123, based on the monitoring result of de-jitter buffer 123 with monitor 173.

When the additional buffering of de-jitter buffer 123 is not completed (No in S157), control method determiner 174 returns to the processing in Step S154.

When the additional buffering of de-jitter buffer 123 is completed (Yes in S157), control method determiner 174 determines whether the broadcast needs to be delayed (Step S158). As to the determination in Step S158, for example, the determination that the broadcast does not need to be delayed is made in the case that the information on the accuracy necessary for the content synchronization does not need to be synchronized.

When the broadcast does not need to be delayed (No in S158), control method determiner 174 decides that the delay control of delay buffer 113 is not performed as the control method, and control method determiner 174 notifies controller 151 of the decided control method. In response to the notification, controller 151 does not perform the delay control of delay buffer 113, but delay buffer 113 outputs the broadcast data without delay (Step S159).

When the broadcast needs to be delayed (Yes in S158), control method determiner 174 determines whether the actual end-to-end delay time falls within a permissible range using information on the permissible end-to-end delay time of the broadcast content (Step S160). For example, the information on the permissible end-to-end delay time of the broadcast content can be acquired in such a way that the transmission side specifies the permissible end-to-end delay time of the content, and transmits the control signal through the broadcast, and the reception device receives the broadcast signal, and acquires the information on the permissible end-to-end delay time of the broadcast content from the control signal.

When the end-to-end delay time is outside the permissible range (No in S160), control method determiner 174 goes to the processing in Step S162.

When the end-to-end delay time falls within the permissible range (Yes in S160), control method determiner 174 decides that the delay control of delay buffer 113 is performed as the control method, and notifies controller 151 of the decided control method. In response to the notification, controller 151 performs the delay control of delay buffer 113, and delay buffer 113 performs the delayed output operation for the broadcast data (Step S161). In the delay control, the delay amount at delay buffer 113 can be calculated using an input and output counter of de-jitter buffer 123 and an input and output counter of delay buffer 113.

In Step S162, control method determiner 174 determines that the broadcast and the broadband cannot be synchronized with each other. Control method determiner 174 decides that de-jitter buffer 123 and delay buffer 113 are independently controlled as the control method so as to guarantee only the broadcast reception operation, and notifies controller 151 of the decided control method. In response to the notification, controller 151 independently controls de-jitter buffer 123 and delay buffer 113 (Step S162).

(Supplements of second exemplary embodiment) Supplements of the second exemplary embodiment will be described below.

Figure 18:
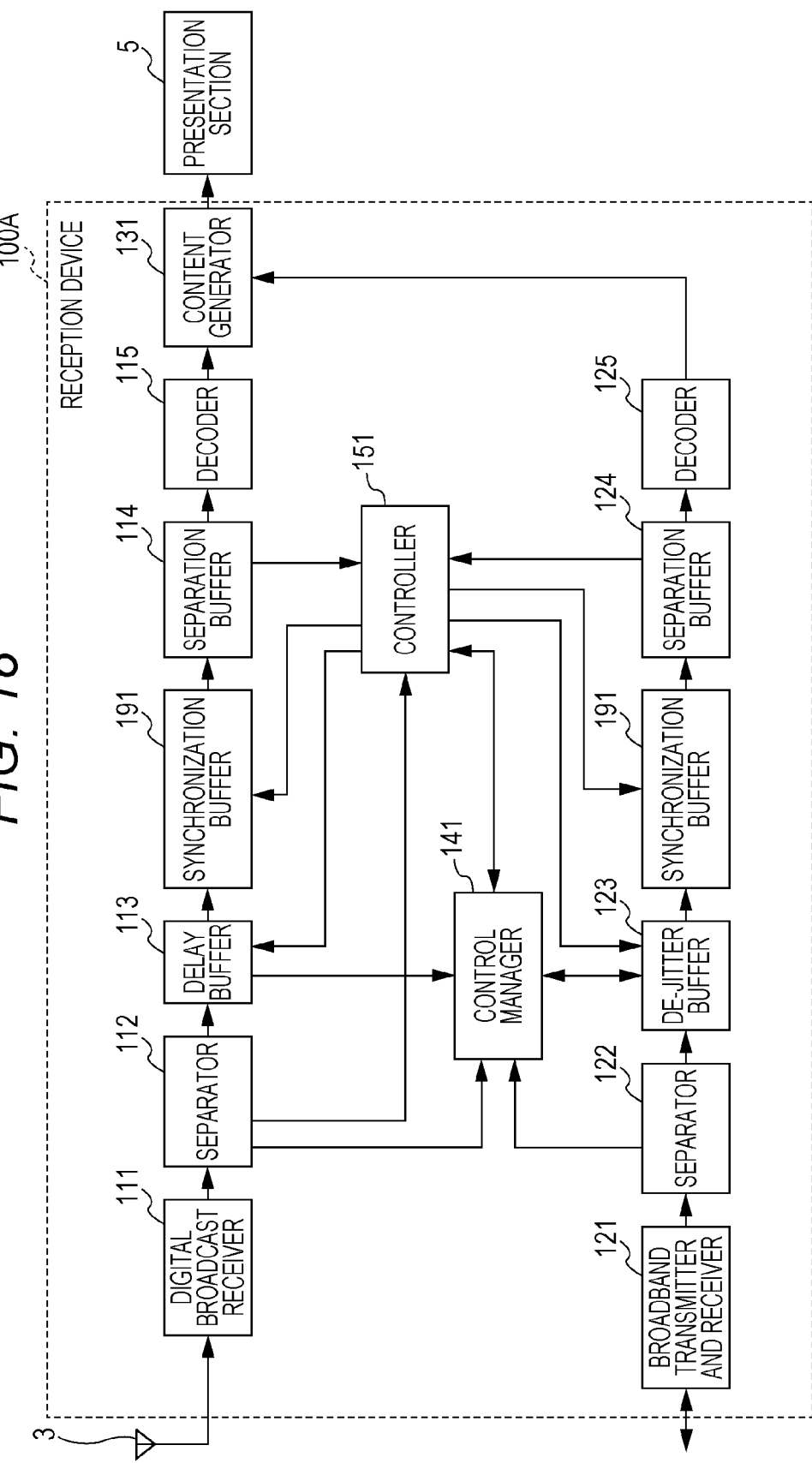
FIG. 18 is a block diagram illustrating a configuration of reception device 100A according to a modification of the second exemplary embodiment.

(1) In the second exemplary embodiment, in the case that the delay difference of the transmission channel exists between the broadcast and the broadband, the reception device can have a configuration in FIG. 18. In FIG. 18, a constituent unit that performs the processing substantially identical to that of the constituent unit in FIG. 14 is designated by the identical reference mark.

Reception device 100A of FIG. 18 differs from reception device 100 in FIG. 14 in that synchronization buffer 191 is added between delay buffer 113 and separation buffer 114, and that synchronization buffer 196 is added between de-jitter buffer 123 and separation buffer 124.

Using the time stamp information such as the DTS from separation buffer 114 and the time stamp information such as the DTS from separation buffer 124, controller 151 controls the output timing of synchronization buffer 191 and the output timing of synchronization buffer 196 such that the broadcast data and the broadband data are synchronized with each other.

(2) Even if there is the possibility of generating the underflow or the overflow in de-jitter buffer 123, delay buffer 113 is not necessarily controlled.

(3) The control method deciding mechanism of the second exemplary embodiment can be used in the case that various underflow avoiding methods and overflow avoiding methods are used.

(4) In the case that the buffer size is previously defined in order to guarantee the buffer operation in the second exemplary embodiment, the excess buffer size may be calculated using the defined buffer size.

In the case that de-jitter buffer 123 and delay buffer 113 cannot be controlled by the defined buffer size, the reception operation relating to the broadband does not need to be guaranteed.

In the case that the control cannot be performed by the defined buffer size, for example, a message indicating that the control cannot be performed by the defined buffer size may be presented in presentation section 5.

In the case that the control cannot be performed by the defined buffer size, information indicating that the control cannot be performed by the defined buffer size may be fed back to the transmission side using broadband means.

The transmission channel information such as the actual jitter time and the delay time of the broadcast and the broadband may be fed back to the transmission side using the broadband means.

(5) Preferably the control in which priority is given to the operation relating to the broadcast of the reception device is performed in the case that the synchronization between the broadcast and the broadband cannot be guaranteed.

In the case that the synchronization between the broadcast and the broadband cannot be guaranteed, de-jitter buffer 123 and delay buffer 113 are properly controlled while de-jitter buffer 123 is monitored, thereby guaranteeing the operation relating to the broadcast of the reception device.

(6) An option that the broadband content is changed to data having less delay or data having less jitter can be provided as a result of the control of de-jitter buffer 123. In this case, broadband transmitter and receiver 121 notifies the content server of the option to acquire the data having the less jitter. Thus, the stable service can be provided to the viewer.

It is also considered that the necessity of the change of the broadcast content acquiring method is generated in association with the change of the broadband content acquisition. In this case, control manager 141 changes the broadcast content acquiring method.

(7) The transmission side may multiplex and transmit the control information indicating quality of the transmission channel as a signaling message, and the reception device may decide or restrict the control method based on the transmitted quality. For example, in the case that the maximum delay time expected in the broadband transmission channel is signaled from the transmission side as the control signal indicating the quality of the transmission channel, the reception device may determine whether the broadband content is to be received, or whether the broadcast content and the broadband content are to be synchronously played back by comparing the maximum delay time to the buffer size of the reception device.

The transmission side may multiplex and transmit the control information indicating the recommended control method as the signaling message, and the reception device may operates based on the transmitted recommended control method.

The transmission side may multiplex and transmit the jitter time in which the operation can be guaranteed by the transmission side and the information on the buffer sizes of de-jitter buffer 123 and delay buffer 113 as the signaling message.

(8) Examples of the accuracy necessary for the content synchronization include (A) unnecessity of the synchronization between one piece of content and the other, (B) necessity of the synchronization accuracy within 10 seconds, (C) necessity of the synchronization accuracy within 1 second, and (D) necessity of the synchronization accuracy in frame units.

Reception device 100 can freely decide the control method on the synchronization and the jitter so as to satisfy the accuracy necessary for the content synchronization. Therefore, the control method can also be selected according to specification or ability of the reception device. For example, when the synchronization is required at a frame level, delay buffer 113 is controlled with high accuracy according to de-jitter buffer 123. The selection that delay buffer 113 is not controlled according to the control of de-jitter buffer 123 can be made when the synchronization is not required. Instead of notification about the minimum necessary synchronization accuracy, the recommended synchronization accuracy may be transmitted.

The reception device may decide the control method by determining the synchronization accuracy according to the content. For example, in the case that the content is constructed with the video and the caption, as far as the caption can be viewed without problems, the control may be performed while the synchronization accuracy is degraded.

(9) The transmission side may transmit the control information indicating whether one piece of content can solely be decoded. For example, when the broadcast cannot solely be decoded, it is necessary to synchronize the broadcast and the broadband with each other. On the other hand, when the broadcast can solely be decoded, an option that only the broadcast content is displayed can be provided in the case that the synchronization cannot be performed.

(10) The transmission side may be allowed to define the permissible jitter or de-jitter buffer amount, and transmit the jitter or de-jitter buffer amount as the control signal.

For example, a content producer may decide the synchronization accuracy as "forced" or "not forced", and the transmission side may transmit the information on the synchronization accuracy.

(11) Preferably the control information can be acquired before the decoding is started.

In the case that MMT (MPEG Media Transport) is used as the multiplexing scheme, the information that can be acquired before the decoding is started may be described in CI (Composition Information), or described in an MPT (MMT Package Table) together with an asset list. For the MPEG2-TS, the control information such as a PMT (Program Map Table) may be used as the information that can be acquired before the decoding is started. In the case that MPEG-DASH (Dynamic Adaptive Streaming over HTTP) is used, the information that can be acquired before the decoding is started may be described in MPD (Media Presentation Description). For other multiplexing systems, program information that can be acquired by the reception device before the decoding is started may be used.

The control information is transmitted through one of or both the broadcast and the broadband, control manager 141 acquires and analyzes the control information before the decoding is started, and decides the control methods of de-jitter buffer 123 and delay buffer 113.

(12) The buffer size may be previously defined in order to compensate the jitter or the synchronization of the broadcast and the broadband, a constraint condition may be further defined in order to compensate the operation in the defined buffer size, and the buffer operation such as the measure against the underflow or overflow may be decided based on the constraint condition.

A total size of the de-jitter buffer, delay buffer, and synchronization buffer may be defined, and the operation may be compensated in the total size.

(13) The configurations of reception devices 100 and 100A in FIGS. 14 and 18 may be modified such that the decoding is performed by one decoder as in FIG. 9, or modified to include two content generators as in FIG. 10.

(14) The functions described in the second exemplary embodiment and the supplements of the second exemplary embodiment may be implemented by hardware or software. A part of the functions may be implemented by hardware, and a part of the functions may be implemented by software.

(15) The content in which the jitter and the synchronization of the broadcast and the broadband are completed may be transmitted to the cooperation device such as the tablet before the decoding of the content.

(16) A part of the functions described in the second exemplary embodiment and the supplements of the second exemplary embodiment may be implemented not only as the reception device but also as a part of functions of a relay station.

(17) Control results of de-jitter buffer 123 and delay buffer 113 (for example, an error message that "the broadcast and the broadband cannot be synchronized with each other") may be presented to the viewer, or recorded as a report.

(18) In the second exemplary embodiment, the configuration of the buffer of reception device 100 is described with reference to FIG. 14 by way of example. However, the buffer of reception device 100 is not limited to the configuration in FIG. 14 as far as the buffer has the function equal to that of the second exemplary embodiment.

For example, desirably the buffer is disposed at a position where a memory size can be decreased as much as possible. In the second exemplary embodiment, the buffer is included in each of the functions such as delay buffer 113, separation buffer 114, de-jitter buffer 123, and separation buffer 124. Alternatively, one buffer may have a plurality of functions.

The buffer may dynamically allocate a memory to each function, or a plurality of functions may be implemented by a common memory.

The same holds true for reception device 100A in FIG. 18.

(19) In the second exemplary embodiment, the MPEG2-TS system is described as an example of the multiplexing scheme. However, there is no particular limitation to the multiplexing scheme. Examples of the multiplexing scheme include the MP4 and the RTP and MMT that are widely used in the streaming.

(Others) The first exemplary embodiment and the supplements of the first exemplary embodiment may properly be combined.

The second exemplary embodiment and the supplements of the second exemplary embodiment may properly be combined.

The first exemplary embodiment, the supplements of the first exemplary embodiment, the second exemplary embodiment, and the supplements of the second exemplary embodiment may properly be combined.

The first exemplary embodiment and the supplements of the first exemplary embodiment may be applied to the second exemplary embodiment and the supplements of the second exemplary embodiment, and the second exemplary embodiment and the supplements of the second exemplary embodiment may be applied to the first exemplary embodiment and the supplements of the first exemplary embodiment.

<<Summary>> The reception devices and reception methods of the exemplary embodiments and modifications and advantageous effects thereof are summarized below.

(1) A first reception device includes: a first buffer that accumulates and outputs a first signal received through a first transmission channel, the necessity of the jitter compensation being eliminated in the first transmission channel; a second buffer that accumulates and outputs a second signal received through a second transmission channel, the jitter compensation being required in the second transmission channel; a control manager that monitors whether a possibility of generating underflow exists in the second buffer, and decides a method for controlling the first and second buffers based on excess buffer sizes of the first and second buffers when the possibility of generating underflow exists; and a controller that controls the first and the second buffers based on the method for controlling the first and second buffers decided by the control manager.

A first reception method performed in a reception device including the first buffer and the second buffer, the first buffer accumulating and outputting the first signal received through the first transmission channel, the necessity of the jitter compensation being eliminated in the first transmission channel, the second buffer accumulating and outputting the second signal received through the second transmission channel, the jitter compensation being required in the second transmission channel, the first reception method includes: monitoring whether a possibility of generating the underflow exists in the second buffer; deciding the method for controlling the first and second buffers based on the excess buffer sizes of the first and second buffers when the possibility of generating the underflow exists; and controlling the first and the second buffers based on the decided method for controlling the first and second buffers.

Therefore, the service quality can be improved in the first signal in which the necessity of the jitter compensation is eliminated and the second signal in which the jitter compensation is required.

(2) In a second reception device, the control manager of the first reception device further decides the control method based on the control information on the accuracy necessary for the synchronization of the first signal and the second signal.

(3) In a third reception device, the control manager of the first reception device further decides the control method based on the information on the permissible end-to-end delay time of the first signal.

(4) A fourth reception device includes: a first buffer that accumulates and outputs a first signal received through a first transmission channel; a second buffer that accumulates and outputs a second signal received through a second transmission channel; a controller that performs synchronization control of the first and the second buffers that relate to the synchronization of the first and second signals based on clock time information included in the first signal and clock time information included in the second signal; and an announcement section that performs announcement relating to the synchronization according to the synchronization control performed by the controller.

A second reception method performed in a reception device including the first buffer and the second buffer, the first buffer accumulating and outputting the first signal received through the first transmission channel, the second buffer accumulating and outputting the second signal received through the second transmission channel, the second reception method includes: performing the synchronization control of the first and the second buffers that relate to the synchronization of the first and second signals based on the clock time information included in the first signal and clock time information included in the second signal; and performing announcement relating to the synchronization according to the synchronization control.

Thus, the viewer's uncomfortable feeling or discomfort can be reduced in synchronizing the first signal and the second signal with each other.

(5) In a fifth reception device, the controller performs the synchronization control based on the input from the viewer.

Thus, the synchronization of the first signal and the second signal can be performed as desired by the viewer.

Third Exemplary Embodiment

In the first and second exemplary embodiments, by way of example, the reception device does not select the broadband content such as the broadband content acquisition on which the multi-cast streaming is performed. In a third exemplary embodiment, the broadband content selected by the reception device and the broadcast content are synchronously presented.

In the third exemplary embodiment, in the case that the term "reception device" is simply described, any one of the reception devices in FIGS. 1, 9, 10, and 14 may be used as the "reception device". The same holds true for the description of the component, such as the term "controller", which is included in the reception device.

[Outline]

An outline of operation performed by the reception device and server of the third exemplary embodiment will be described below. The server is an example of the transmission device. In the third exemplary embodiment, in the case that the function that can be implemented in both the broadband server and the broadcast server is described as the "server", the server may be either the broadband server or the broadcast server.

The server transmits information indicating whether a broadband protocol is multi-cast and information indicating whether the content is live while the pieces of information are included in the control information. The reception device determines whether the broadband content of any time can be acquired based on the control information or whether the content to be acquired is stored in the broadband server.

When the broadband content of any time can be acquired, the reception device decides the time or acquisition timing of the broadband content to be acquired, and acquire the broadband content from the server.

When the broadband content of any time can be acquired, the reception device pre-buffers the broadband content. The server notifies the timing to perform pre-buffering as the control information or the event, and the reception device starts the pre-buffering at the timing based on the notification.

The reception device determines whether the broadcast content and the broadband content can synchronously be played back from the state of the buffer, the kind of the content, and the state of the transmission channel. When possibly the broadcast content and the broadband content cannot synchronously be played back, the reception device controls the buffer, or the reception device makes a determination on the broadband content acquisition, and performs the control based on the determination.

The server signals the accuracy necessary for the synchronization of the broadcast content and the broadband content or the permissible time difference of the content presentation as the control information. The reception device controls the presentation method and the buffer based on the control information.

The server signals the accuracy necessary for the synchronization of the broadcast content and the broadband content or the permissible time difference of the content presentation as the control information, and instructs the broadband server on the broadband content to be acquired based on the control information.

[Details]

Details of the operation performed by the reception device and server of the third exemplary embodiment will be described below.

For example, in a progressive download scheme such as MPEG-DASH, it is considered that the content having different quality is acquired according to a broadband environment. It is also considered that the data at the desired time is selected and acquired from the segmented data, and it is also considered that the broadband content acquired using a protocol such as RTSP in the streaming service is selected.

In the example of the MPEG-DASH, a plurality of pieces of video data having different image sizes and different coding rates are prepared in the server with respect to one piece of video content, and the video data is divided in units of segments. Information on the video data stored in the server is described in the MPD.

The reception device acquires the MPD from the server to analyze the MPD, decides the data to be acquired in consideration of the ability of the reception device and the state of the broadband transmission channel, and makes a request to the server. The reception device acquires the decided desired video data from the server using an HTTP protocol.

In broadcast and broadband cooperation service of the third exemplary embodiment, desirably the reception device acquires the broadband content by a proper method according to broadcast service (broadcast content), and performs the synchronous playback. Therefore, the reception device of the third exemplary embodiment acquires the control information on the broadband content acquisition, the control information on the broadcast and broadband cooperation, and the broadband content corresponding to the broadcast service.

In order to provide the broadcast and broadband cooperation service, the transmission side can cause the control information on the broadcast and broadband cooperation to include a broadband content transmission scheme, information on broadband content service, information indicating whether clock time information on the broadband content acquisition is included, clock time information or timing information on the broadband content acquisition, the location information on the broadband content, and the like. Each piece of information will be described below.

Examples of the broadband content transmission scheme include the MPEG-DASH scheme, the MMT scheme, and the RTP scheme. In the case that the broadband content transmission scheme is included in the control information on the broadcast and broadband cooperation, the reception device acquires the broadband content transmission scheme from the control information on the broadcast and broadband cooperation, and acquires the broadband content by the reception method suitable for the broadband content transmission scheme.

Examples of the information on the broadband content service include information indicating VOD, information indicating the streaming, and information indicating the live.

Information indicating that the clock time information or timing information on the start of the broadband content acquisition is described in the control information can be cited as an example of the information indicating whether the clock time information on the broadband content acquisition is included. Timing information such as an event message can be cited as an example of the timing information.

In the case that the clock time information on the broadband content acquisition is included in the control information, the reception device acquires the clock time information, and controls the broadband content acquisition, or selects the broadband content to be acquired. In the case that the information indicating the transmission of the event message is included in the control information, the reception device monitors the event message, and controls the broadband content acquisition according to the event.

The clock time information on the broadband content acquisition is information, which is necessary for the playback the broadband content in synchronization with the broadcast content and used to specify broadband content acquisition timing with respect to the reception device.

The reception device does not need to acquire the content based on the clock time information on the broadband content acquisition. The reception device may transmit the control signal such that the broadcast station determines whether the content is to be acquired based on the clock time information, or the reception device may determine whether the content is to be acquired based on the clock time information. The determination may be made by the viewer.

Specifically, the clock time information or timing information on the broadband content acquisition is the following pieces of information.

The clock time information or timing information on the start of the broadband content acquisition (the information indicating the clock time or timing at which the broadband content acquisition should be started in order to synchronize the broadband content with the broadcast content)

The clock time information or timing information on the completion of the broadband content acquisition (the information indicating the clock time or timing at which the broadband content acquisition should be completed in order to synchronize the broadband content with the broadcast content)

The clock time information or timing information on the broadband content playback (the information indicating the clock time or timing at which the broadband content should be played back in order to synchronize the broadband content with the broadcast content)

The clock time information or timing information indicating the clock time at which the broadband content acquisition becomes available These pieces of clock time information may be an absolute clock time such as the NTP or a relative clock time to a reference clock time (such as the PCR and the NTP) of the broadcast signal. The timing information such as the event message may be transmitted as the clock time information on the broadband content acquisition.

For example, the location information on the broadband content is information indicating a place where the broadband content is stored.

The control information may include the following pieces of information in addition to the above pieces of information.

For example, information indicating that a program of only the broadcast is switched to a program of the broadcast and broadband cooperation or clock time information indicating the clock time at which the program of the broadcast and broadband cooperation is started may be included in the control information. For example, the program of the broadcast and broadband cooperation is a program in which the broadcast and the broadband are synchronously played back. However, the program of the broadcast and broadband cooperation may be a program in which the broadcast and the broadband are not synchronously played back.

In the case that the program of only the broadcast is switched to the program of the broadcast and broadband cooperation, by previously notifying the reception side of information indicating that the program of the broadcast and broadband cooperation is started or the clock time information at which the program of the broadcast and broadband cooperation is started and previously transmitting program information on the next program, the reception side can be instructed on the pre-buffering of the broadband content. Thus, before the clock time at which the broadcast program is started, the reception device can pre-acquire the program information, start the broadband content acquisition, and perform the pre-buffering, so that the synchronous playback of the program of the broadcast and broadband cooperation can smoothly be performed.

In the case that the state such as a combination of the transmission channels constituting the program is changed, information previously indicating the change of the state or information indicating the clock time at which the state is changed may be included in the control information. EIT may be used to transmit these pieces of information, and these pieces of information may be described in the information on the next program by setting a PMT current next indicator to '0', and transmitted as program information.

These pieces of information may be described in the AIT. For example, in a hybrid-cast specification, it is considered that descriptor ait identifier info( ) indicating that the AIT (application control information) is included in a descriptor of PMT information on the next program. In such cases, the AIT of the next program may previously be transmitted during the broadcast of the current program. Specifically, a flag indicating whether the AIT of the next program is previously transmitted may be stored in the descriptor, or information that can identify the AIT relating to the next program information may be described in the AIT.

The control information may include information indicating that the broadband server is in the state in which the broadband content can be provided. In other words, the information is information (acquisition information) indicating the state in which the broadband content can be acquired. The control information may include information clock time from which the broadband content can be provided. In other words, the clock time information is information (acquisition information) indicating that the broadband content can be acquired after the timing by providing notification of the timing. The control information may indicate the acquisition information on the plurality of pieces of broadband content, or indicate a list of broadband content that can be provided by the broadband server.

The control information on the broadcast and broadband cooperation may be described in program information based on the broadcast transmission scheme as a descriptor, or described in program information based on the broadband transmission scheme. The control information on the broadcast and broadband cooperation may be described in program information having another format. The control information on the broadcast and broadband cooperation may be described in one of these pieces of program information, or described in the plurality of pieces of program information.

The program information will be supplemented below.

For example, the program information is described in the PMT in the case that the MPEG2-TS scheme is used. The program information may be described in the MPT in the case that the MMT scheme is used, and the program information may be described in the MPD in the case that the MPEG-DASH scheme is used. The program information may be described in application control information (Application Information Table) used in the hybrid-cast, and transmitted as a section or a data carousel.

The program information is transmitted using at least one transmission channel in the plurality of transmission channels such as the broadcast and the broadband. For example, sometimes the program information based on the broadband transmission scheme is transmitted through the broadcast.

The information indicating that the control information on the broadcast and broadband cooperation is included in the program information may be described in the program information, and the information indicating the location information including the control information on the broadcast and broadband cooperation may be included in the program information.

A specific example of the case that the control information on the broadcast and broadband cooperation is described in the program information as the descriptor will be described below.

In the case that the broadcast content is transmitted using the MPEG2-TS scheme while the broadband content is transmitted using the MPEG-DASH scheme, the descriptor corresponding to the control information may be described in the PMT transmitted through the broadcast or the MPD transmitted through the broadband. The descriptor corresponding to the control information may be described in both the PMT and the MPD, the MPD may be transmitted through the broadcast, and the PMT may be transmitted through the broadband.

[Example of Content Acquiring Operation]

Figure 19:
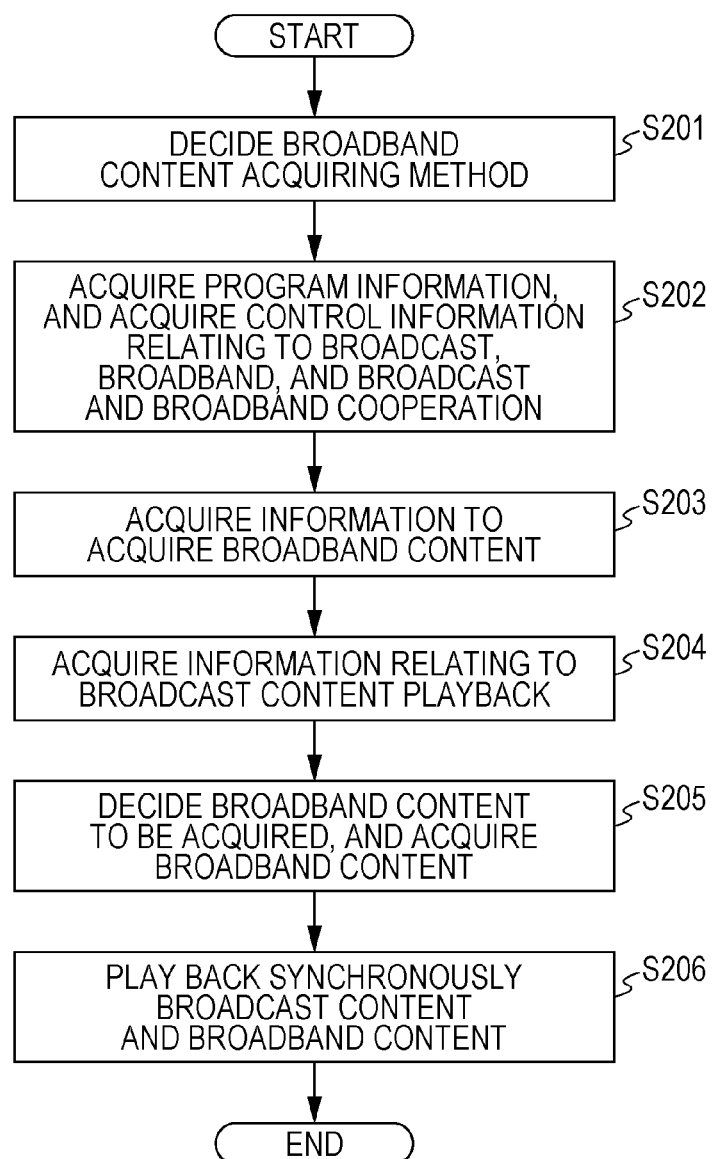
FIG. 19 is a flowchart illustrating an example of broadband content acquiring operation of a reception device according to a third exemplary embodiment.

The broadband content acquiring operation performed by the reception device of the third exemplary embodiment will be described below with reference to a flowchart. FIG. 19 is a flowchart illustrating an example of the broadband content acquiring operation performed by the reception device of the third exemplary embodiment. In the flowchart of FIG. 19, it is assumed that the reception device is in the state in which the broadband content can be acquired at any clock time (the state in which the broadband content transmission is ready).

The controller (reception device) decides a broadband content acquiring method based on the broadband content transmission scheme and the broadband content service information (Step S201).

Based on the broadband content acquiring method decided in Step S201, the controller acquires the control information on the broadcast, the control information on the broadband, and the control information on the broadcast and broadband cooperation with the program information becoming an entry as a start point (Step S202).

The controller acquires information used to acquire the following broadband content (Step S203).

The controller acquires the information on the content prepared in the server from the control information on the broadband. For the MPD of the MPEG-DASH scheme, examples of the content information include an image size of the video data, a coding rate of the video data, and the clock time information on the video data.

The controller acquires quality information on the broadband transmission channel from broadband transmitter and receiver 21.

The controller acquires the reception device ability necessary for the playback of the content.

In the case that the reception device plays back only the broadband content, the controller can decide the broadband content based on the information used to acquire the broadband content. In order to synchronously play back the broadcast content and the broadband content in the broadcast and broadband cooperation service, the controller further acquires the information on the playback of the broadcast content (Step S204), and decides the broadband content suitable for the synchronous playback with the broadcast content.

Examples of the information on the playback of the broadcast content include the broadcast content presentation clock time or decoding clock time such as the PTS and the DTS, the state (such as the buffer size, the buffer use amount, the overflow, and the underflow) of the buffer such as the delay buffer and the de-jitter buffer in the reception device, and the end-to-end delay amount.

In Step S203, the reception device may acquire the clock time information or timing information (the information indicating the timing relating to the broadband content acquisition) on the broadband content acquisition. In Step S203, the reception device may acquire the information indicating the state in which the broadband content can be acquired (the information indicating that the broadband content is ready in the server). In the third exemplary embodiment, these pieces of information (the information relating to the broadband content acquisition, namely the acquisition information) are received through the broadcast. Alternatively, the pieces of information may be received through the broadband.

Using the acquisition information, the reception device can properly acquire the broadband content in response to the reception of the broadcast content. The reception device acquires the broadband content according to the acquisition information, whereby the possibility of generating the discontinuity such as skip and stopping in the broadcast presentation of the main content can be reduced to ensure the stable broadcast viewing.

Based on the pieces of information acquired in Steps S203 and S204, the controller selects the broadband content suitable for the synchronous playback with the broadcast content, and acquires the selected broadband content from the server (Step S205).

The controller synchronously plays back the broadcast content and the broadband content by properly controlling the buffer according to the acquired broadband content (Step S206). For example, the broadcast content is received in Step S206. In the third exemplary embodiment, the buffer control method is similar to that of the first and second exemplary embodiments, the description of the buffer control method is omitted.

The detailed processing in Step S205 will be supplemented below. In Step S205, specifically, the controller acquires the time stamp of the broadcast content, and selects the broadband content of the clock time at which the broadband content and the broadcast content can synchronously be played back. The controller requests and acquires the selected broadband content from the server.

It is considered that the buffer state is monitored during the synchronous playback of the broadcast content and the broadband content, and that decision that the synchronous playback cannot be continued is made due to the buffer overflow or underflow. In such cases, the controller can continue the synchronous playback by controlling the broadband content acquisition. As used herein, the control of the broadband content acquisition means the control (such as pause, forwarding, and reversing) of the content acquisition.

The controller can also continue the synchronous playback by acquiring the content at a different playback time from the server. For example, the acquisition of the content at the different playback time means that the broadband content at a later playback time is acquired by skipping the broadband content acquisition, or that the broadband content at an earlier playback time is acquired by reversing the broadband content acquisition. The control is effective in the case where the jitter or delay of the transmission channel varies.

[Operation Example in Steady State]

Figure 20:
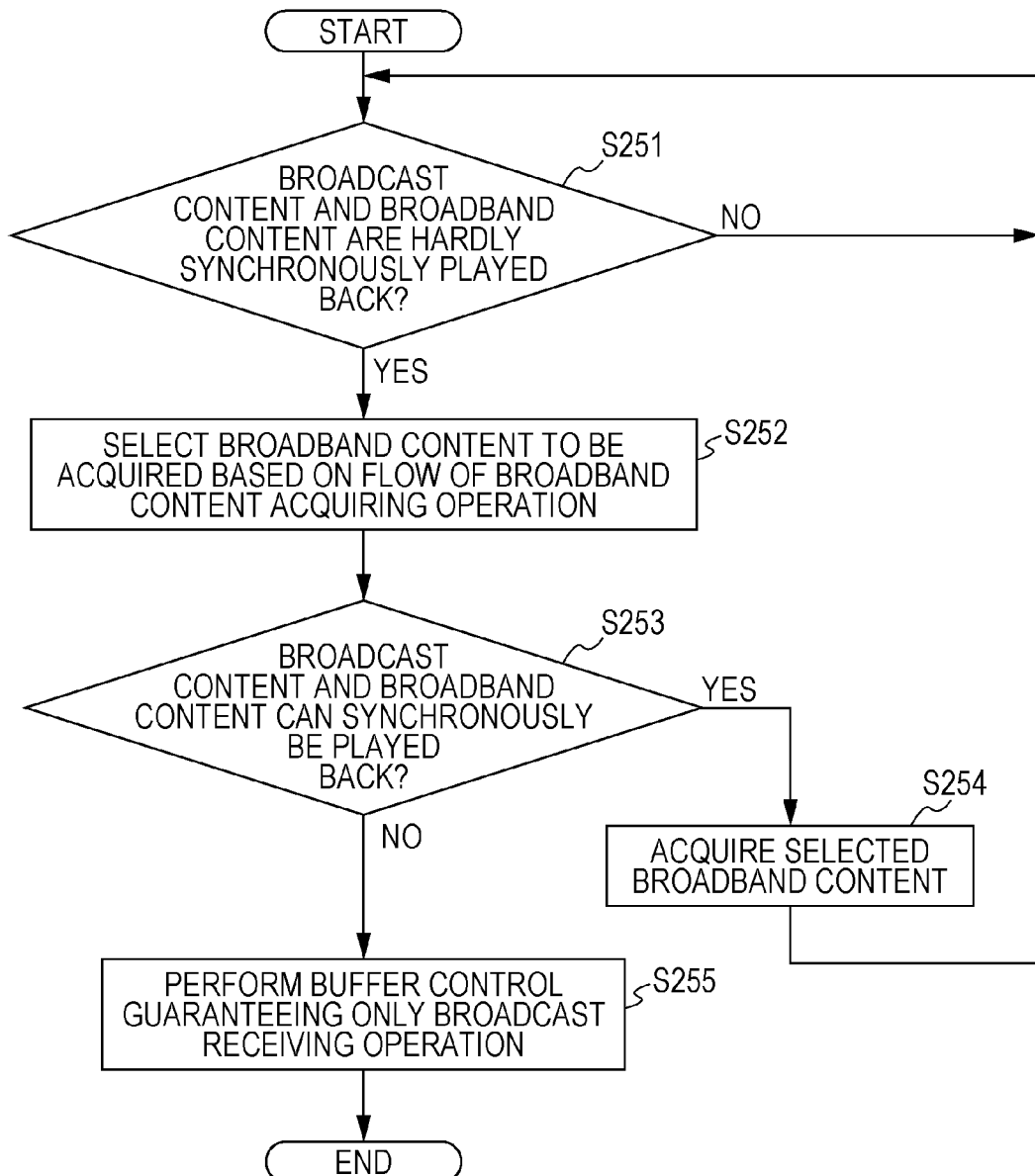
FIG. 20 is a flowchart illustrating an example of synchronous playback operation including the broadband content acquisition.

The synchronous playback operation including the broadband content acquisition in the steady state in which the de-jitter buffer and the delay buffer are synchronized with each other will be described with reference to FIG. 20. FIG. 20 is a flowchart illustrating an example of synchronous playback operation including the broadband content acquisition.

In the case that the decision that the synchronous playback of the broadcast content and the broadband content is hardly performed is made in Step S162 of FIG. 17 of the second exemplary embodiment, the control is performed such that only the broadcast reception operation is guaranteed. On the other hand, in the flowchart of FIG. 20, the acquisition of the broadband content in which the synchronous playback can be performed is further tried even if the decision that the synchronous playback of the broadcast content and the broadband content is hardly performed is made.

In the steady state, the controller (or control manager) monitors the buffer (such as the delay buffer, the de-jitter buffer, and the synchronization buffer) of the reception device. Whether the synchronous playback of the broadcast content and the broadband content is hardly performed is determined based on the state of the buffer (Step S251).

When the synchronous playback of the broadcast content and the broadband content is hardly performed due to the overflow or the underflow even when the buffer is controlled (Yes in S251), the controller selects the broadband content to be acquired based on the broadband content acquiring operation flow in FIG. 19 (Step S252).

The controller determines whether the broadcast content and the selected broadband content can synchronously be played back (Step S253). When the broadcast content and the selected broadband content can synchronously be played back (Yes in S253), the controller acquires the selected broadband content (Step S254), and returns to the steady state to perform the pieces of processing from Step S251 again.

On the other hand, when the broadcast content and the selected broadband content cannot synchronously be played back (No in S253), the controller performs buffer control in which only the broadcast reception operation is guaranteed (Step S255).

[First Operation Example Relating to Pre-Buffering]

In order to accurately perform the synchronous playback of the broadcast content and the broadband content in the broadcast and broadband cooperation service, the broadband content may previously be acquired to perform the synchronous playback with the broadcast content. Thus, the synchronous playback can smoothly be performed without delaying the broadcast content.

Figure 21:
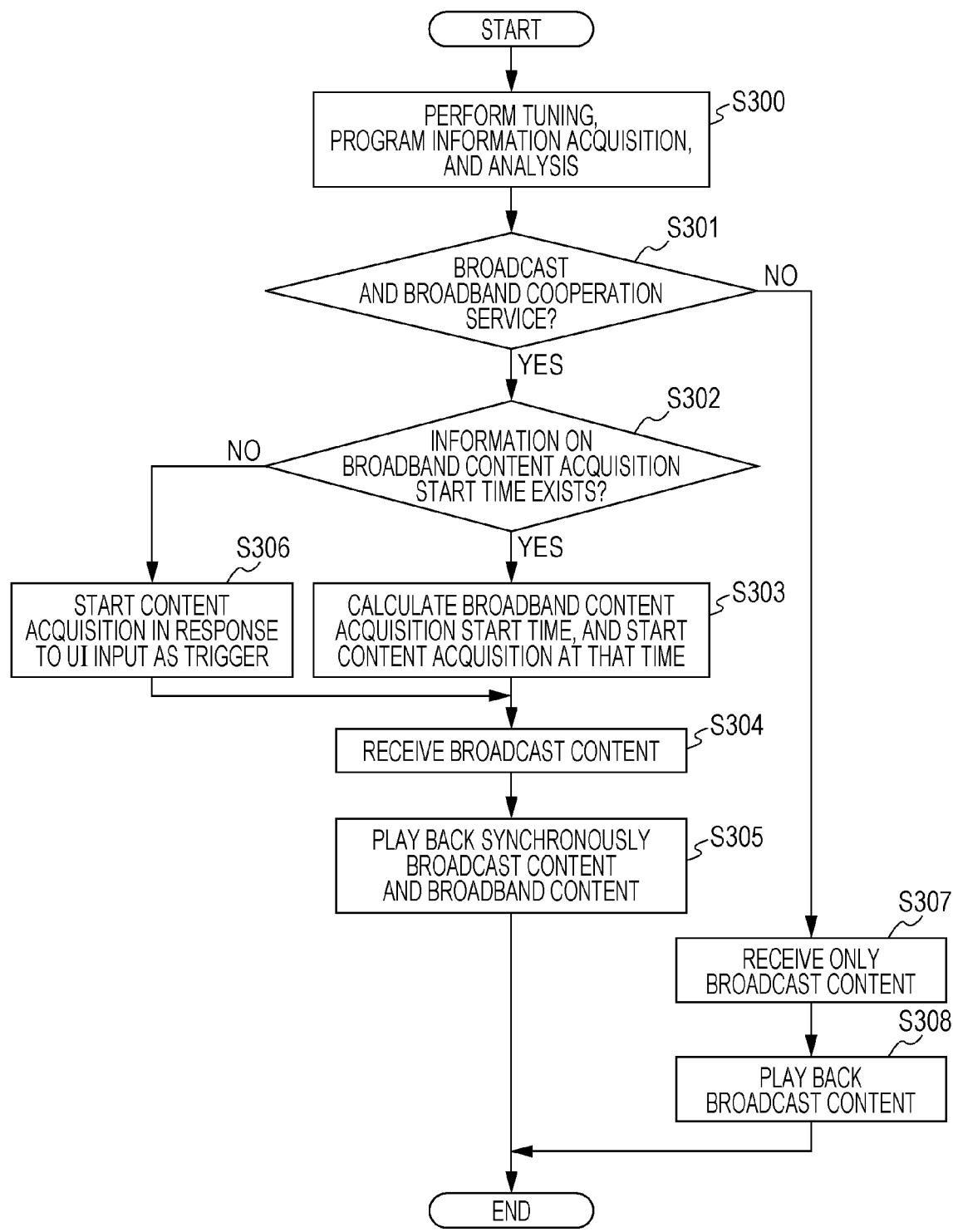
FIG. 21 is a flowchart illustrating an example of operation in which a broadcast and broadband cooperation service is started in a middle of a program.

An example in which the broadcast and broadband cooperation service is started in the middle of the program will be described below. FIG. 21 is a flowchart illustrating an example of operation in which the broadcast and broadband cooperation service is started in the middle of the program.

The controller tunes a broadcast program (broadcast station), and receives and analyzes the program information corresponding to a service ID of the tuned broadcast program (Step S300). For example, the program information is the PMT for the MPEG2-TS scheme.

The controller analyzes the program information to determine whether the tuned broadcast program relates to the broadcast and broadband cooperation service (Step S301). Unless the program information include the description that the program is of the broadcast and broadband cooperation service (No in S301), the controller receives only the broadcast content (Step S307), and plays back the broadcast content (Step S308).

When the program information include the description that the program is the broadcast and broadband cooperation service (Yes in S301), the controller determines whether information on a start time (information on the broadband content acquisition) exists in a descriptor relating to a broadband content acquisition start time (Step S302). When the start time information exists (Yes in S302), the controller acquires the start time. At this point, the controller also acquires the location information on the broadband content. If necessary, the controller calculates the broadband content acquisition start time based on the acquired information, and starts the broadband content acquisition at the calculated time (Step S303).

For example, in the case that the broadband content acquisition start time is indicated by the clock time information on the basis of PCR of the broadcast station, the controller starts the broadband content acquisition when a PCR clock time played back by the reception device is matched to a PCR clock time indicated by the start time information.

For example, in the case that the broadband content acquisition start time is described like "T seconds before the start of the broadcast program", the controller calculates the time being T seconds before the broadcast program start time, and starts the broadband content acquisition at that time.

A step of determining whether the broadband content can be acquired may be provided in Step S303. Whether the broadband content can be acquired may be determined by querying the server by the reception device, or determined based on the descriptor of the program information or the event message transmitted from the server. Whether the broadband content can be acquired may also be determined based on the information transmitted indicating the time at which the broadband content can be acquired.

When the information on the broadband content acquisition start time does not exist (No in S302), the controller starts the broadband content acquisition in response to the input from the viewer such as user interface input as a trigger (Step S306). In this case, the controller may start the broadband content acquisition at a predetermined time, or start the broadband content acquisition by calculating the broadband content acquisition time.

The broadband content previously acquired in Steps S303 and S306 is buffered into a memory (buffer) and the like, and output at arrival of the reception of the broadcast content or a synchronous playback clock time.

Subsequent to step S303, the controller receives the broadcast content (Step S304), and synchronously plays back the broadcast content and the broadband content (Step S305).

Even if the information on the broadband content acquisition start time exists in Step S302, a determination step of determining whether the broadband content is to be pre-acquired may be provided from the viewpoint of the playback ability of the reception device or the buffer ability.

A descriptor including the control information in the example of FIG. 21 (in this case, the information on the content acquisition start time) may be described in identical program information or different pieces of program information. The transmission may be performed through at least one transmission channel in the plurality of transmission channels of the broadcast and broadband. In the case that the transmission is performed through different transmission channels, information indicating the location of the program information is described in the program information becoming the entry.

The control information is described as the descriptor in the example of FIG. 21. Alternatively, the control information may be transmitted as the event message.

In the example of FIG. 21, the broadcast and broadband cooperation service is started in the middle of the broadcast program. On the other hand, in the case that the broadcast and broadband cooperation service is started from the beginning of the next broadcast program, it is necessary to acquire the broadband content before the start of the next broadcast program. In this case, the program information on the next broadcast program is transmitted during provision of the previous broadcast program.

In the case that the program information on the next broadcast program is received, the reception device determines whether the broadband content of the next broadcast program can be pre-acquired, and pre-acquires the broadband content if possible. At this point, by causing the previous program information to include the information indicating that the provision of the next program information is started or the location information, the reception device may recognize the existence of the broadband content to start the program information acquisition.

[Second Operation Example Relating to Pre-Buffering]

Figure 22:
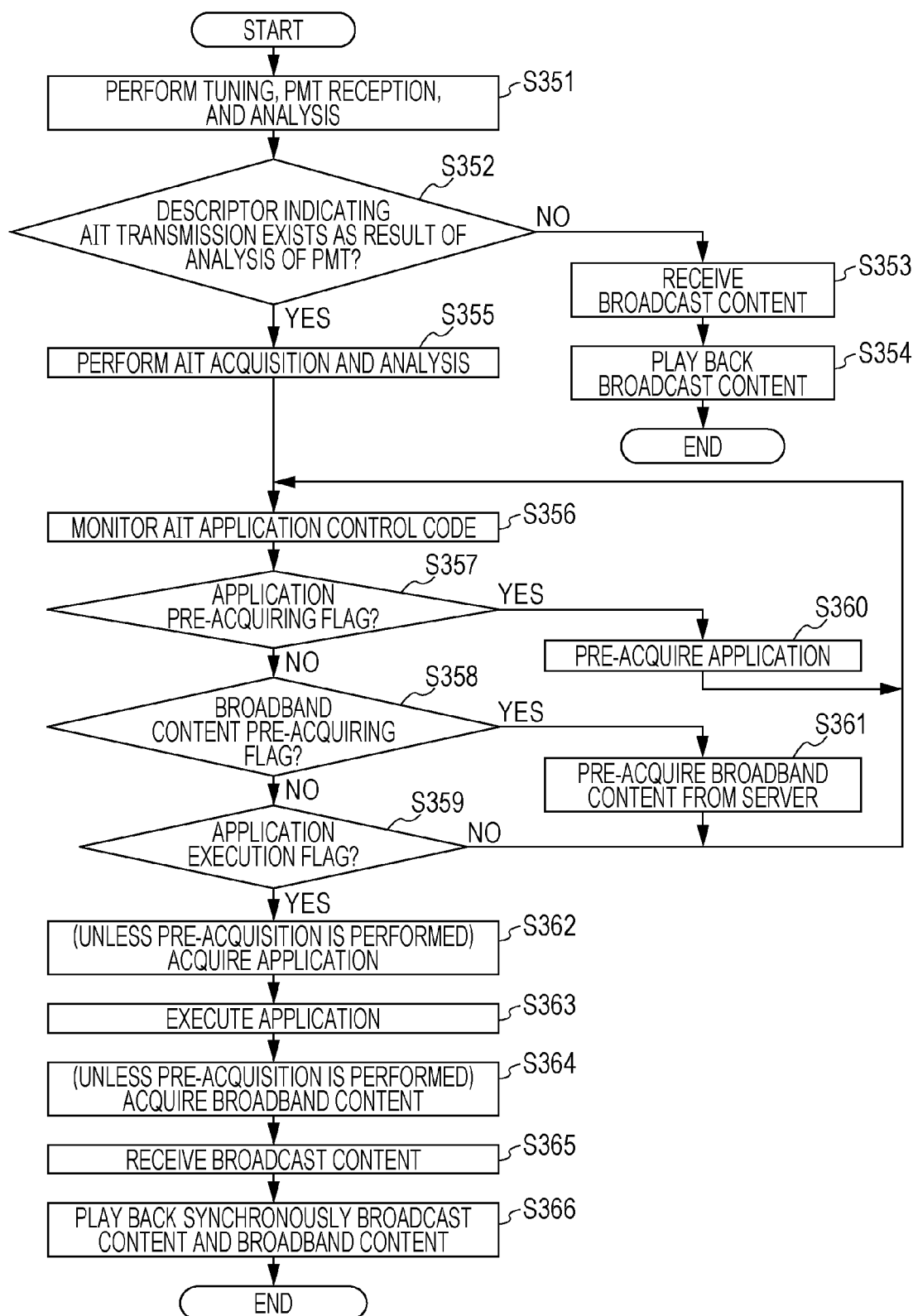
FIG. 22 is a flowchart illustrating an example of buffering operation for the broadband content.

The broadband content buffering operation will be described by taking a hybrid-cast specification standardized by IPTV forum or ARIB as an example. FIG. 22 is a flowchart illustrating an example of the buffering operation for the broadband content. In the example of FIG. 22, the information on the broadband content acquisition start time is notified as an event using the AIT control code.

The controller tunes the broadcast program (broadcast station), and receives and analyzes the PMT of the tuned broadcast program (Step S351). The controller determines whether descriptor aitidentifier_info( ) indicating that the AIT is transmitted exists in the PMT (Step S352). Unless the descriptor exists in the PMT, that is, unless the AIT is transmitted (No in S352), the controller receives only the broadcast content (Step S353), and plays back the received broadcast content (Step S354).

When the descriptor exists in the PMT (Yes in S352), the controller starts the acquisition of the AIT and the monitoring (Step S355). Specifically, the controller analyzes the AIT, and acquires the location information on the application included in the AIT, the broadband content acquisition start clock time information, and the location information.

The controller monitors the AIT application control code (Step S356), and monitors an application pre-acquiring flag (a PREFECH command in the hybrid-cast specification), namely, determines whether the application pre-acquiring flag exists (Step S357).

When the application pre-acquiring flag exists (Yes in S357), the controller pre-acquires the application (Step S360), and returns to the processing in Step S356. When the application pre-acquiring flag does not exist (No in S357), the controller monitors a broadband content pre-acquiring flag (a PREBUFFER command in the hybrid-cast specification), namely, determines whether the broadband content pre-acquiring flag exists (Step S358). When the information on the broadband content acquisition start clock time does not exist in Step S355, the broadband content pre-acquiring flag does not need to be monitored in Step S358.

When the broadband content pre-acquiring flag exists (Yes in S358), the controller pre-acquires the broadband content from the server to perform the buffering, and returns to the processing in Step S356. When the broadband content pre-acquiring flag does not exist (No in S358), the controller monitors an application execution flag (an AUTOSTART command in the hybrid-cast specification), namely, determines whether the application execution flag exists (Step S359).

The pieces of processing in Steps S356 to 358, S360, and S361 are repeated until the application execution flag is set in Step S359 (No in S359). When the application execution flag is set (Yes in S359), the controller acquires the application from a place specified by the location information described in the AIT (Step S362). At this point, when the application is pre-acquired in Step S360, the processing in Step S362 is skipped.

The controller executes the application (Step S363), and acquires the broadband content from the place specified by the location information on the broadband content (Step S364). At this point, when the broadband content is pre-acquired in Step S361, the processing in Step S364 is skipped.

Finally, the controller receives the broadcast content (Step S365), and synchronously plays back the broadcast content and the broadband content (Step S366).

The operations relating to the application and broadband content described in the operation example of FIG. 22 may be performed as one application, or performed while divided into a plurality of applications. For example, the broadband content acquisition may be performed as a part of one application, or alternatively, an application performing the broadband content acquiring operation and an application performing the broadband content playback operation may be separately provided and executed. In this case, the application performing the broadband content acquiring operation is activated first, and the application performing the broadband content playback operation is activated at different timing.

The location information on the broadband content may be described in the AIT or acquired in the application.

The location information on the broadband content may be acquired by executing the application used to acquire only the program information through the broadband transmission channel.

The information indicating the state in which the broadband content can be acquired and the information indicating the state in which the broadband content can be played back may be acquired by the API and the like.

The information on the broadband content acquisition start time may be described in not only the AIT control code but also the control information, or the information on the broadband content acquisition start time may be determined based on whether another piece of control information exists.

[Modifications of Third Exemplary Embodiment]

The function (operation) of the third exemplary embodiment may be mounted by either software or hardware. A part of the function is mounted as the API, and the function may be controlled from the application. The API that can acquire the information obtained by the function and the information indicating a function state may be mounted, and the information may be acquired from the application.

At this point, examples of the function state include the buffer (the delay buffer and the de-jitter buffer) occupied amount, the end-to-end delay time, the application state, and the broadband content acquisition state.

In the case that the currently-played-back program is determined to be not on air but recorded program, the reception device may acquire from the server the information indicating whether the application or the broadband content is available. Unless the application or the broadband content is available, the reception device may prohibit the acquisition and execution of the application or the acquisition of the broadband content.

For such cases, application control information for recorded-program playback and broadband content pre-acquisition information for recorded-program playback may be separately prepared in the server. In the case of the recorded-program playback, information for the recorded-program playback may be acquired from the server with no use of the on-air information.

In the third exemplary embodiment, by way of example, mainly the content is acquired based on the broadband content acquisition start time. Alternatively, a broadband content acquisition completion clock time may be specified, and the reception device may decide the broadband content acquisition start time in consideration of the time necessary for the broadband transmission or the transmission delay. In the case that the application control or the broadband content acquisition is performed through the cooperation terminal such as the tablet, the time necessary for the broadband content acquisition may be decided in consideration of the transmission delay between the cooperation terminals.

(Supplements of Third Exemplary Embodiment)
[Supplement 1: Broadband Content Acquisition]

The broadband content acquisition in FIGS. 19 and 20 will be described in detail.

In the broadcast and broadband cooperation service, the control information signaled from the transmission side, the reception device state, and the transmission channel state can be cited as an example of the information necessary for the decision of each of the delay control method, the synchronization control method, and the broadband content acquisition control method. The reception device can acquire these pieces of information as needed. The reception device can detect the following pieces of information and the state change by monitoring the pieces of information and the state.

The flow relating to the information and the state corresponds to Steps S201 to S204 in FIG. 19. Examples of the control information, the reception device state, and the transmission channel state include the following items.

(1) The following pieces of information are illustrated as the control information on the broadcast and broadband cooperation. (For example, the following pieces of information are stored in a meta-file such as the PMT in the MPEG-2TS scheme and the MPT in the MMT scheme.)

Information indicating whether the program is the broadcast and broadband cooperation program Information indicating the kind of the broadcast and broadband cooperation program Information that is the content subjected to the scalable coding, and indicates that one of basic layer data and extended layer data is transmitted through the broadcast while the other is transmitted through the broadband Information indicating a program to which a measure against rain attenuation (the broadcast program is switched to the broadband content in the case that the broadcast transmission channel is degraded due to the rain attenuation) is applied Information indicating multi-view, multi-audio, and target advertisement Information indicating whether the broadcast program can solely be decoded Information indicating the synchronization accuracy necessary for the decoding and presentation of the broadcast content and broadband content. For example, this information indicates that the high-accuracy synchronization is required at a frame level or that the presentation can be performed even in the asynchronization.

Information indicating whether the broadcast content and the broadband content are a synchronization target Information indicating whether the time line is synchronized Information indicating whether the video is the live video or the non-live video Information indicating that the broadcast content is delayed relative to the broadband content or that the broadband content is delayed relative to the broadcast content. This information may be information that indicates not the delay of individual reception device but the delay amount expected based on line design of the broadcast station.

Information indicating the end-to-end delay permissible in the presentation of the broadcast program Information indicating previously the change of the control information (2) The following pieces of information are illustrated as the information on the broadband means. For example, the information on the broadband means is stored in the MPD of the MPEG-DASH scheme or the meta-file having the IPTVF VOD specification.

Information indicating a broadband protocol (such as http and rtsp)

Information indicating uni-cast (TCP), multi-cast (UDP), or uni-cast (UDP)

(3) The following pieces of information are illustrated as the information on the broadband content. For example, the information on the broadband content is stored in the MPD of the MPEG-DASH scheme or the meta-file having the IPTVF VOD specification.

Information indicating an attribute of the broadband content

Expiration date of the content

Viewing limit (CAS) of the content

Kind (resolution and transmission rate) of the content

Whether the broadband content of any time can be pre-acquired (4) The following parameters are illustrated as the broadcast transmission channel state, the broadband transmission channel state, and the delay state. The reception device acquires these parameters.

Broadband channel state

Jitter, QoS, and RTT

End-to-end delay

Transmission rate (band)

Delay difference between the broadcast and the broadband (the broadcast is ahead? or the broadband is ahead?)

(5) The following parameters are illustrated as the buffer state. The reception device acquires these parameters.

Buffer capacity

Buffer occupied amount

Buffer delay amount (6) The following parameters are illustrated as the reception device specification or the reception device ability. The reception device acquires these parameters.

Specifications

The number of decoders

Compatible browser

Version information and the like (7) "Information indicating whether the control instruction is to be issued" can be cited as the information on the delay control, the information on the synchronization control, and the information on the content acquisition control method. For example, the information is stored in a meta-file such as the PMT in the MPEG-2TS scheme and the MPT in the MMT scheme.

The information indicating whether the control instruction is to be issued specifies that, for example, the broadcast station issues the instruction on the control method, the reception device decides the control method, or the user decides the control method by the user setting.

In the case that the broadcast station issues the instruction on the control method, for example, the broadcast station instructs the reception device whether the broadcast content and the broadband content are to be synchronously presented, or instructs the reception device whether the broadband content is to be pre-buffered. In the case that the broadcast station instructs the reception device to pre-buffer the broadband content, the broadcast station signals the time information and the timing information.

In the case that the user decides the control method by the user setting, the user setting includes a setting according to the instruction of the broadcast station, a setting leaving the decision to the reception device, and the a manual setting by the user.

[Supplement 2: Determination Whether Broadband Content can be Acquired Anytime]

The cases that acquiring the broadband content anytime is possible and impossible are described above. At this point, the reception device may determine whether the broadband content can be acquired anytime, and decide the control details based on the determination result.

For example, whether the broadband content can be acquired anytime can be determined by the control information signaled from the transmission side.

1. Broadband Scheme Dependence

The determination can be made based on whether the broadband scheme in the broadcast and broadband cooperation service is the uni-cast or the multi-cast. For example, the determination that acquiring the broadband content anytime is impossible is made for the multi-cast.

2. Content Dependence

Whether the broadband content in broadcast and broadband cooperation content can be acquired anytime is signaled, and the determination can be made based on the signaled information. For example, based on the signaled information, the determination is made as follows.

2-1. Acquiring the broadband content anytime is impossible 2-2. All pieces of the broadband content are prepared in the server, and can be acquired anytime 2-3. It is unclear whether the broadband content can be acquired anytime (for example, the live video)

Figure 23:
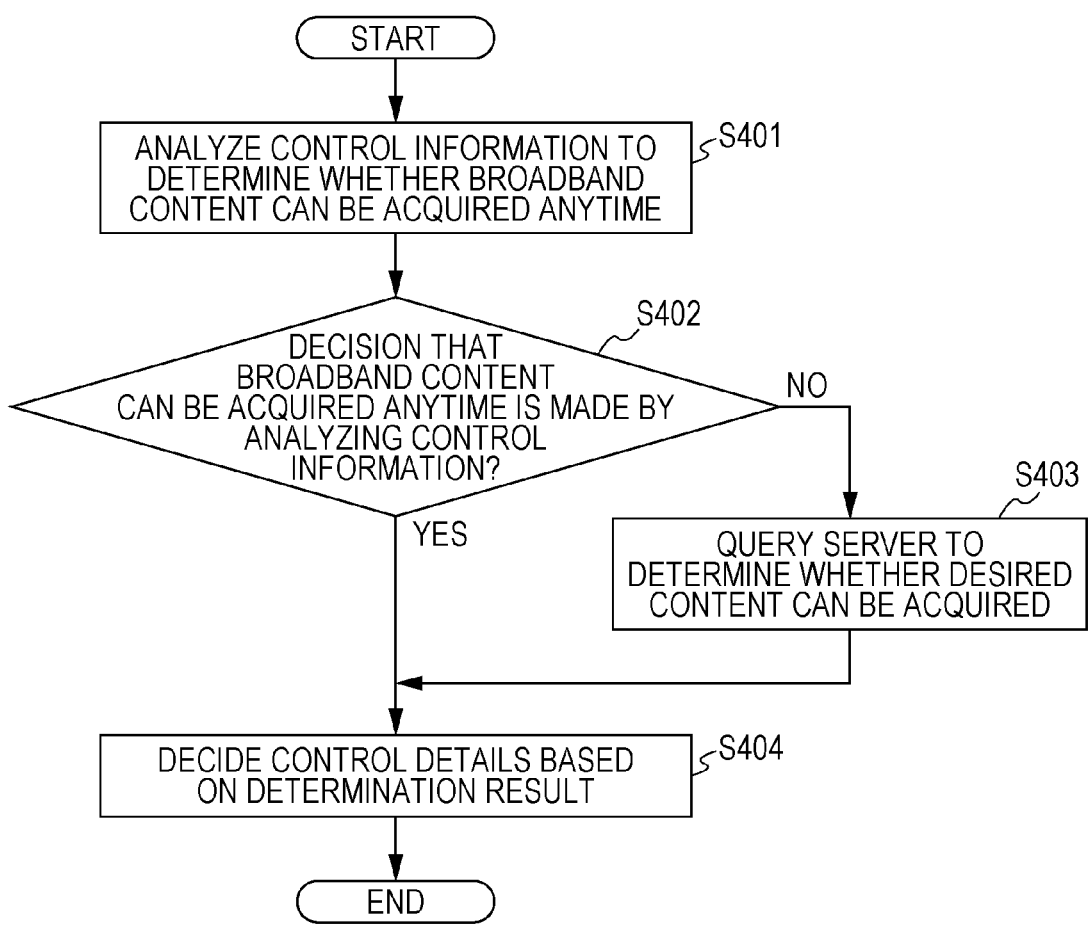
FIG. 23 is a flowchart illustrating an example of a determination whether the broadband content can be acquired anytime.

In the cases 1, 2-1, and 2-2, because the control information signaled on the transmission side is analyzed by the reception device to enable the determination, basically the control details can be decided without querying the server. Even in these cases, the control details are decided by querying the server in the case that the determination cannot be made by the analysis of the control information. FIG. 23 is a flowchart illustrating an example of a determination whether the broadband content can be acquired anytime.

As illustrated in FIG. 23, the reception device analyzes the control information transmitted from the server, and determines whether the broadband content can be acquired anytime (Step S401). When the determination can be made by the analysis of the control information (Yes in S402), the control details are decided based on the determination result (Step S404). When the determination cannot be made by the analysis of the control information (No in S402), the determination is made by querying the server (Step S403), and the control details are decided based on the determination result (Step S404).

In the case that acquiring the broadband content anytime is impossible, for example, the buffer of the reception device is controlled using the methods of the first and second exemplary embodiments, and the delay or synchronous presentation between the broadcast content and the broadband content are controlled.

In the case that the broadband content can be acquired anytime, for example, the buffer of the reception device and the broadband content acquisition are controlled using the method of the third exemplary embodiment, and the delay between the broadcast content and the broadband content is controlled, or the broadcast content and the broadband content are synchronously presented.

In the case 2-3, specifically, the server signals whether the broadcast content is the live video, and the determination that the broadcast content is the live video is made.

In the case that the broadcast content is the live video, there is a high possibility that the broadband content is not prepared in the server. However, sometimes the broadband content is prepared in the server. For this reason, whether the broadband content can actually be acquired is determined such that the reception device queries the server.

The server may signal whether the broadcast is the delayed live video. This is because there is a high possibility that the broadband content is not prepared in the server in the case that the broadcast is not the delayed live video, and there is a possibility that the broadband content is prepared in the server in the case that the broadcast is delayed. In this case, the server may signal the information indicating how much the broadcast is delayed.

The actual time necessary for the reception device to acquire the broadband content depends on the band of individual broadband line, the reception device ability, the CPU use amount, and the buffer amount. Accordingly, in the case 2-3, the transmission side (server) may signal whether the broadband content can be acquired anytime in an environment expected by the transmission side, and guarantee the broadband content acquisition on the reception side.

At this point, for example, the environment expected by the transmission side is an environment that is fixed based on the minimum buffer size defined by a standard, the band of the broadband line, and the CPU ability.

The determination whether the broadband content can be acquired anytime is described above. Alternatively, whether the broadband content can be acquired anytime with respect to the broadcast content may be determined. For example, for the live video, the period in which the broadband content can be acquired may be restricted in such a way that the determination is made whether the broadband content later than the broadcast content by a predetermined time can be acquired.

[Supplement 3: Operation when Broadcast Content Delay Presentation is not Permitted]

The operation for the case that the broadband content can be acquired anytime and the case that possibly the broadband content can be acquired any time while the delay presentation of the broadcast content is not permitted (prohibited) will be described below.

When the delay presentation of the broadcast content that is of the main content is performed during the provision of the broadcast and broadband cooperation service, the viewer has the uncomfortable feeling, but the stable broadcast service is not provided. Therefore, the control under the condition that the delay presentation of the broadcast content is prohibited in the broadcast and broadband cooperation service will be described below.

As described above, it is assumed that the determination whether the broadband content can be acquired anytime is made based on the control information or by the actually querying the server. In the following description, it is assumed that the broadband content of the target for synchronization with the broadcast content changes with time (the plurality of pieces of broadband content exist at respective clock times).

Figure 24:
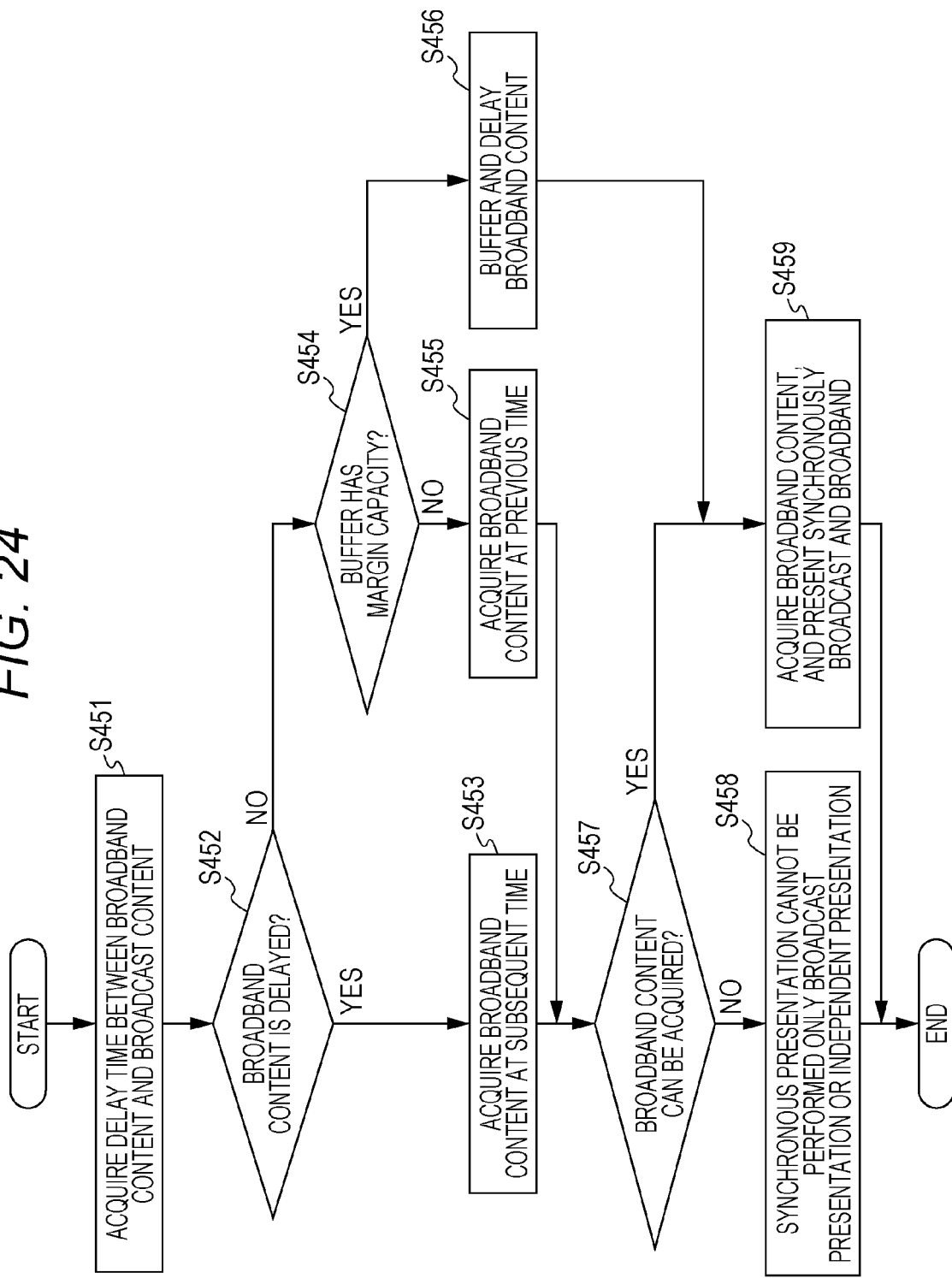
FIG. 24 is a flowchart illustrating an example of operation when delay presentation of the broadcast content is not permitted.

FIG. 24 is a flowchart illustrating an example of the operation when the delay presentation of the broadcast content is not permitted.

The reception device acquires the delay time between the broadband content and the broadcast content (Step S451). As described above, the delay time (delay difference) between the broadband content and the broadcast content can be acquired by the reception device. The reception device determines whether the broadband content is delayed relative to the broadcast content (Step S452).

When the broadband content is delayed relative to the broadcast content (Yes in S452), because the broadcast content cannot be delayed, the reception device acquires the broadband content at a later time (Step S453). That is, the reception device skips the frame of the broadband content.

The reception device determines whether the broadband content at a desired time can be acquired (Step S457). When the broadband content at the desired time can be acquired (Yes in S457), namely, when even the broadband content at the later time is the broadband content at the desired time, the reception device acquires the broadband content at the later time, and synchronously presents the broadcast content and the acquired broadband content (Step S459).

When the broadband content at the desired time cannot be acquired (No in S457), the synchronous presentation cannot be performed. At this point, the reception device determines whether the accuracy of the decoding and presentation of the broadcast content and broadband content is permissible. When the accuracy of the decoding and presentation is not permissible, only the broadcast content is presented (Step S458).

When the accuracy of the decoding and presentation is permissible, the decoding and presentation of the broadcast content and the decoding and presentation of the broadband content are independently controlled (Step S458). For example, in the case that the broadband content is the caption provided to the broadcast content, because the high-accuracy synchronization is considered to be unnecessary, it is occasionally permissible that the presentation is performed without synchronizing the broadcast content and the broadband content.

Specifically, the case that the accuracy of the decoding and presentation is permissible means that a time difference between broadband content playback timing and broadcast content playback timing falls within a predetermined permissible range. The case that the accuracy of the decoding and presentation is not permissible means that the time difference between the broadband content playback timing and the broadcast content playback timing is outside the predetermined permissible range.

On the other hand, when the broadcast content is delayed relative to the broadband content (No in S452), the reception device determines whether the capacity of the delay buffer of the broadband content has a margin (whether a remaining capacity is less than a predetermined value) (Step S454).

When the buffer capacity does not have the margin (No in S454), the reception device acquires the broadband content at the time earlier than the currently-acquired broadband content (Step S455). When the broadband content at the desired time can be acquired (Yes in S457), the reception device acquires the broadband content at the desired time, and synchronously presents the broadcast content and the acquired broadband content (Step S459). In this case, usually the desired broadband content can be acquired. When the broadband content at the desired time cannot be acquired, because the synchronous presentation cannot be performed, the reception device presents only the broadcast content, or independently controls the decoding and presentation of the broadcast content and the decoding and presentation of the broadband content (Step S458).

When the buffer capacity has the margin (Yes in S454), the broadband content is buffered and delayed (Step S456), and the broadcast content and the broadband content are synchronously presented by matching the presentation clock time to that of the broadcast content (Step S459).

In the case that a polarity of the delay time difference between the broadcast content and the broadband content is inverted or possibly inverted, the change of the state is detected, and the control 1-1 and 1-2 is performed based on the detection result.

In the flowchart of FIG. 24, Steps S454 and S456 may be eliminated. Even if the buffer capacity has the margin, the broadband content at the earlier time may be acquired. In this case, when the broadcast content is delayed relative to the broadband content (No in S452), the reception device acquires the broadband content at the time earlier than the currently-acquired broadband content (Step S455).

A request made by the reception device to the server for the broadband content acquisition, which is performed in Steps S453 and S455, will be described below.

When acquiring the broadband content from the server, the reception device specifies the broadband content acquisition timing or the time (such as the PTS) of the broadband content to be acquired, and makes a request for the broadband content acquisition.

When the broadband content at the specified time exists, the server transmits the broadband content at the specified time to the reception device. When the broadband content at the specified time does not exist, the server notifies the reception device of the non-existence of the broadband content.

At this point, unless the broadband content at the time specified by the reception device exists, the server may transmit the broadband content at the latest time to the reception device instead of the broadband content at the specified time. The server may transmit the broadband content at the time closest to the indicated broadband content (at the earlier time or the later time) to the reception device. The above notification and the transmission of alternative broadband content may be combined.

Unless the broadband content at the time specified by the reception device exists, the server may transmit the broadband content to the reception device based on the instruction of the reception device.

In the case that the reception device specifies the requested broadband content by a function in making the request for the broadband content acquisition, the time of the requested broadband content and an operation instruction for the case of the non-existence of the content are stored as an argument.

At this point, the operation instruction is not necessarily included in the acquisition request. Alternatively, after the operation for the case that the synchronous presentation cannot be performed is decided (Step S458), the reception device may issue the operation instruction for the case of the non-existence of the broadband content based on the decided operation.

Specifically, for example, in the case that the accuracy of the decoding and presentation of the broadcast content and broadband content is permissible, the reception device issues an instruction to make a request for the broadband content acquisition at an alternative time, and independently performs the decoding and presentation of the broadcast content and the decoding and presentation of the broadband content. For example, in the case that the accuracy of the decoding and presentation of the broadcast content and broadband content is not permissible, the reception device instructs the server not to transmit the broadband content, and presents only the broadcast content.

Unless the broadband content at the time specified by the reception device exists, or unless a random access point exists at the time, the reception device may make a request for the acquisition of the broadband content at the time closest to the broadband content at the specified time (at the earlier time or the later time).

The presentation control of the broadcast content and the broadband content, which is performed in Steps S458 and S459, will be described below.

(1) Until the Preparation for the Broadband Content Presentation is Completed

Until the preparation for the broadband content presentation is completed, the reception device presents only the broadcast content in the case that the accuracy of the decoding and presentation of the broadcast content and broadband content is required. In the case that the accuracy of the decoding and presentation of the broadcast content and broadband content is not required, the reception device independently decodes and presents the broadcast content and the broadband content.

(2) After the Preparation for the Broadband Content Presentation is Completed

The reception device starts the synchronous presentation of the broadcast content and the broadband content in the case that only the broadcast content is presented in (1) (in the case that the broadband content presentation is stopped).

On the other hand, in the case that the broadcast content is delayed while the broadcast content and the broadband content are independently decoded and presented in (1), the broadband content is skipped to perform the synchronous presentation of the broadcast content and the broadband content. In the case that the broadband content is presented in (1) while the broadband content is delayed, the reception device retroactively (or continuously) presents the broadband content presented in (1).

A message indicating the state (for example, a message indicating whether the synchronous presentation of the broadcast content and the broadband content or the single presentation of the broadcast content is performed) may be presented to the user in the content presentation.

In the case that the broadband content can be acquired prior to the broadcast content, the server may signal whether the broadband content presentation prior to the broadcast content presentation is permitted. When the broadband content presentation prior to the broadcast content presentation is permitted, the reception device presents the broadband content immediately after the preparation for the broadband content presentation is completed. When the broadband content presentation prior to the broadcast content presentation is not permitted, the reception device buffers the broadband content until the preparation for the broadcast content presentation is completed, and the reception device synchronously presents the broadcast content and the broadband content after the preparation for the broadcast content presentation is completed.

[Supplement 4: Delay Time Setting Method on Transmission Side]

A method for setting the delay amount of the broadcast content, which is performed by the transmission station (transmission device), in the case that the broadcast content is delayed will be described below. The broadcast content is transmitted from the transmission station to a plurality of reception devices, the reception devices having different abilities and different broadband bands. Therefore, it is difficult to guarantee that all the reception terminals can receive the broadcast content while the broadcast content is delayed.

In order to change the delay amount according to the reception device, the transmission station may have a configuration in which delay modes can be switched. At this point, for example, the transmission station is provided with a plurality of delay modes having different expected transmission rates of the broadband.

Specifically, the transmission station is provided with a first mode in which a high transmission rate is expected like an optical line and a second mode in which a middle transmission rate is expected like CATV and ADSL.

For example, the delay amount is fixed based on the following equation.

delay amount=minimum buffer size defined by standard/transmission rate expected in each mode The transmission station may signal the delay amount and the delay mode to the broadcast signal. In the signaling, the delay amount and the delay mode are stored in the PMT of the MPEG-2 TS scheme or the MPT of the MMT scheme. Therefore, the reception device can control the reception device based on the signaled delay amount and delay mode.

In the case that the delay amount is determined to be larger than the expected delay amount based on the signaled delay amount and the actual delay amount, the reception device may increase the allocation of a resource of the reception device (CPU speed or the transmission rate of the broadband) to the broadband.

For example, in the case that the reception device is not compatible with the signaled delay amount, only the broadcast content is preferentially presented.

It is considered that simultaneous transmission is performed on the similar pieces of content such as baseball and soccer using both the broadcast and broadband cooperation content and the content of only the normal broadcast. In such cases, the transmission station may transmit the content of only the broadcast with or without delay with respect to delay transmission of the broadcast and broadband cooperation content.

In the simultaneous broadcast, the transmission station may signal information indicating whether each piece of content is delay-transmitted, information indicating whether the delay difference is generated, or information on the delay difference.

[Supplement 5: Configuration of Transmission Device]

Figure 25:
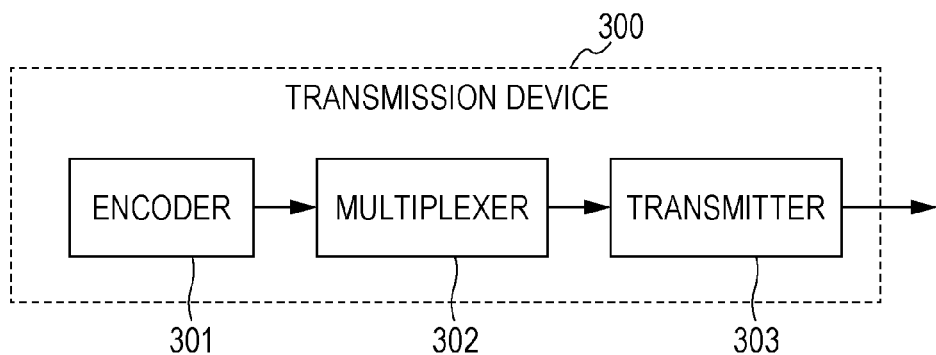
FIG. 25 is a block diagram illustrating a configuration of a transmission device.
Figure 26:
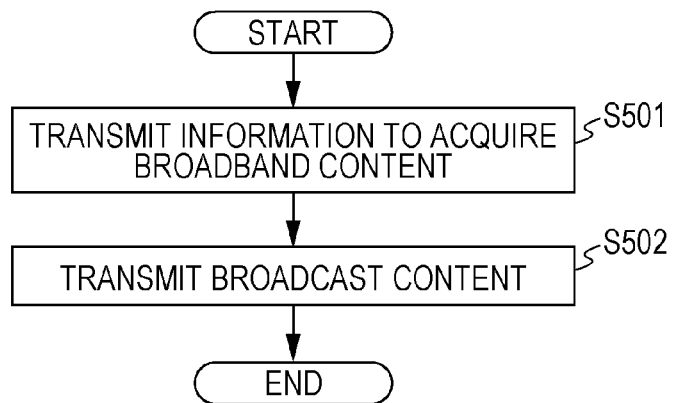
FIG. 26 is a flowchart illustrating an example of operation of the transmission device.

The transmission device (specifically, the server) used in the transmission station (broadcast station) will be supplemented. FIG. 25 is a block diagram illustrating a configuration of the transmission device. FIG. 26 is a flowchart illustrating an example of operation of the transmission device. FIG. 26 illustrates the flowchart of operation of the transmission device corresponding to the flowchart in FIG. 19.

As illustrated in FIG. 25, transmission device 300 includes encoder 301, multiplexer 302, and transmitter 303. Specifically, the components of transmission device 300 are constructed with a microcomputer, a processor, or a dedicated circuit.

Transmitter 303 transmits information used to acquire the broadband content to the reception device (Step S501), which corresponds to Step S203 in FIG. 19. At this point, an example of the information used to acquire the broadband content is the acquisition information. That is, transmitter 303 transmits the acquisition information through the broadcast, the acquisition information being information used to play back broadband content transmitted through the broadband while the broadband content is synchronized with broadcast content transmitted through the broadcast, the acquisition information being information relating to acquisition of the broadband content.

Specifically, multiplexer 302 packetizes the coded acquisition information output from encoder 301, and transmitter 303 transmits the acquisition information packetized by multiplexer 302 through the broadcast.

Transmitter 303 and transmits the broadcast content to the reception device (Step S502), which corresponds to Step S206 in FIG. 19.

Specifically, multiplexer 302 packetizes the coded broadcast content output from encoder 301, and transmitter 303 transmits the broadcast content packetized by multiplexer 302 through the broadcast.

Thus, by transmitting the acquisition information, the reception device can properly acquire the broadband content in response to the reception of the broadcast content. The reception device acquires the broadband content according to the acquisition information, whereby the possibility of generating the discontinuity such as skip and stopping in the broadcast presentation of the main content can be reduced to ensure the stable broadcast viewing.

(Summary of Third Exemplary Embodiment)

According to one aspect of the present disclosure, a reception method in broadcast and broadband cooperation service, the reception method includes: receiving broadcast content transmitted through broadcast; receiving acquisition information through the broadcast, the acquisition information being information used to play back broadband content transmitted through broadband while the broadband content is synchronized with the received broadcast content, the acquisition information being information relating to acquisition of the broadband content; and acquiring the broadband content based on the received acquisition information.

For example, the reception method is illustrated by the flowchart in FIG. 19. In the reception method according to one aspect of the present disclosure, the broadband content can properly be acquired in response to the reception of the broadcast content. By acquiring the broadband content according to the acquisition information, the possibility of generating the discontinuity such as skip and stopping in the broadcast presentation of the main content can be reduced to ensure the stable broadcast viewing.

Typically the broadcast content and the broadband content constitute one piece of content (the content presented in one presentation section). For example, in the case that the broadcast content is video, the caption displayed according to the video displayed by the broadcast content is the broadband content. In the scalable coding, for example, each frame constituting the 60-fps video is the broadcast content, and each frame added to the broadcast content to constitute the 120-fps video is the broadband content. Sometimes the broadcast content is the main video, and the broadband content is the advertisement (CM).

That is, the term "synchronization" means that the time difference between the broadcast content playback timing and the broadband content playback timing is matched to a predetermined time difference (the time difference within a predetermined range) in order to play back one piece of content constructed with the broadcast content and the broadband content.

The acquisition information may be information indicating timing relating to the acquisition of the broadband content.

Thus, the reception method that enables the broadband content to be properly acquired in response to the reception of the broadcast content can be achieved by specifying the timing relating to the broadband content acquisition from the transmission side (server).

The acquisition information may be information indicating timing at which the acquisition of the broadband content should be started in order to synchronously play back the broadband content and the received broadcast content.

The acquisition information may be information indicating timing at which the acquisition of the broadband content should be completed in order to synchronously play back the broadband content and the received broadcast content.

The acquisition information may be information indicating timing at which the playback of the broadband content should be started in order to synchronously play back the broadband content and the received broadcast content.

The acquisition information may be information that notifies timing to indicate that the acquisition of the broadband content is enabled at and after the timing.

Thus, it is considered that there are various aspects of timing relating to the broadband content acquisition.

The reception method may further include: calculating timing to start the acquisition of the broadband content based on the received acquisition information; and starting the acquisition of the broadband content at the calculated timing.

For example, the reception method is illustrated in Step S303 of the flowchart in FIG. 21. That is, in the case that the content acquisition starting time is not directly specified, the reception side may calculate the content acquisition starting time. The pieces of information, such as the reception device ability, the broadband transmission channel state, and the transmission delay, which are described in the third exemplary embodiment may further be used in order to calculate the acquisition start time with high accuracy.

The acquisition information may be information indicating a state in which the broadband content can be acquired.

The reception method may further include playing back the acquired broadband content while the broadband content is synchronized with the received broadcast content.

Only the broadcast content in the broadcast content and the broadband content may be played back when the broadband content is unsuccessfully acquired.

For example, the reception method is illustrated in Step S255 of FIG. 20, Step S308 of FIG. 21, and Step S458 of FIG. 24. The broadcast and broadband cooperation service that hardly gives the uncomfortable feeling to the viewer can be performed by playing back only the broadcast content in the case that the synchronization cannot be performed.

When the acquired broadband content cannot be played back while synchronized with the received broadcast content, (1) the broadband content and the broadcast content may be played back when a time difference between playback timing of the broadband content and playback timing of the broadcast content is within a predetermined permissible range, and (2) only the broadcast content in the broadcast content and the broadband content may be played back when the time difference is outside the predetermined permissible range.

For example, the reception method is illustrated in Step S458 of FIG. 24. The broadcast content and the broadband content may be played back within the permissible range without synchronization.

According to another aspect of the present disclosure, a transmission method in broadcast and broadband cooperation service, the transmission method includes transmitting acquisition information through the broadcast, the acquisition information being information used to play back broadband content transmitted through the broadband while the broadband content is synchronized with broadcast content transmitted through the broadcast, the acquisition information being information relating to acquisition of the broadband content.

For example, the transmission method is illustrated by the flowchart in FIG. 26. In the transmission method, the reception side can properly acquire the broadband content in response to the reception of the broadcast content, the possibility of generating the discontinuity such as the skip and the stopping in the broadcast presentation of the main content can be reduced on the reception side, and the stable broadcast viewing can be ensured.

According to still another aspect of the present disclosure, a reception device used in broadcast and broadband cooperation service, the reception device includes: a broadcast receiver that receives broadcast content transmitted through the broadcast, and receives acquisition information through the broadcast, the acquisition information being information used to play back broadband content transmitted through the broadband while the broadband content is synchronized with the received broadcast content, the acquisition information being information relating to acquisition of the broadband content; and a communicator that acquires the broadband content based on the received acquisition information.

At this point, the broadcast receiver corresponds to the digital broadcast receiver in FIGS. 1, 9, 10, and 14, and the communicator corresponds to the broadband transmitter and receiver in FIGS. 1, 9, 10, and 14.

According to yet aspect of the present disclosure, a transmission device used in broadcast and broadband cooperation service, the transmission device includes a transmitter that transmits acquisition information through the broadcast, the acquisition information being information used to play back broadband content transmitted through the broadband while the broadband content is synchronized with broadcast content transmitted through the broadcast, the acquisition information being information relating to acquisition of the broadband content.

At this point, the transmitter corresponds to the transmitter in FIG. 25.

These comprehensive or specific aspects may be implemented by a system, a device, a method, an integrated circuit, a computer program, or a recording medium such as a computer-readable CD-ROM. These comprehensive or specific aspects may be implemented by any combination of the system, the device, the method, the integrated circuit, the computer program, and the recording medium.

Other Exemplary Embodiments

Although the first to third exemplary embodiments are described above, the present disclosure is not limited to the first to third exemplary embodiments.

In the third exemplary embodiment, the broadcast content is transmitted through the broadcast, and the broadband content is transmitted through the broadband. For example, if possible, other pieces of information (for example, control information) may be transmitted through either the broadcast or the broadband.

In the first to third exemplary embodiments, each component may be constructed with dedicated hardware, or constructed by executing a software program suitable for each component. Each component may be constructed by a program executer such as a CPU and a processor that reads and executes a software program recorded in a recording medium such as a hard disk and a semiconductor memory.

Each component may be constructed with a circuit. These circuits may be constructed with one circuit as a whole, or constructed with different circuits. Each of the circuits may be constructed with a general-purpose circuit or a dedicated circuit.

For example, in the first to third exemplary embodiments, processing performed by a specific processor may be performed by another processor. A sequence of the plurality of pieces of processing may be changed, or the plurality of pieces of processing may concurrently be performed.

Typically each functional block used in the above embodiments is constructed as an LSI of an integrated circuit including input and output terminals. Each functional block may individually be constructed with one chip, or a part of or all these functional blocks may be constructed with one chip. At this point, although the term "LSI" is used, sometimes the integrated circuit is called an IC, a system LSI, a super LSI, or an ultra LSI depending on the integration degree.

A technique of making the integrated circuit is not limited to the LSI, but the integrated circuit may be made using a dedicated circuit or a general-purpose processor. An FPGA (Field Programmable Gate Array) that can be programmed or a reconfigurable processor in which connection or a setting of a circuit cell in the LSI can be reconfigured may be used after the LSI is produced.

When another integrated circuit making technology with which the LSI is replaced emerges with the progress of a semiconductor technology or by another technology derived from the semiconductor technology, the functional blocks may be integrated using the integrated circuit making technology. There is also a possibility of applying a biotechnology to the integrated circuit making technology.

Although the reception device (reception method) and the transmission device (transmission method) of the first to third exemplary embodiments are described above, the present disclosure is not limited to the first to third exemplary embodiments. Various modifications can be made by those skilled in the art without departing from the scope of the present disclosure, and a combination of the components of different exemplary embodiments may also included in the present disclosure.

The exemplary embodiments of the present disclosure include the following aspects.

According to a first aspect of the present disclosure, a reception method in a broadcast and broadband cooperation service, the reception method includes: receiving broadcast content transmitted through the broadcast; receiving broadband content transmitted through the broadband; receiving acquisition information transmitted through the broadcast, the acquisition information being information on acquisition of the broadband content, the acquisition information being information that is used to play back the broadband content while the broadband content is synchronized with the broadcast content; and acquiring the broadband content based on the acquisition information.

According to a second aspect of the present disclosure, in the reception method of the first aspect, the acquisition information is information indicating timing relating to the acquisition of the broadband content.

According to a third aspect of the present disclosure, in the reception method of the second aspect, the acquisition information is information indicating timing relating to start of the acquisition of the broadband content in order to synchronously play back the broadband content and the received broadcast content.

According to a fourth aspect of the present disclosure, in the reception method of the second aspect, the acquisition information is information indicating timing relating to completion of the acquisition of the broadband content in order to synchronously play back the broadband content and the broadcast content.

According to a fifth aspect of the present disclosure, in the reception method of the second aspect, the acquisition information is information indicating timing relating to start of the playback of the broadband content in order to synchronously play back the broadband content and the broadcast content.

According to a sixth aspect of the present disclosure, in the reception method of the second aspect, the acquisition information is information providing notification about timing relating to the acquisition of the broadband content so as indicate that the broadband content can be acquired at and after timing.

According to a seventh aspect of the present disclosure, in the reception method of the fourth aspect, the reception method further includes: calculating timing relating to start the acquisition of the broadband content based on the acquisition information; and starting the acquisition of the broadband content at the calculated timing.

According to an eighth aspect of the present disclosure, in the reception method of the first aspect, the acquisition information is information indicating a state in which the broadband content can be acquired.

According to a ninth aspect of the present disclosure, in the reception method of the first aspect, the reception method further includes playing back the broadband content while the broadband content is synchronized with the broadcast content.

According to a tenth aspect of the present disclosure, in the reception method of the first aspect, the broadcast content in the broadcast content and the broadband content is played back when the broadband content is unsuccessfully acquired.

According to an eleventh aspect of the present disclosure, in the reception method of the first aspect, when the broadband content is not played back while synchronized with the broadcast content, (1) the broadband content and the broadcast content are asynchronously played back without synchronization when a time difference between playback timing of the broadband content and playback timing of the broadcast content is within a predetermined permissible range, and (2) only the broadcast content in the broadcast content and the broadband content is played back when the time difference is outside the predetermined permissible range.

According to a twelfth aspect of the present disclosure, a transmission method in a broadcast and broadband cooperation service, the transmission method includes: transmitting broadcast content through the broadcast; transmitting broadband content through the broadband; and transmitting acquisition information through the broadcast, the acquisition information being information on acquisition of the broadband content. At this point, the acquisition information is information that is used by a reception device to play back the broadband content while the broadband content is synchronized with the broadcast content.

According to a thirteenth aspect of the present disclosure, a reception device used in a broadcast and broadband cooperation service, the reception device includes: a broadband receiver which, in operation, receives broadband content transmitted through the broadband; and a broadcast receiver which, in operation, receives broadcast content transmitted through the broadcast, and receives acquisition information transmitted through the broadcast, the acquisition information being information on acquisition of the broadband content, the acquisition information being information that is used by the reception device to play back the broadband content while the broadband content is synchronized with the broadcast content. At this point, the broadband receiver acquires the broadband content based on the acquisition information.

According to a fourteenth aspect of the present disclosure, a transmission device used in a broadcast and broadband cooperation service, the transmission device includes: a broadband transmitter which, in operation, transmits broadband content through the broadband; and a broadcast transmitter which, in operation, transmits broadcast content through the broadcast, and transmits acquisition information through the broadcast, the acquisition information being information on acquisition of the broadband content, the acquisition information being information that is used by a reception device to play back the broadband content while the broadband content is synchronized with the broadcast content.

The reception method of the present disclosure can be used in the broadcast and broadband cooperation service as a reception method for enabling the broadband content to properly be acquired in response to the reception of the broadcast content.

What is claimed is:

1. A reception method in a broadcast and broadband cooperation service, the reception method comprising:
    receiving first content transmitted;
    receiving acquisition information transmitted through broadcast, the acquisition information being information on acquisition of second content transmitted, the acquisition information being information used to play back the second content while the second content is synchronized with the first content;
    acquiring the second content based on the acquisition information; and
    receiving, through one of the broadcast and broadband, information indicating a delay tolerance in synchronized display of the first content and the second content,
    wherein the first content and the second content are played back in synchronization when the second content is played back by a time obtained by delaying a display time of the first content by a delay tolerance period determined according to the delay tolerance, and
    the first content and the second content are not played back in synchronization when the second content is not played back by the time obtained by delaying the display time of the first content by the delay tolerance period.

2. A reception device used in a broadcast and broadband cooperation service, the reception device comprising:
    a receiver,
    wherein the receiver, in operation:
        receives first content transmitted;
        receives acquisition information transmitted through broadcast, the acquisition information being information on acquisition of second content transmitted, the acquisition information being information that is used by the reception device to play back the second content while the second content is synchronized with the first content;
        acquires the second content based on the acquisition information; and
        receives, through one of the broadcast and broadband, information indicating a delay tolerance in synchronized display of the first content and the second content,
    wherein the first content and the second content are played back in synchronization when the second content is played back by a time obtained by delaying a display time of the first content by a delay tolerance period determined according to the delay tolerance, and the first content and the second content are not played back in synchronization when the second content is not played back by the time obtained by delaying the display time of the first content by the delay tolerance period.

3. A transmission method in a broadcast and broadband cooperation service, the transmission method comprising:

transmitting first content;

transmitting acquisition information through broadcast, the acquisition information being information on acquisition of second content, the acquisition information being information that is used by a reception device to play back the second content while the second content is synchronized with the first content; and transmitting, through one of the broadcast and broadband, information indicating a delay tolerance in synchronized display of the first content and the second content, wherein the first content and the second content are played back in synchronization when the second content is played back by a time obtained by delaying a display time of the first content by a delay tolerance period determined according to the delay tolerance, and the first content and the second content are not played back in synchronization when the second content is not played back by the time obtained by delaying the display time of the first content by the delay tolerance period.

4. A transmission device used in a broadcast and broadband cooperation service, the transmission device comprising:

a transmitter, wherein the transmitter, in operation:

transmits first content;

transmits acquisition information through broadcast, the acquisition information being information on acquisition of second content, the acquisition information being information that is used by a reception device to play back the second content while the second content is synchronized with the first content; and transmits, through one of the broadcast and broadband, information indicating a delay tolerance in synchronized display of the first content and the second content, wherein the first content and the second content are played back in synchronization when the second content is played back by a time obtained by delaying a display time of the first content by a delay tolerance period determined according to the delay tolerance, and the first content and the second content are not played back in synchronization when the second content is not played back by the time obtained by delaying the display time of the first content by the delay tolerance period.

* * * * *